US012675774B2

(12) United States Patent
Waldman et al.

(10) Patent No.: US 12,675,774 B2
(45) Date of Patent: Jul. 7, 2026

(54) ENHANCED VIEWS AND NOTIFICATIONS OF LOCATION AND CALENDAR INFORMATION

(71) Applicant: MICROSOFT TECHNOLOGY LICENSING, LLC, Redmond, WA (US)

(72) Inventors: Lawrence Fubini Waldman, Kirkland, WA (US); Mabel Tang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/692,261

(22) Filed: Nov. 22, 2019

(65) Prior Publication Data

US 2021/0158304 A1 May 27, 2021

(51) Int. Cl.
G06Q 10/1093 (2023.01)
G06F 3/0481 (2022.01)
(Continued)

(52) U.S. Cl.
CPC ....... *G06Q 10/1093* (2013.01); *G06F 3/0481* (2013.01); *H04W 4/021* (2013.01); *H04W 4/025* (2013.01); *G06F 16/29* (2019.01)

(58) Field of Classification Search
CPC ... G06Q 10/1095; G06F 3/0481; G06F 16/29; H04W 4/021; H04W 4/025
See application file for complete search history.

(56) References Cited

U.S. PATENT DOCUMENTS 5,904,727 A * 5/1999 Prabhakaran ............ G08G 1/20
                                                                701/454
6,141,014 A    10/2000 Endo et al.
(Continued)

FOREIGN PATENT DOCUMENTS

CN          104115169 A    10/2014
CN          106411697 A    2/2017
CN          107992494 A    5/2018

OTHER PUBLICATIONS

"5 Ways You Can Track Your Sales Reps with Outfield", Retrieved from: https://youtu.be/q619Nix1Wxk?t=58, Mar. 6, 2018, 3 Pages.
(Continued)

*Primary Examiner* — Andrew T Chiusano
(74) *Attorney, Agent, or Firm* — Scott Y. Shigeta; Newport IP, LLC

(57) ABSTRACT
A system provides enhanced views and notifications of user location and calendar information. A system can analyze and display location data of one or more people with calendar data specifying locations and times of events. A user interface showing the location of one or more people displayed with details of each person's calendar allows computer users to readily determine if each person is at an appropriate location relative to their schedule. Graphical highlights or other types of notifications can also be generated when people are off calendar, on calendar, or at an appropriate location. A filtering function can be used for targeting events in a specific window in time across all members of a group or a specific member across time. In such configurations, a device can select specific calendar events based on a given time frame to allow for a more focused view on contextually relevant user activity.

20 Claims, 43 Drawing Sheets

(51) Int. Cl.
G06F 16/29 (2019.01)
H04W 4/02 (2018.01)
H04W 4/021 (2018.01)

(56) References Cited

U.S. PATENT DOCUMENTS

| | | | | |
|---|---|---|---|---|
| 7,340,691 | B2 | 3/2008 | Bassett et al. | |
| 7,660,872 | B2 | 2/2010 | Delia et al. | |
| 8,543,441 | B2 | 9/2013 | Siegel | |
| 8,606,611 | B1 * | 12/2013 | Fedorov | G06Q 10/103 |
| | | | | 705/7.15 |
| 8,660,790 | B2 | 2/2014 | Stahl et al. | |
| 9,175,964 | B2 | 11/2015 | Forstall et al. | |
| 9,230,232 | B2 * | 1/2016 | McCormick | G07C 5/008 |
| 9,275,544 | B2 | 3/2016 | Levine et al. | |
| 9,325,800 | B1 | 4/2016 | Eda et al. | |
| 2003/0045301 | A1 * | 3/2003 | Wollrab | G06Q 10/109 |
| | | | | 455/456.1 |
| 2004/0100460 | A1 | 5/2004 | Yamada et al. | |
| 2007/0241882 | A1 * | 10/2007 | Panttaja | G08G 1/20 |
| | | | | 340/521 |
| 2008/0086455 | A1 | 4/2008 | Meisels et al. | |
| 2008/0171559 | A1 * | 7/2008 | Frank | H04W 4/029 |
| | | | | 455/456.5 |
| 2009/0177513 | A1 | 7/2009 | Eckhart et al. | |
| 2010/0211425 | A1 | 8/2010 | Govindarajan | |
| 2011/0090078 | A1 | 4/2011 | Kim et al. | |
| 2012/0226390 | A1 * | 9/2012 | Adams | G07C 5/008 |
| | | | | 701/1 |
| 2012/0302258 | A1 * | 11/2012 | Pai | H04L 51/20 |
| | | | | 455/456.2 |
| 2014/0026088 | A1 * | 1/2014 | Monte | G06F 3/04855 |
| | | | | 715/765 |
| 2014/0206328 | A1 | 7/2014 | Varoglu et al. | |
| 2014/0223331 | A1 * | 8/2014 | Sheha | G06F 3/0486 |
| | | | | 715/751 |
| 2015/0186415 | A1 * | 7/2015 | Li | H04W 4/029 |
| | | | | 707/755 |
| 2015/0237475 | A1 | 8/2015 | Henson | |
| 2016/0102993 | A1 | 4/2016 | Nortrup | |
| 2016/0342954 | A1 * | 11/2016 | Bader | G06Q 10/1095 |

| | | | | |
|---|---|---|---|---|
| 2017/0357904 | A1 | 12/2017 | Adler et al. | |
| 2018/0005196 | A1 * | 1/2018 | Kamino | G09B 29/00 |
| 2018/0180425 | A1 | 6/2018 | Hennessy | |
| 2019/0057340 | A1 * | 2/2019 | Wang | G06Q 10/063114 |
| 2019/0072405 | A1 | 3/2019 | Luchner et al. | |

OTHER PUBLICATIONS

"Apply filters", Retrieved from: https://web.archive.org/web/20181224215326/https://doc.arcgis.com/en/arcgis-online/create-maps/apply-filters.htm, Dec. 24, 2018, 4 Pages.

"MTracker—GPS Based Sales Force Tracking App", Retrieved from: https://www.metizsoft.com/field-force-tracking-app, Retrieved Date: Jun. 12, 2019, 9 Pages.

"Project timelines calendar", Retrieved from: https://www.getflow.help/article/91-project-timelines-calendar, Retrieved Date: Jul. 24, 2019, 7 Pages.

"Real-Time Location Tracking", Retrieved from: https://web.archive.org/web/20170622225403/http://www.kapturecrm.com/real-time-location-tracking/, Jun. 22, 2017, 8 Pages.

"Sales Rep Tracking App", Retrieved from: https://spotio.com/features/rep-tracking/, Retrieved Date: Jul. 24, 2019, 8 Pages.

"Teamgate", Retrieved from: https://www.teamgate.com/features/geolocation/, Retrieved Date: Jul. 24, 2019, 6 Pages.

Abby, "Announcing Your Timeline in Google Maps", Retrieved from: https://support.google.com/maps/forum/AAAAQuUrST8xnzOR0SqYNM/?hl=en&gpf=%23!msg%2Fmaps%2FxnzOR0SqYNM%2FqMf7kjqSCgAJ&msgid=qMf7kjqSCgAJ, Jan. 11, 2016, 4 Pages.

"International Search Report and Written Opinion Issued in PCT Application No. PCT/US20/058618", Mailed Date: Apr. 13, 2021, 12 Pages.

First Office Action Received for Chinese Application No. 202080080344.1, mailed on Apr. 8, 2025, 17 pages. (English Translation Provided).

Second Office Action received for Chinese Application No. 202080080344.1, mailed on Sep. 16, 2025, 15 Pages. (English Translation Provided).

Communication under Rule 71(3) EPC Received for European Application No. 20816009.3, mailed on Nov. 21, 2025, 06 pages.

Decision to grant received for European application No. 20816009.3, mailed on Jan. 22, 2026, 2 pages.

* cited by examiner

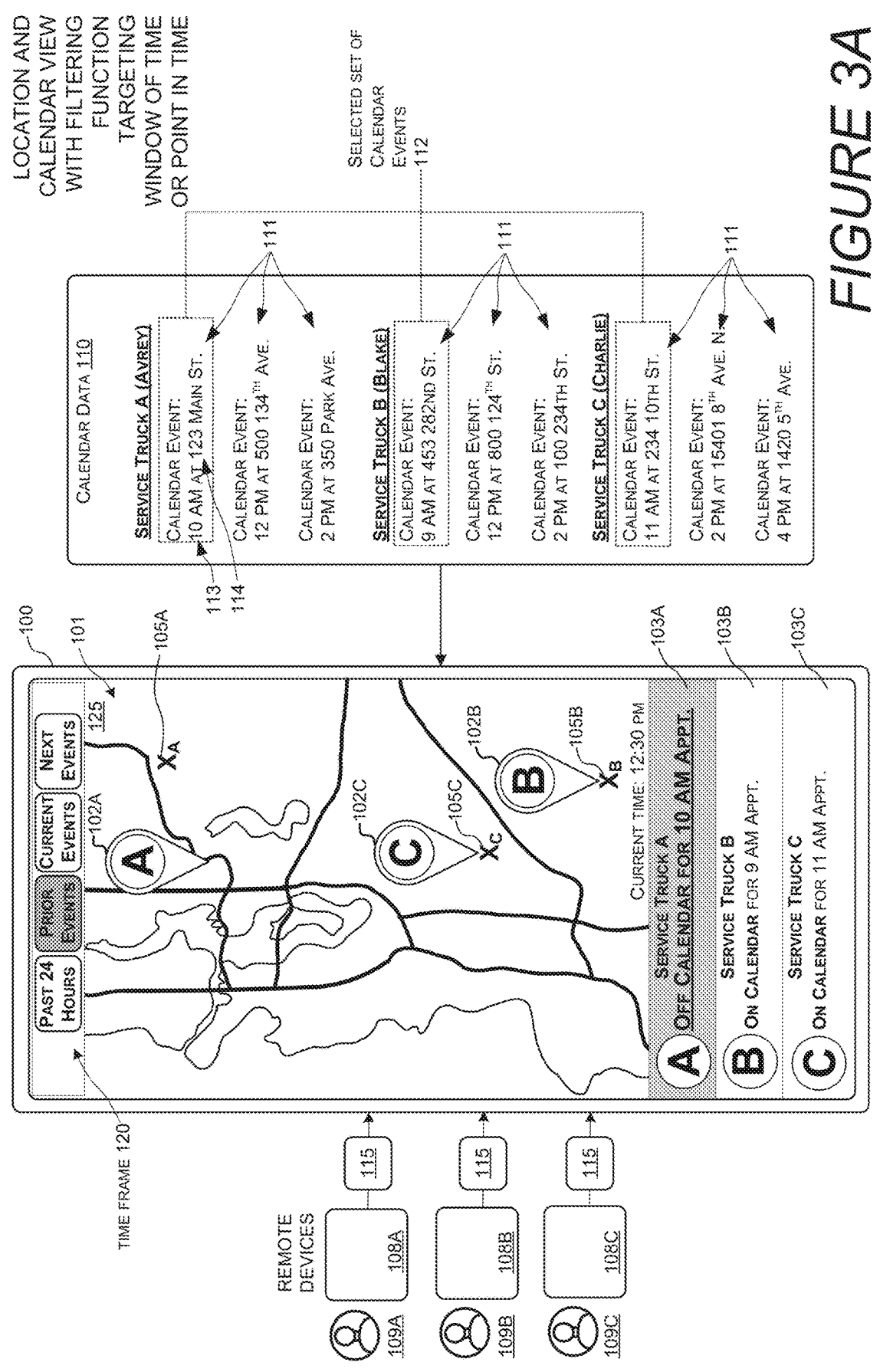

LOCATION AND CALENDAR VIEW WITH FILTERING FUNCTION TARGETING WINDOW OF TIME OR POINT IN TIME

SELECTED SET OF CALENDAR EVENTS 112

CALENDAR DATA 110

SERVICE TRUCK A (AVREY)
CALENDAR EVENT: 10 AM AT 123 MAIN ST.
CALENDAR EVENT: 12 PM AT 500 134TH AVE.
CALENDAR EVENT: 2 PM AT 350 PARK AVE.

SERVICE TRUCK B (BLAKE)
CALENDAR EVENT: 9 AM AT 453 282ND ST.
CALENDAR EVENT: 12 PM AT 800 124TH ST.
CALENDAR EVENT: 2 PM AT 100 234TH ST.

SERVICE TRUCK C (CHARLIE)
CALENDAR EVENT: 11 AM AT 234 10TH ST.
CALENDAR EVENT: 2 PM AT 15401 8TH AVE. N.
CALENDAR EVENT: 4 PM AT 1420 5TH AVE.

PAST 24 HOURS | PRIOR EVENTS | CURRENT EVENTS | NEXT EVENTS

CURRENT TIME: 12:30 PM

SERVICE TRUCK A
OFF CALENDAR FOR 10 AM APPT. 103A

SERVICE TRUCK B
ON CALENDAR FOR 9 AM APPT. 103B

SERVICE TRUCK C
ON CALENDAR FOR 11 AM APPT. 103C

TIME FRAME 120

REMOTE DEVICES

FIGURE 3A

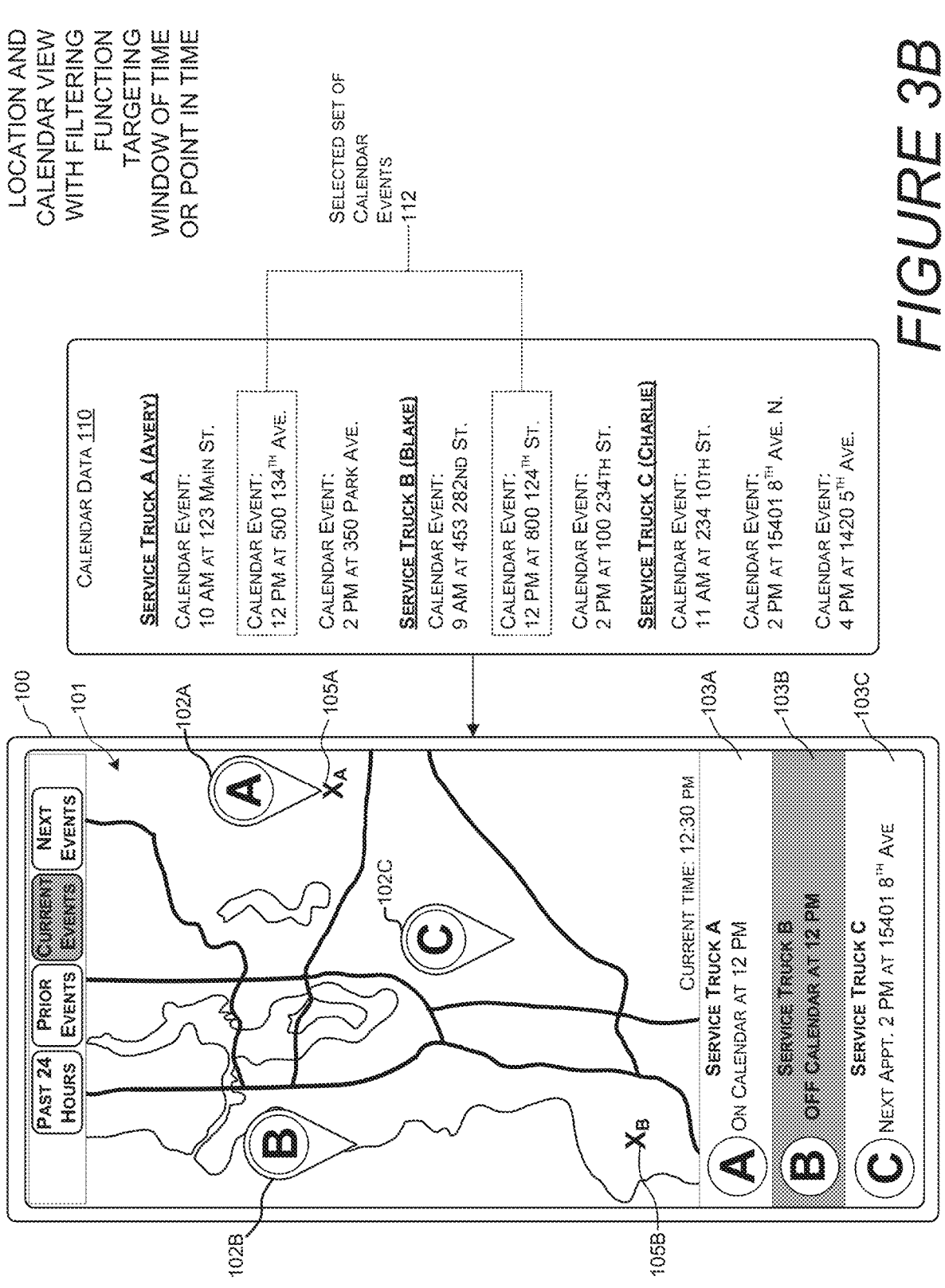

LOCATION AND CALENDAR VIEW WITH FILTERING FUNCTION TARGETING WINDOW OF TIME OR POINT IN TIME

SELECTED SET OF CALENDAR EVENTS 112

CALENDAR DATA 110

SERVICE TRUCK A (AVERY)
CALENDAR EVENT: 10 AM AT 123 MAIN ST.
CALENDAR EVENT: 12 PM AT 500 134TH AVE.
CALENDAR EVENT: 2 PM AT 350 PARK AVE.

SERVICE TRUCK B (BLAKE)
CALENDAR EVENT: 9 AM AT 453 282ND ST.
CALENDAR EVENT: 12 PM AT 800 124TH ST.
CALENDAR EVENT: 2 PM AT 100 234TH ST.

SERVICE TRUCK C (CHARLIE)
CALENDAR EVENT: 11 AM AT 234 10TH ST.
CALENDAR EVENT: 2 PM AT 15401 8TH AVE. N.
CALENDAR EVENT: 4 PM AT 1420 5TH AVE.

PAST 24 HOURS | PRIOR EVENTS | CURRENT EVENTS | NEXT EVENTS

CURRENT TIME: 12:30 PM

A  SERVICE TRUCK A
   ON CALENDAR AT 12 PM

B  SERVICE TRUCK B
   OFF CALENDAR AT 12 PM

C  SERVICE TRUCK C
   NEXT APPT. 2 PM AT 15401 8TH AVE 100
101
102A
105A
103A
103B
103C
102C
102B
105B

*FIGURE 3B*

LOCATION AND CALENDAR VIEW WITH FILTERING FUNCTION TARGETING WINDOW OF TIME OR POINT IN TIME

SELECTED SET OF CALENDAR EVENTS 112

CALENDAR DATA 110

SERVICE TRUCK A (AVREY)

CALENDAR EVENT:
10 AM AT 123 MAIN ST.

CALENDAR EVENT:
12 PM AT 500 134TH AVE.

CALENDAR EVENT:
2 PM AT 350 PARK AVE.

SERVICE TRUCK B (BLAKE)

CALENDAR EVENT:
9 AM AT 453 282ND ST.

CALENDAR EVENT:
12 PM AT 800 124TH ST.

CALENDAR EVENT:
2 PM AT 100 234TH ST.

SERVICE TRUCK C (CHARLIE)

CALENDAR EVENT:
11 AM AT 234 10TH ST.

CALENDAR EVENT:
2 PM AT 15401 8TH AVE. N.

CALENDAR EVENT:
4 PM AT 1420 5TH AVE.

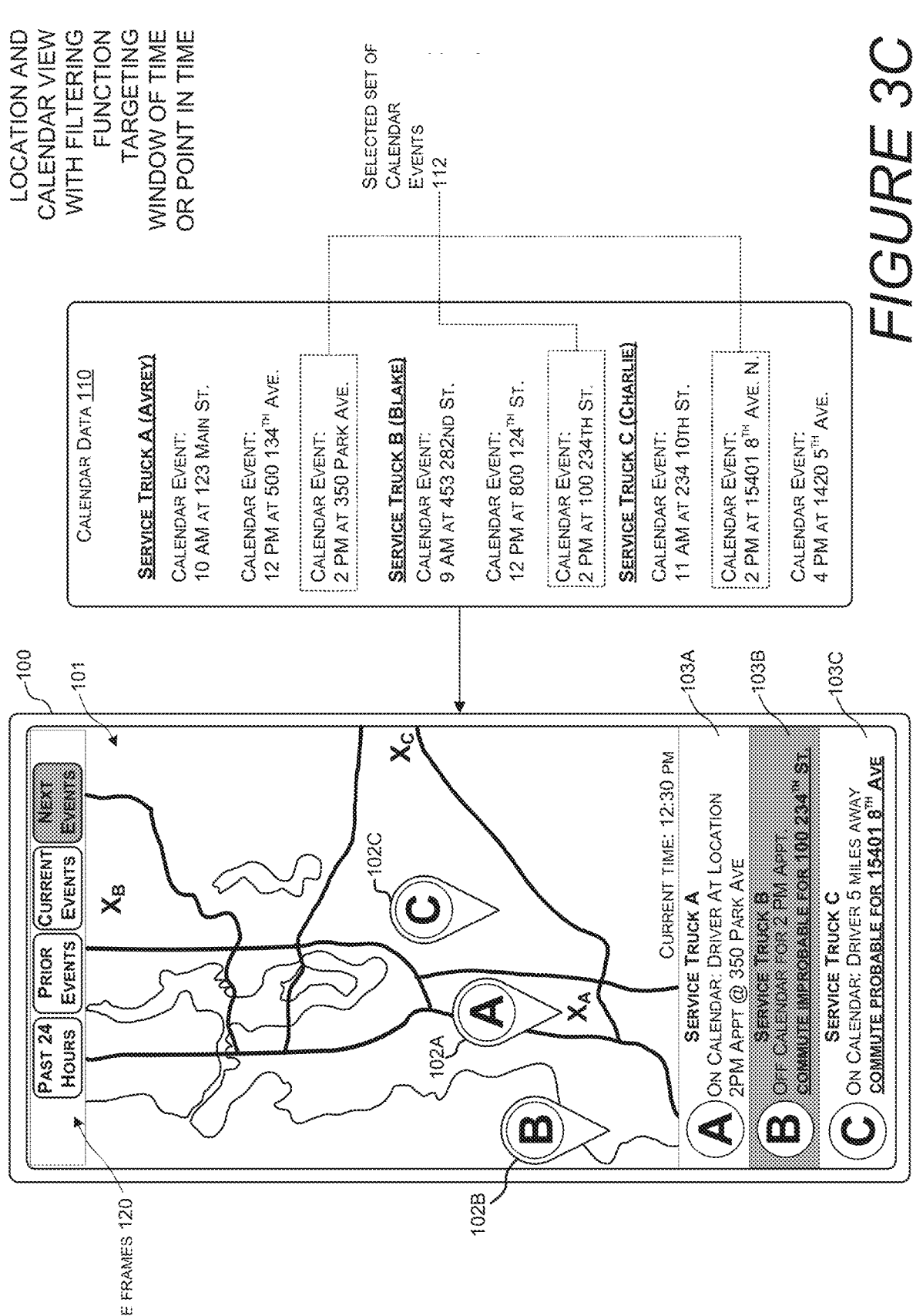

TIME FRAMES 120

PAST 24 HOURS | PRIOR EVENTS | CURRENT EVENTS | NEXT EVENTS 100
101

$X_B$ $X_C$ $X_A$ 102A
102B
102C

CURRENT TIME: 12:30 PM

SERVICE TRUCK A
ⒶON CALENDAR: DRIVER AT LOCATION 2PM APPT @ 350 PARK AVE — 103A

SERVICE TRUCK B
ⒷOFF CALENDAR: ON 2 PM APPT. COMMUTE IMPROBABLE FOR 100 234TH ST. — 103B

SERVICE TRUCK C
ⒸON CALENDAR: DRIVER 5 MILES AWAY COMMUTE PROBABLE FOR 15401 8TH AVE — 103C

FIGURE 3C

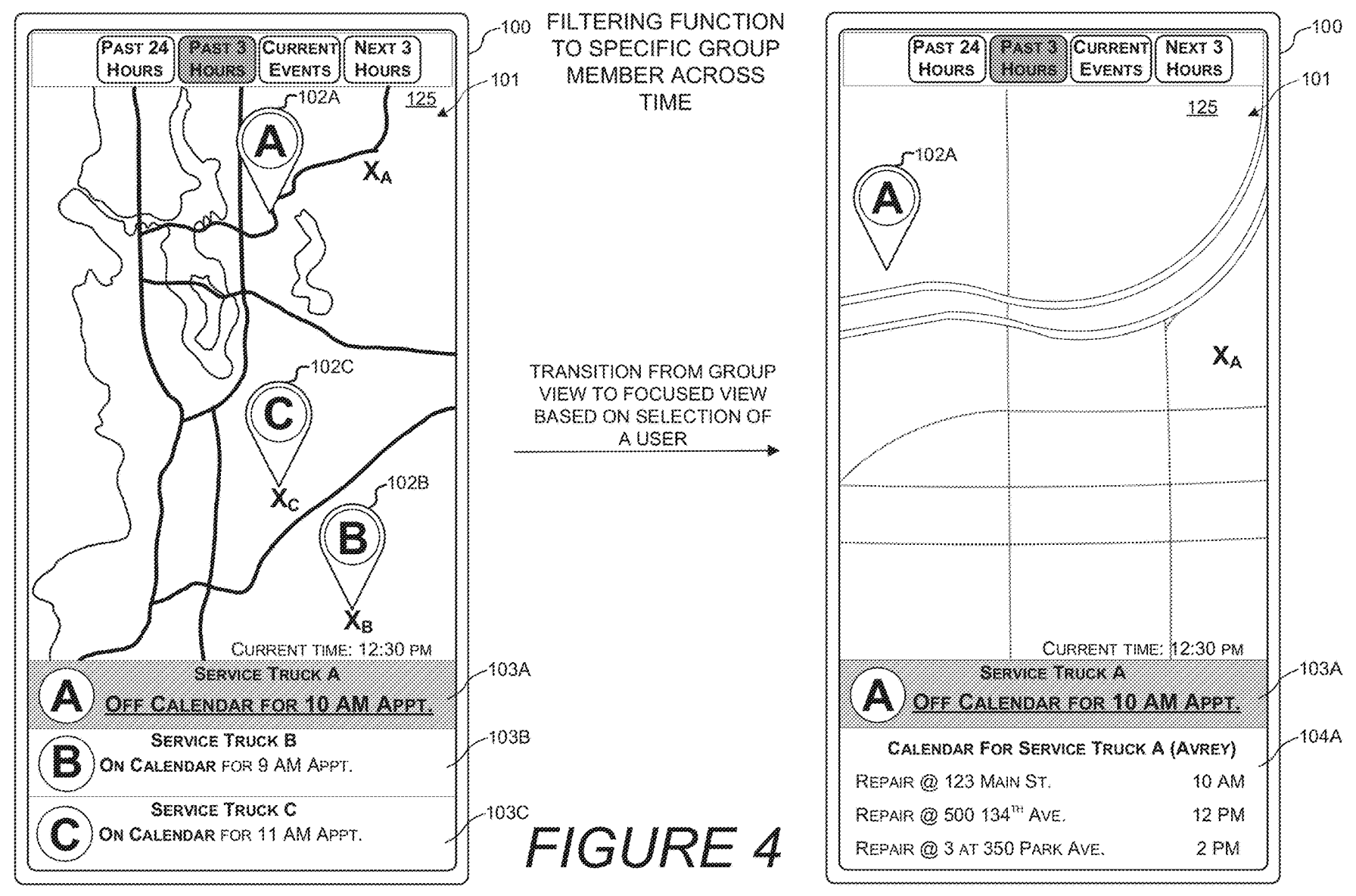

FILTERING FUNCTION TO SPECIFIC GROUP MEMBER ACROSS TIME

TRANSITION FROM GROUP VIEW TO FOCUSED VIEW BASED ON SELECTION OF A USER

FIGURE 4

PAST 24 HOURS | PAST 3 HOURS | CURRENT EVENTS | NEXT 3 HOURS

CURRENT TIME: 12:30 PM

SERVICE TRUCK A
OFF CALENDAR FOR 10 AM APPT.

CALENDAR FOR SERVICE TRUCK A (AVREY)

REPAIR @ 123 MAIN ST.     10 AM
REPAIR @ 500 134TH AVE.     12 PM
REPAIR @ 3 AT 350 PARK AVE.     2 PM

CURRENT TIME: 12:30 PM

SERVICE TRUCK A
OFF CALENDAR FOR 10 AM APPT.

SERVICE TRUCK B
ON CALENDAR FOR 9 AM APPT.

SERVICE TRUCK C
ON CALENDAR FOR 11 AM APPT.

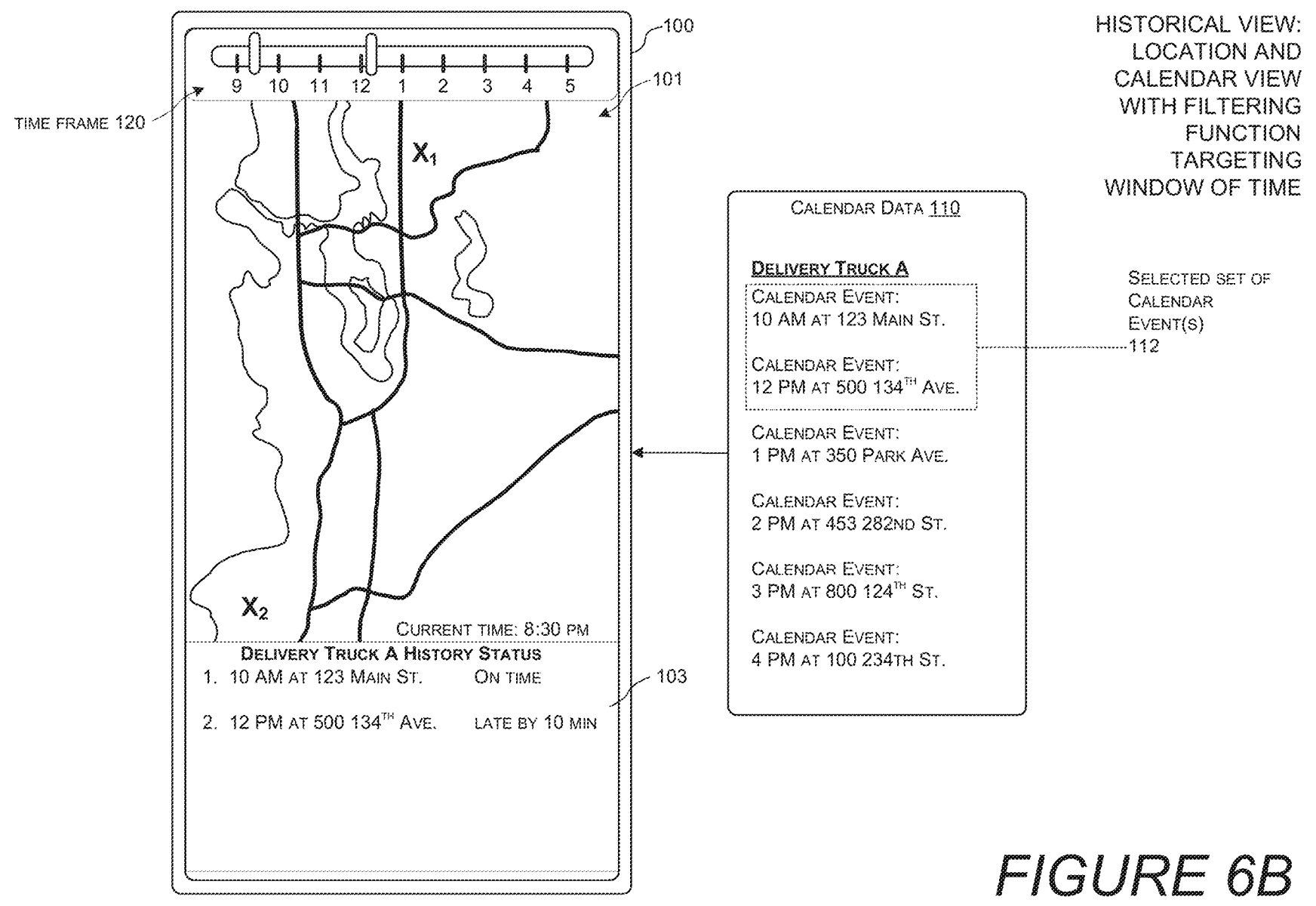

HISTORICAL VIEW:
LOCATION AND
CALENDAR VIEW
WITH FILTERING
FUNCTION
TARGETING
WINDOW OF TIME

SELECTED SET OF
CALENDAR
EVENT(S)
112

CALENDAR DATA 110

DELIVERY TRUCK A

CALENDAR EVENT:
10 AM AT 123 MAIN ST.

CALENDAR EVENT:
12 PM AT 500 134$^{TH}$ AVE.

CALENDAR EVENT:
1 PM AT 350 PARK AVE.

CALENDAR EVENT:
2 PM AT 453 282ND ST.

CALENDAR EVENT:
3 PM AT 800 124$^{TH}$ ST.

CALENDAR EVENT:
4 PM AT 100 234TH ST.

100

101

103

$X_1$ $X_2$ 9  10  11  12  1  2  3  4  5

CURRENT TIME: 8:30 PM

DELIVERY TRUCK A HISTORY STATUS

1. 10 AM AT 123 MAIN ST.        ON TIME 2. 12 PM AT 500 134$^{TH}$ AVE.    LATE BY 10 MIN

TIME FRAME 120

*FIGURE 6B*

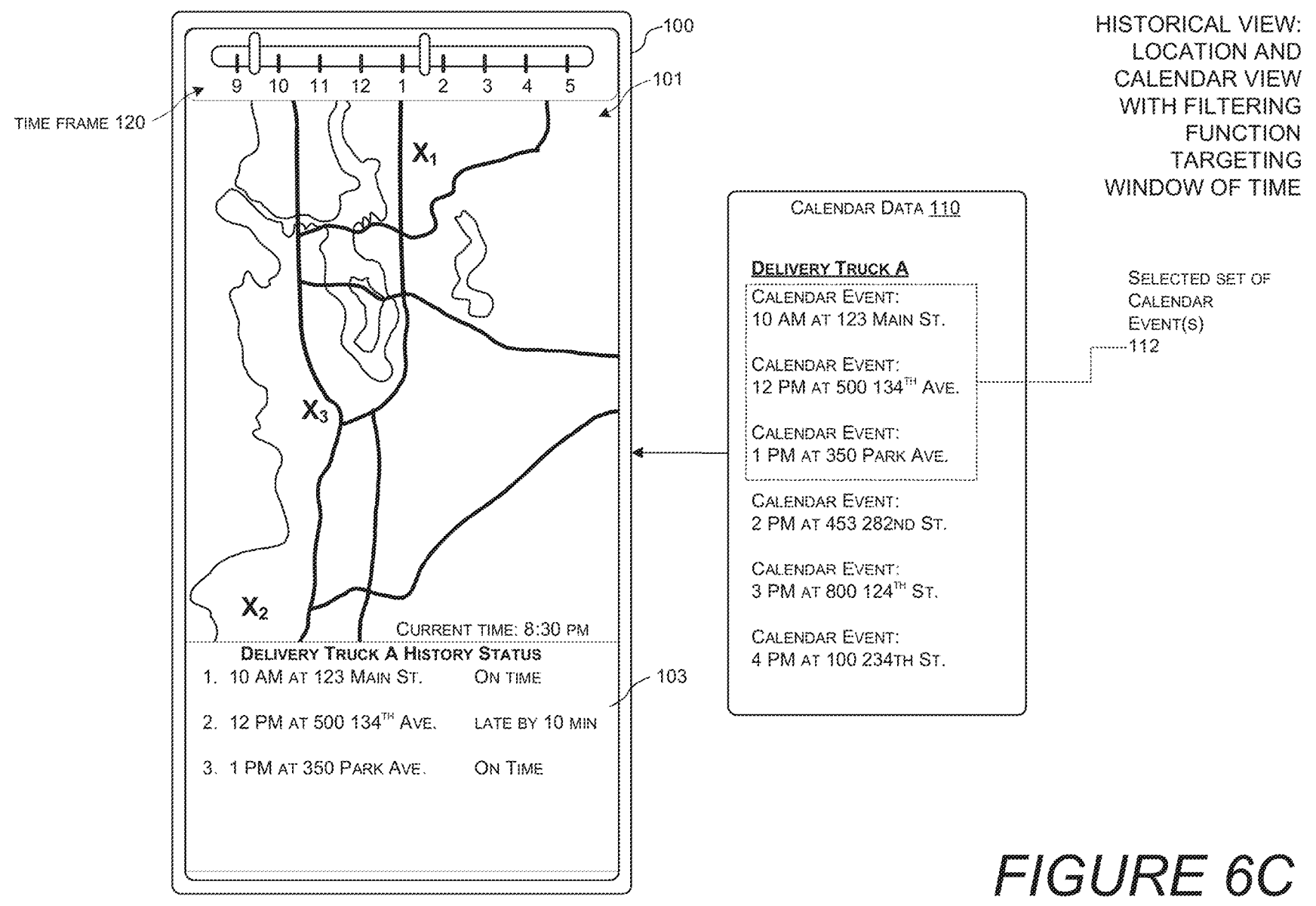

HISTORICAL VIEW:
LOCATION AND
CALENDAR VIEW
WITH FILTERING
FUNCTION
TARGETING
WINDOW OF TIME

SELECTED SET OF
CALENDAR
EVENT(S)
112

CALENDAR DATA 110

DELIVERY TRUCK A

CALENDAR EVENT:
10 AM AT 123 MAIN ST.

CALENDAR EVENT:
12 PM AT 500 134TH AVE.

CALENDAR EVENT:
1 PM AT 350 PARK AVE.

CALENDAR EVENT:
2 PM AT 453 282ND ST.

CALENDAR EVENT:
3 PM AT 800 124TH ST.

CALENDAR EVENT:
4 PM AT 100 234TH ST.

100
101
103

$X_1$
$X_3$
$X_2$ 9  10  11  12  1  2  3  4  5

TIME FRAME 120

CURRENT TIME: 8:30 PM

DELIVERY TRUCK A HISTORY STATUS

1. 10 AM AT 123 MAIN ST.          ON TIME 2. 12 PM AT 500 134TH AVE.        LATE BY 10 MIN 3. 1 PM AT 350 PARK AVE.          ON TIME

*FIGURE 6C*

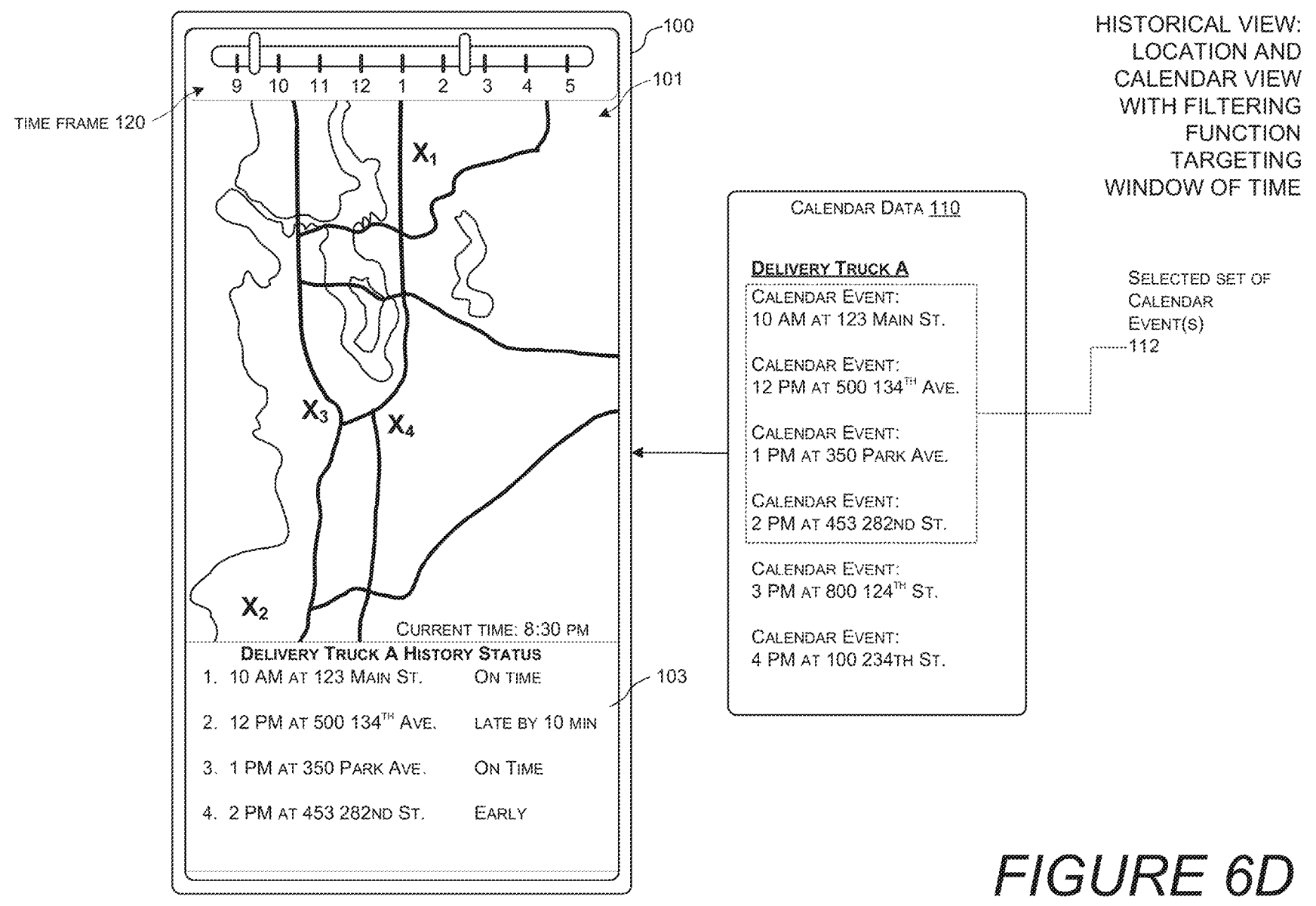

HISTORICAL VIEW:
LOCATION AND
CALENDAR VIEW
WITH FILTERING
FUNCTION
TARGETING
WINDOW OF TIME

SELECTED SET OF
CALENDAR
EVENT(S)
112

CALENDAR DATA 110

DELIVERY TRUCK A

CALENDAR EVENT:
10 AM AT 123 MAIN ST.

CALENDAR EVENT:
12 PM AT 500 134TH AVE.

CALENDAR EVENT:
1 PM AT 350 PARK AVE.

CALENDAR EVENT:
2 PM AT 453 282ND ST.

CALENDAR EVENT:
3 PM AT 800 124TH ST.

CALENDAR EVENT:
4 PM AT 100 234TH ST.

100
101
103

TIME FRAME 120

$X_1$
$X_4$
$X_3$
$X_2$

CURRENT TIME: 8:30 PM

DELIVERY TRUCK A HISTORY STATUS 1. 10 AM AT 123 MAIN ST.        ON TIME
2. 12 PM AT 500 134TH AVE.     LATE BY 10 MIN
3. 1 PM AT 350 PARK AVE.        ON TIME
4. 2 PM AT 453 282ND ST.        EARLY

FIGURE 6D

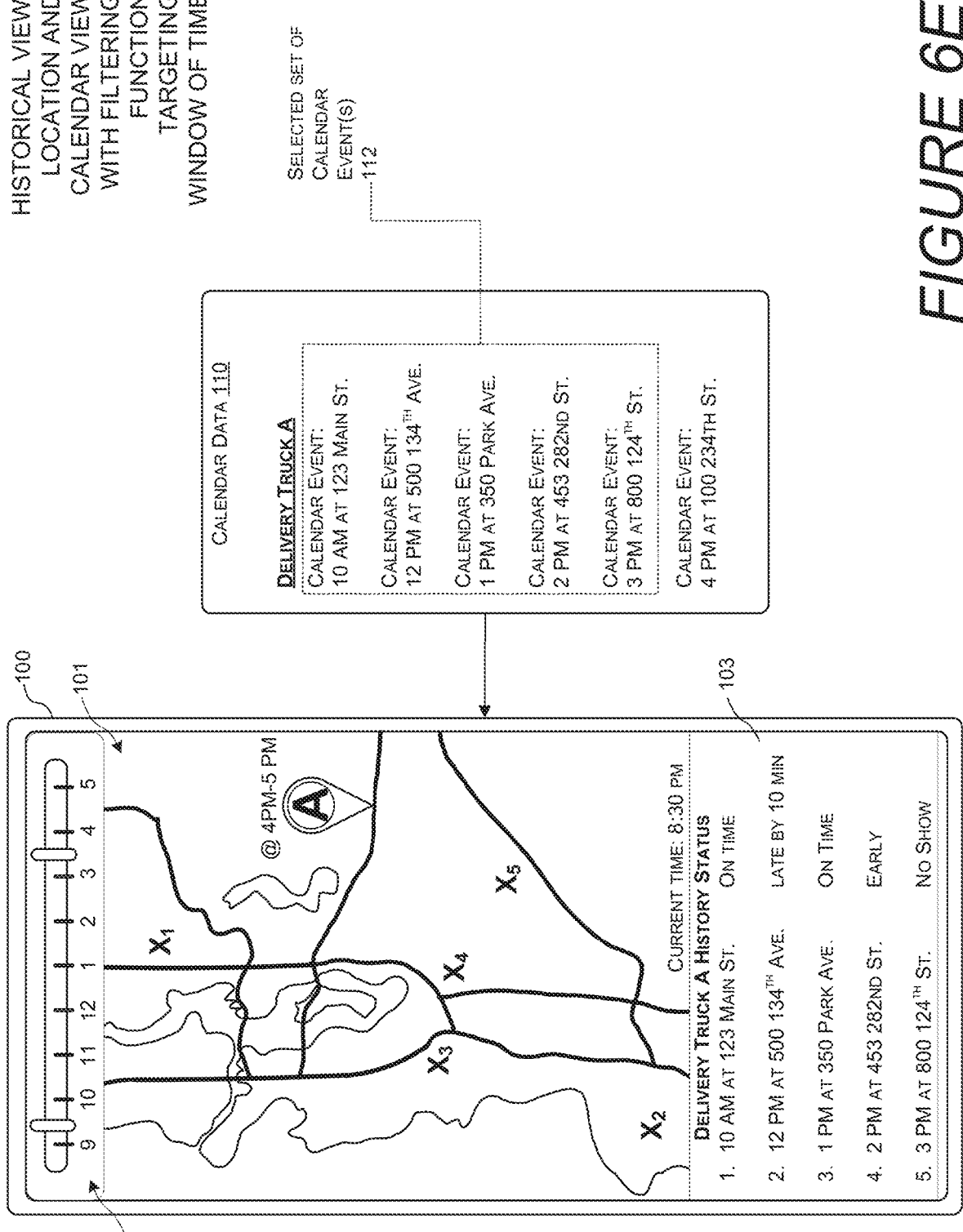

HISTORICAL VIEW:
LOCATION AND
CALENDAR VIEW
WITH FILTERING
FUNCTION
TARGETING
WINDOW OF TIME

SELECTED SET OF
CALENDAR
EVENT(S)
112

CALENDAR DATA 110

DELIVERY TRUCK A

CALENDAR EVENT:
10 AM AT 123 MAIN ST.

CALENDAR EVENT:
12 PM AT 500 134TH AVE.

CALENDAR EVENT:
1 PM AT 350 PARK AVE.

CALENDAR EVENT:
2 PM AT 453 282ND ST.

CALENDAR EVENT:
3 PM AT 800 124TH ST.

CALENDAR EVENT:
4 PM AT 100 234TH ST.

TIME FRAME 120

@ 4PM–5 PM

A

X₁
X₄
X₃
X₂
X₅

CURRENT TIME: 8:30 PM

DELIVERY TRUCK A HISTORY STATUS 1. 10 AM AT 123 MAIN ST.    ON TIME 2. 12 PM AT 500 134TH AVE.    LATE BY 10 MIN 3. 1 PM AT 350 PARK AVE.    ON TIME 4. 2 PM AT 453 282ND ST.    EARLY 5. 3 PM AT 800 124TH ST.    NO SHOW

*FIGURE 6E*

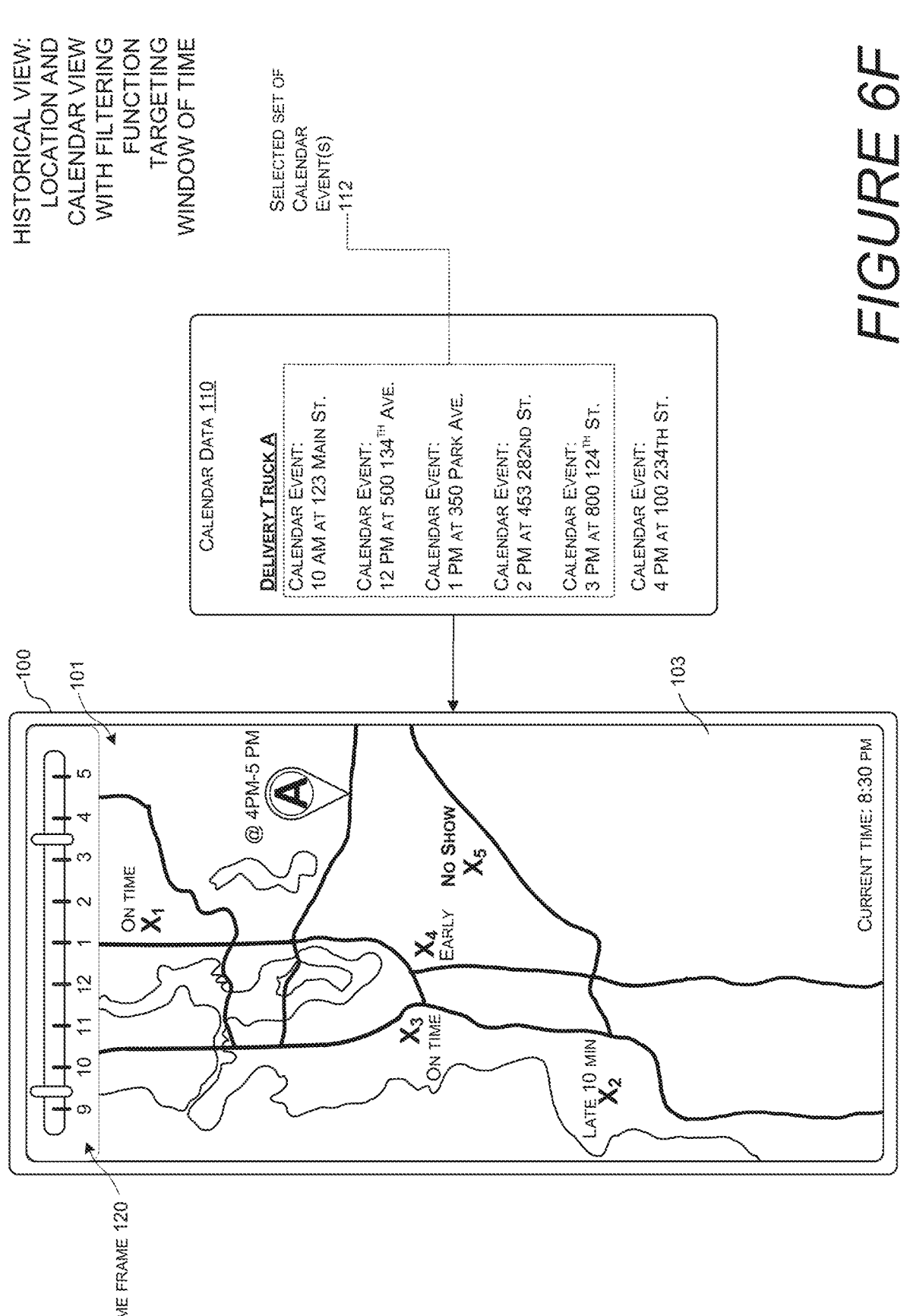

HISTORICAL VIEW:
LOCATION AND
CALENDAR VIEW
WITH FILTERING
FUNCTION
TARGETING
WINDOW OF TIME

SELECTED SET OF
CALENDAR
EVENT(S)
112

CALENDAR DATA 110

DELIVERY TRUCK A

CALENDAR EVENT:
10 AM AT 123 MAIN ST.

CALENDAR EVENT:
12 PM AT 500 134TH AVE.

CALENDAR EVENT:
1 PM AT 350 PARK AVE.

CALENDAR EVENT:
2 PM AT 453 282ND ST.

CALENDAR EVENT:
3 PM AT 800 124TH ST.

CALENDAR EVENT:
4 PM AT 100 234TH ST.

@ 4PM-5 PM

A

ON TIME
X₁

ON TIME
X₃

X₄
EARLY

LATE 10 MIN
X₂

NO SHOW
X₅

TIME FRAME 120

CURRENT TIME: 8:30 PM

*FIGURE 6F*

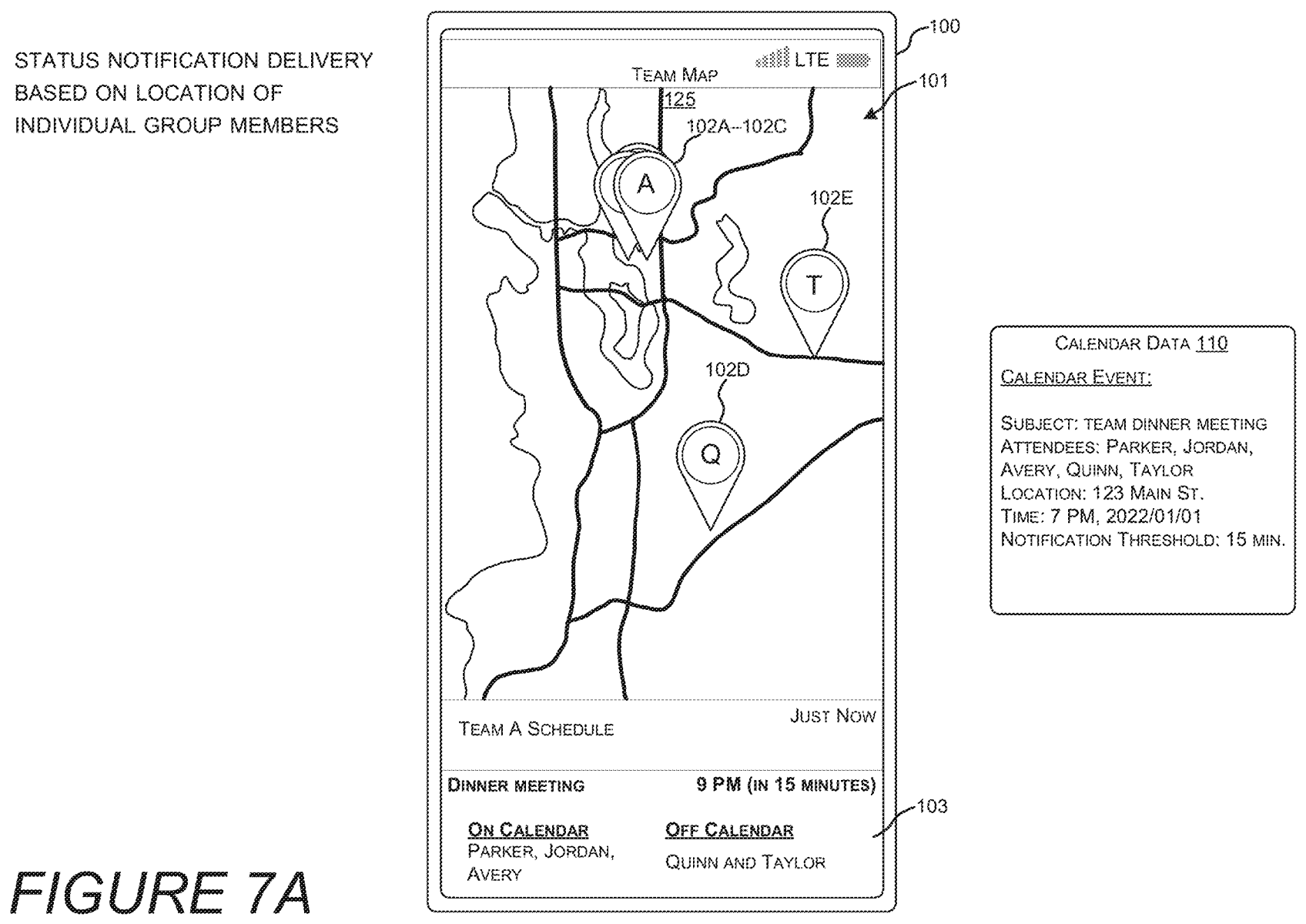

STATUS NOTIFICATION DELIVERY
BASED ON LOCATION OF
INDIVIDUAL GROUP MEMBERS

CALENDAR DATA 110

CALENDAR EVENT:

SUBJECT: TEAM DINNER MEETING
ATTENDEES: PARKER, JORDAN,
AVERY, QUINN, TAYLOR
LOCATION: 123 MAIN ST.
TIME: 7 PM, 2022/01/01
NOTIFICATION THRESHOLD: 15 MIN.

LTE

TEAM MAP
125
102A–102C

102E

102D

T

Q

A

JUST NOW

TEAM A SCHEDULE

DINNER MEETING                    9 PM (IN 15 MINUTES)

ON CALENDAR                       OFF CALENDAR
PARKER, JORDAN,                   QUINN AND TAYLOR
AVERY

*FIGURE 7A*

SCENARIO 1: NOTIFICATIONS SENT TO ALL
GROUP MEMBERS

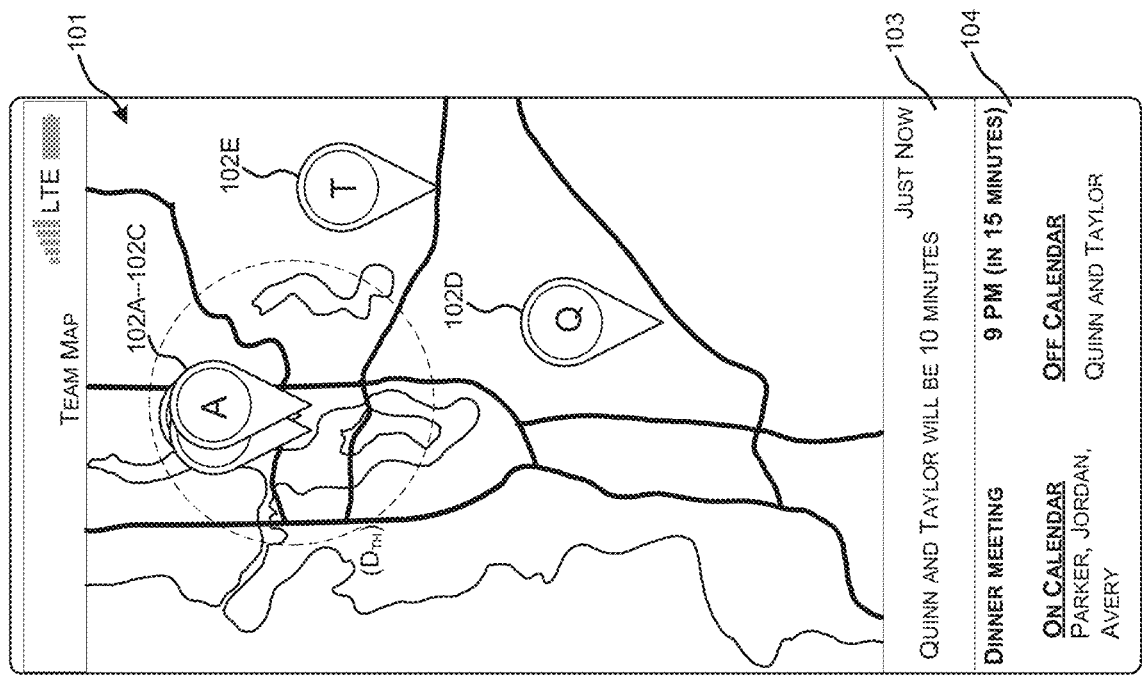
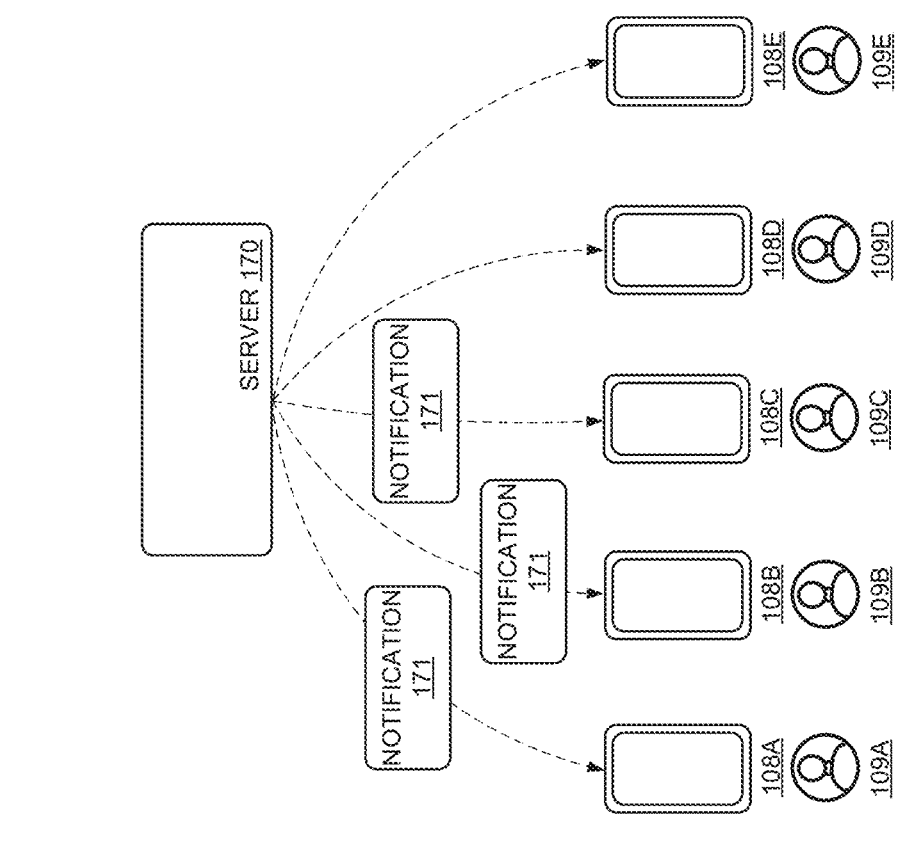
SCENARIO 2: NOTIFICATIONS ARE SENT TO GROUP MEMBERS WHO ARE WITHIN A PREDETERMINED DISTANCE
*FIGURE 7C*

SCENARIO 3: NOTIFICATIONS ARE SENT TO GROUP MEMBERS WHO ARE OUTSIDE A PREDETERMINED DISTANCE

GROUP MEETING CANCELATIONS

USER SENDS CANCELLATION

CALENDAR DATA 110

CALENDAR EVENT:

SUBJECT: TEAM DINNER MEETING
ATTENDEES: PARKER, JORDAN, AVERY, QUINN, TAYLOR
LOCATION: 123 MAIN ST.
TIME: 7 PM, 2022/01/01

CANCELLATION

CALENDAR DATA 110

CANCELLED CALENDAR EVENT:

SUBJECT: TEAM DINNER MEETING
ATTENDEES: PARKER, JORDAN, AVERY, QUINN, TAYLOR
LOCATION: 123 MAIN ST.
TIME: 7 PM, 2022/01/01

SERVER 170

CANCELLATION 172

108A 109A 108B 109B 108C 109C 108D 109D 108E 109E

SCENARIO 1: NOTIFICATIONS SENT TO ALL GROUP MEMBERS

CALENDAR MODIFICATION

CALENDAR DATA 110

CALENDAR EVENT:

SUBJECT: TEAM MEETING
ATTENDEES: PARKER, JORDAN,
AVERY, QUINN, TAYLOR
LOCATION: BURIEN CAMPUS
TIME: 7 PM, 2022/01/01

MODIFICATION
GENERATING
UPDATED CALENDAR
DATA

UPDATED CALENDAR DATA 110'

CALENDAR EVENT:

SUBJECT: TEAM MEETING
ATTENDEES: PARKER, JORDAN,
AVERY, QUINN, TAYLOR
LOCATION: BELLEVUE CAMPUS
TIME: 7 PM, 2022/01/01

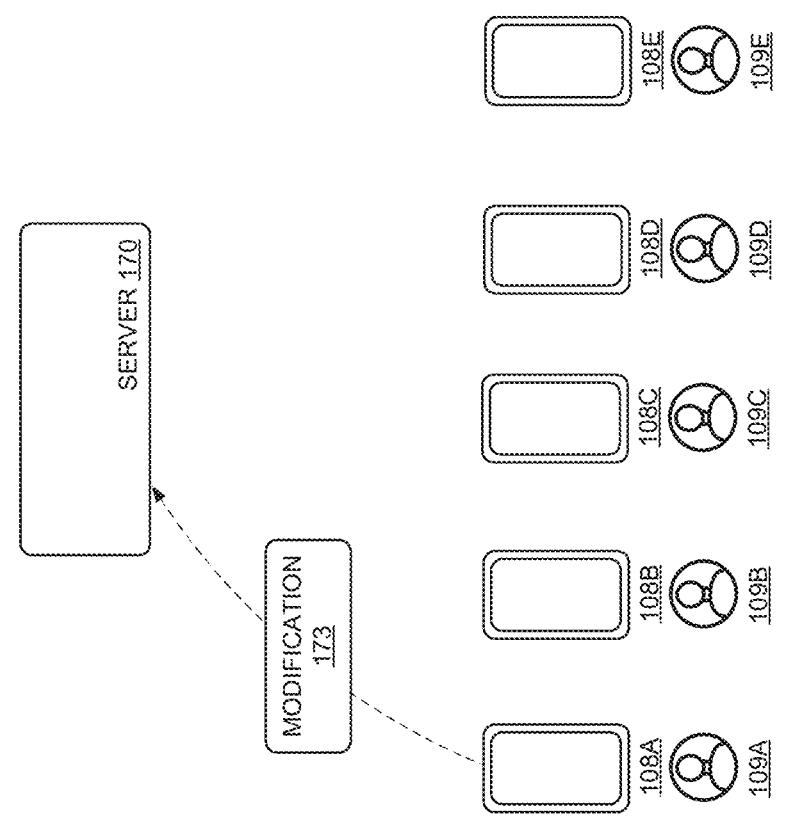

SERVER 170

MODIFICATION
173

USER SCENARIO 1

USER SCENARIO 2

LOCATION FLOW CONFIGURATION

LOCATION FLOW CONFIGURATION

LOCATION FLOW CONFIGURATION

GEOFENCE CONDITIONS BASED
ON CALENDAR DATA

SCENARIO 1: USER IS LOCATED OUTSIDE
DESIGNATED AREA, AND HAS CALENDAR
EVENT INDICATING A NEED TO BE OUTSIDE
THE DESIGNATED AREA

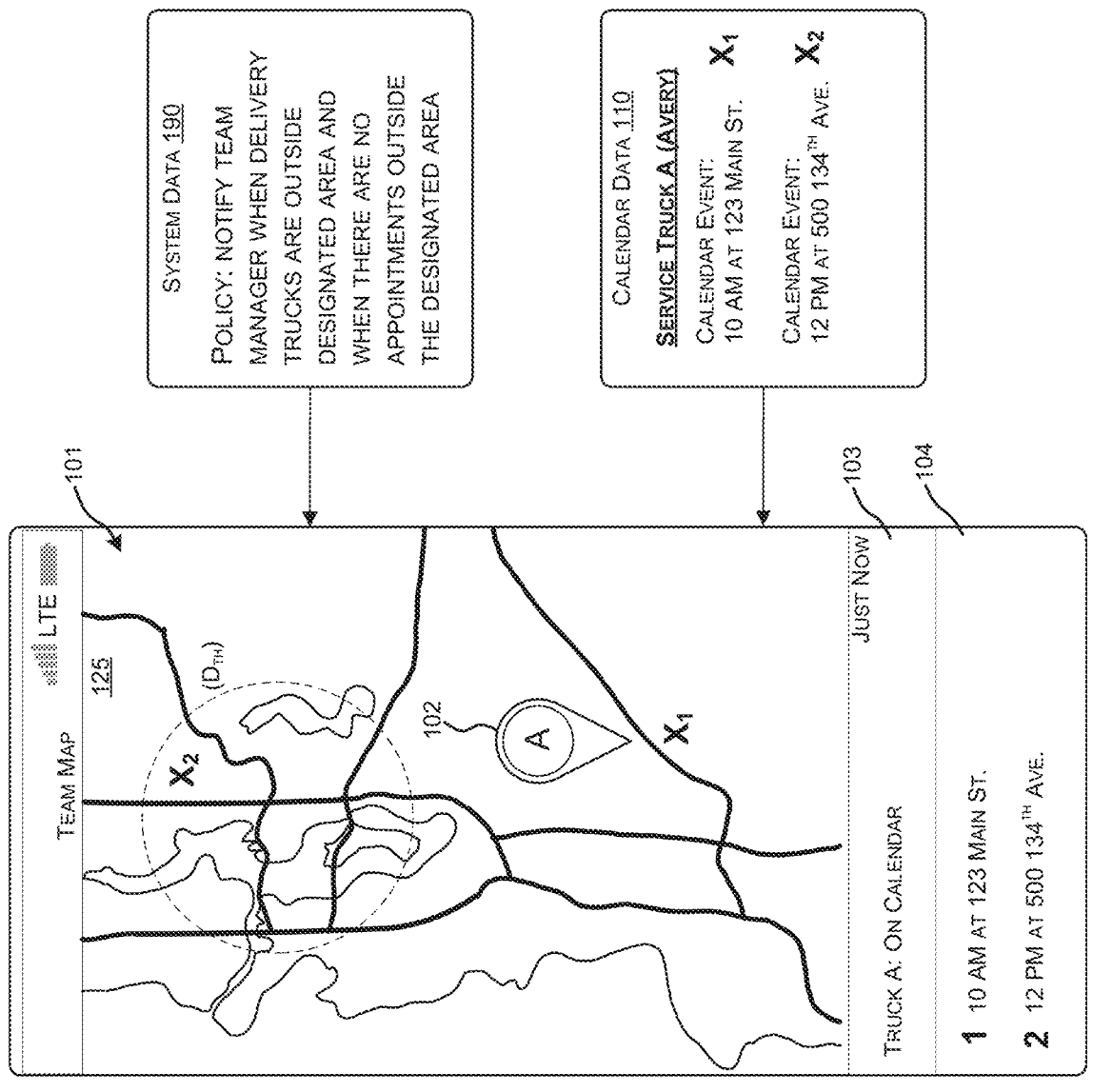

SYSTEM DATA 190

POLICY: NOTIFY TEAM
MANAGER WHEN DELIVERY
TRUCKS ARE OUTSIDE
DESIGNATED AREA AND
WHEN THERE ARE NO
APPOINTMENTS OUTSIDE
THE DESIGNATED AREA

CALENDAR DATA 110
SERVICE TRUCK A (AVERY)

CALENDAR EVENT:
10 AM AT 123 MAIN ST.         $X_1$

CALENDAR EVENT:
12 PM AT 500 134$^{TH}$ AVE.   $X_2$

TEAM MAP    ⚞LTE▒

125

($D_{TH}$)

$X_2$

102

A $X_1$

101

103    JUST NOW

104

TRUCK A: ON CALENDAR 1   10 AM AT 123 MAIN ST.

2   12 PM AT 500 134$^{TH}$ AVE.

*FIGURE 11A*

SYSTEM DATA 190

POLICY: NOTIFY TEAM MANAGER WHEN DELIVERY TRUCKS ARE OUTSIDE DESIGNATED AREA AND WHEN THERE ARE NO APPOINTMENTS OUTSIDE THE DESIGNATED AREA

CALENDAR DATA 110

SERVICE TRUCK A (AVERY)

CALENDAR EVENT: 10 AM AT 100 BELLEVUE WAY    $X_1$

CALENDAR EVENT: 12 PM 1 REDMOND ST    $X_2$

GEOFENCE NOTIFICATIONS BASED ON CALENDAR DATA

SCENARIO 2: USER IS LOCATED OUTSIDE DESIGNATED AREA, AND DOES NOT HAVE A CALENDAR EVENT INDICATING A NEED TO BE OUTSIDE THE DESIGNATED AREA

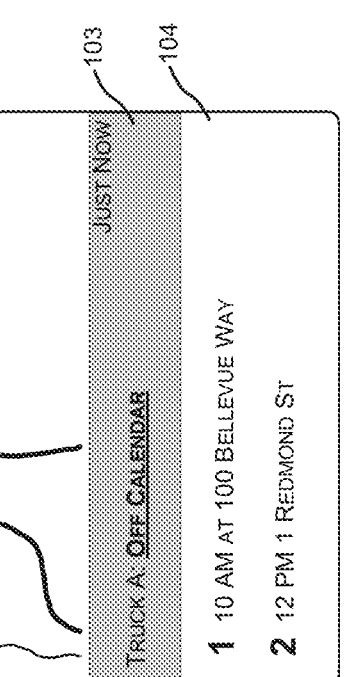

101

TEAM MAP    ⬛LTE ▨

$(D_{TH})$ $X_2$ $X_1$

102

A

103

104

JUST NOW

TRUCK A: OFF CALENDAR 1   10 AM AT 100 BELLEVUE WAY 2   12 PM 1 REDMOND ST

*FIGURE 11B*

SYSTEM DATA 190

POLICY: NOTIFY EVENT ORGANIZER WHEN INVITEES ARE WITHIN THE DESIGNATED AREA OR WITHIN THE THRESHOLD DISTANCE ($D_{TH}$) WITHIN 20 MINUTES OF THE EVENT START TIME.

CALENDAR DATA 110

QUINN'S CALENDAR

CALENDAR EVENT:

LOCATION: 7 PM AT 40 BELLEVUE WAY (MAIN OFFICE)
ATTENDEES: QUINN AND MANAGER (ORGANIZER)

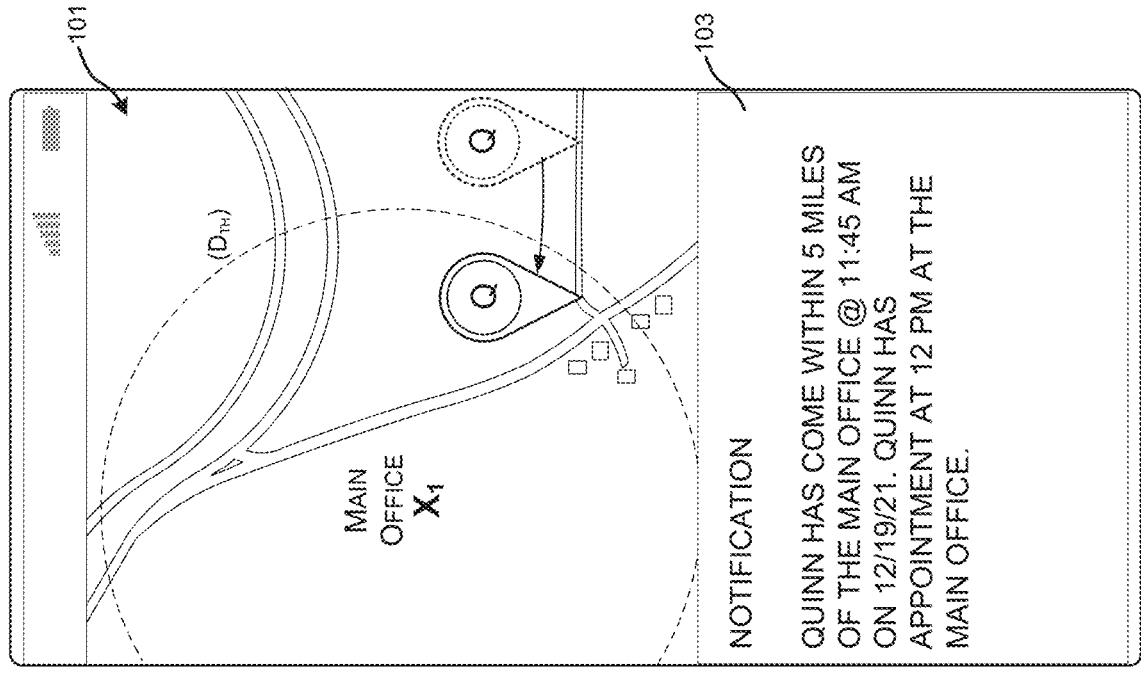

MAIN OFFICE $X_1$ $(D_{TH})$

NOTIFICATION

QUINN HAS COME WITHIN 5 MILES OF THE MAIN OFFICE @ 11:45 AM ON 12/19/21. QUINN HAS APPOINTMENT AT 12 PM AT THE MAIN OFFICE.

ENHANCED VIEWS AND NOTIFICATIONS OF LOCATION AND CALENDAR INFORMATION

BACKGROUND

Location tracking systems are becoming more ubiquitous with the advancement of mobile technologies. There are a number of features in existing location tracking systems that can be used for personal and business purposes. For instance, some systems can provide a display of a map showing the location of a person along with the location of family members, co-workers, friends, etc. Such systems allow people to coordinate with one another, meet at specific locations, locate children, etc.

Although there are many benefits with existing location tracking systems, some systems still have a number of limitations. For example, some existing systems provide very little context when showing a person's location. This limitation can make it difficult for a person who needs to coordinate a group that have a number of different meetings throughout the day. In one illustrative example, if a person is observing the location of their co-workers on a map, that person may need to perform a number of manual tasks to determine if each co-worker is at an appropriate location with respect to each co-worker's schedule. A person, such as a team manager, may need to access a calendar for each team member, note a time and a location for each event, and then compare that information with real-time location information to determine if each person is on schedule.

The requirement of such manual tasks can lead to a number of inefficiencies with respect to computing resources. In addition, the shortcomings of existing systems may cause a number of errors, as a user may be required to manually enter data and switch between different applications to obtain the required data. When it comes to large teams, which may include hundreds or thousands of people, manual tasks that are required by existing systems may make it very difficult, if not impossible, for any person to efficiently track the progress of a group with lengthy schedules with appointments in a large geographic area.

SUMMARY

The techniques disclosed herein provide enhanced views and notifications of user location and calendar information. A system can analyze and display real-time and historical location data of one or more people with their calendar data specifying scheduled events. A user interface showing the location of a person or a group of people arranged with details of each person's calendar allows computer users to readily determine if each person is at an appropriate location relative to their schedule. Graphical highlights or other types of notifications can also be generated when people are off calendar, e.g., not at an appropriate location with respect to a particular calendar event. In some configurations, the system can utilize a filtering function for targeting events in a specific window in time across all members of a group or a specific member across time. In such configurations, a device can select specific calendar events based on a predetermined time frame to enable a system to provide a focused view of contextually relevant user activity and a more targeted display of events.

As described in more detail below, the techniques disclosed herein provide a number of features that utilize and display location information and calendar information. For instance, notifications can be distributed to select group members based on one or more criteria. For instance, in a scenario where a number of group members are scheduled to meet at a particular location, certain types of notifications can be communicated to individual members that are at or near the location, and other types of notifications can be communicated to members that are beyond a threshold distance from the location. In some configurations, a group member, such as a meeting organizer, can receive a contextually targeted display of location information and calendar information. Such features allow users to view a broader context of a group's activity and schedules before taking action, e.g., determining which group members should receive broadcast notifications, determining the types of modifications that should be made to a calendar event, etc. The techniques disclosed herein also provide a number of user interface features for defining regions around locations specified in calendar events, and other user interface features for selecting specific time frames for the purposes of filtering calendar events.

It should be appreciated that the above-described subject matter may be implemented as a computer-controlled apparatus, a computer process, a computing system, or as an article of manufacture such as a computer-readable storage medium. Among many other benefits, the techniques described herein improve efficiencies with respect to a wide range of computing resources. For instance, human interaction with a device may be improved as the use of the techniques disclosed herein enable a user to view location information and calendar information to reduce the need for manual operations to obtain calendar information and location information from different applications. This improved interaction with a computing device improves other computing resources such as processor and network resources, e.g., users can work with one application and reduce manual steps which can ultimately reduce network traffic and computational cycles. Other technical effects other than those mentioned herein can also be realized from implementations of the technologies disclosed herein.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3A illustrates aspects of a process involving a filtering function to identify selected calendar events across a time frame and a user interface showing the location of group members relative to locations of the selected calendar events.

FIG. 3B illustrates aspects of a process involving a filtering function to identify selected calendar events across another time frame and a user interface showing the location of group members relative to locations of the selected calendar events.

FIG. 3C illustrates aspects of a process involving a filtering function to identify selected calendar events across yet another time frame and a user interface showing the location of group members relative to locations of the selected calendar events.

FIG. 4 illustrates a transition between a first user interface showing locations and calendar events of a group to a second user interface showing the location and calendar events of an individual.

FIG. 6B illustrates the user interface of FIG. 6A, where a user has selected a second time frame for the filtering function to identify historical calendar events across time, the user interface showing a historical view of interactions with locations associated with the selected calendar events.

FIG. 6C illustrates the user interface of FIG. 6A, where a user has selected a third time frame for the filtering function to identify historical calendar events across time, the user interface showing a historical view of interactions with locations associated with the selected calendar events.

FIG. 6D illustrates the user interface of FIG. 6A, where a user has selected a fourth time frame for the filtering function to identify historical calendar events across time, the user interface showing a historical view of interactions with locations associated with the selected calendar events.

FIG. 6E illustrates the user interface of FIG. 6A, where a user has selected a fifth time frame for the filtering function to identify historical calendar events across time, the user interface showing a historical view of interactions with locations associated with the selected calendar events.

FIG. 6F illustrates another example user interface that can be utilized to select a time frame for a filtering function to identify selected calendar events across time, the user interface showing a map of historical interactions with locations associated with the selected calendar events.

FIG. 7A illustrates a first user interface that can be used to provide status notifications to select group members based on the location of each group member.

FIG. 7C illustrates aspects of a process for distributing notifications to select members of a group located within a predetermined distance from a location identified in a calendar event.

FIG. 9A illustrates aspects of a process for modifying original calendar data to generate updated calendar data.

FIG. 11A illustrates a system comprising a policy that enables a system to generate notifications when a group member leaves the region without a calendar event outside of the region.

FIG. 11B illustrates an example scenario where a system generates a notification when a group member leaves the region without a calendar event outside of the region.

FIG. 13 illustrates an example scenario where a system notifies an event organizer that a person comes within a certain distance of the event.

DETAILED DESCRIPTION

The following Detailed Description provides a number of examples of a system that can analyze and display real-time and historical location data with calendar data specifying event details. As will be described in more detail below, a computing device can generate a user interface displaying the location of a person or a group of people concurrently with aspects of each person's calendar. This combination of information in a single user interface allows computer users to readily determine if people are at appropriate locations relative to their schedule. Graphical highlights or other types of notifications can also be generated when people are "off calendar" or "on calendar" without requiring users to perform manual steps to access location information and calendar information from multiple computing resources.

Figure 1A:
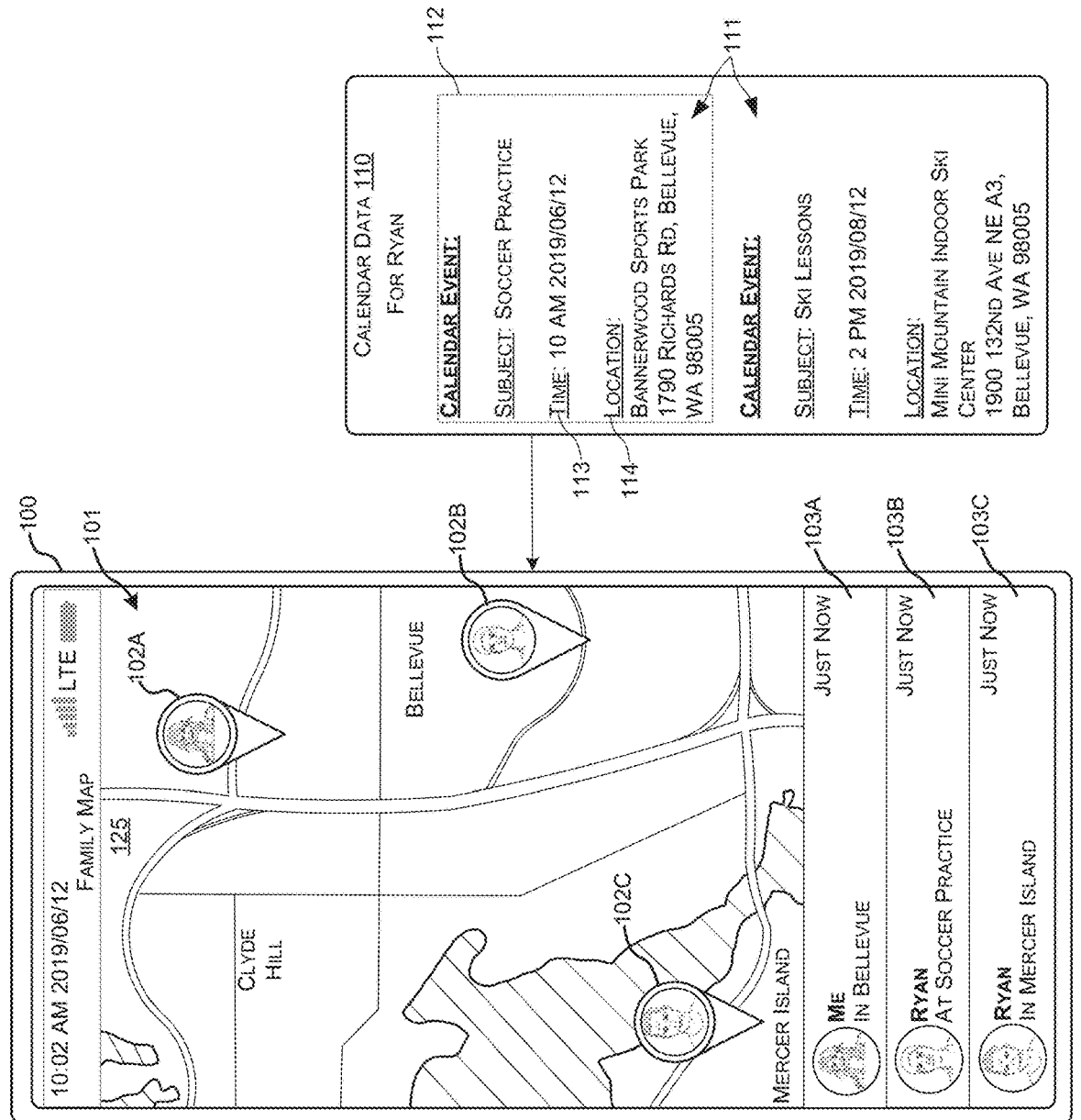
FIG. 1A illustrates a user interface configured to display the location of members of a group and status indicators describing a relationship between each member's location and event locations specified in their associated schedules.

FIGS. 1A-1D illustrate a number of user interfaces 101 providing user location information, calendar information, and different forms of status indicators. Specifically, FIG. 1A illustrates a device 100 displaying a user interface 101 that includes a geographic map 125 and a number of graphical elements 102A-102C indicating the location of a number of people. The user interface 101 also comprises a number of status indicators (103A-103C) provide a description of each person's location relative to a current calendar event. In this example, calendar data 110 received by the device 100 indicates that the second person, Ryan, is scheduled to be at soccer practice at a designated location 114. Location data received by the device 100 also indicates that the second person is physically located at the location specified in the calendar event 112. Based on the location information and calendar information, the device 100 generates and displays a status indicator 103 indicating that Ryan is currently at soccer practice. In such embodiments, details from a calendar event, such as a subject description and an event time, can be utilized by the device 100 to describe a person's location relative to a selected calendar event. For instance, instead of identifying the person's location, the device can describe a person's location based on the subject of a calendar event, e.g., Ryan is at soccer practice.

A device can filter the calendar data 110 to identify a selected calendar event 112 from the plurality of events 111. A selected calendar event 112 can include any calendar event that has an event time 113 that coincides with a particular time, e.g., a current time, or a time frame. In some embodiments, a selected calendar event 112 can include any calendar event 111 that has an event time 113 that meets one or more criteria, e.g., the event time 113 is within a predetermined time frame, etc. In this example, although the second person, Ryan, has two calendar events, the status indicator only describes the calendar event having a time that overlaps with the current time. Also, in this example, since the other people do not have calendar events that coincide with the current time, the status indicator 103 for the other users can provide a general description of the person's current location, e.g., a city name, facility name, etc.

Figure 1B:
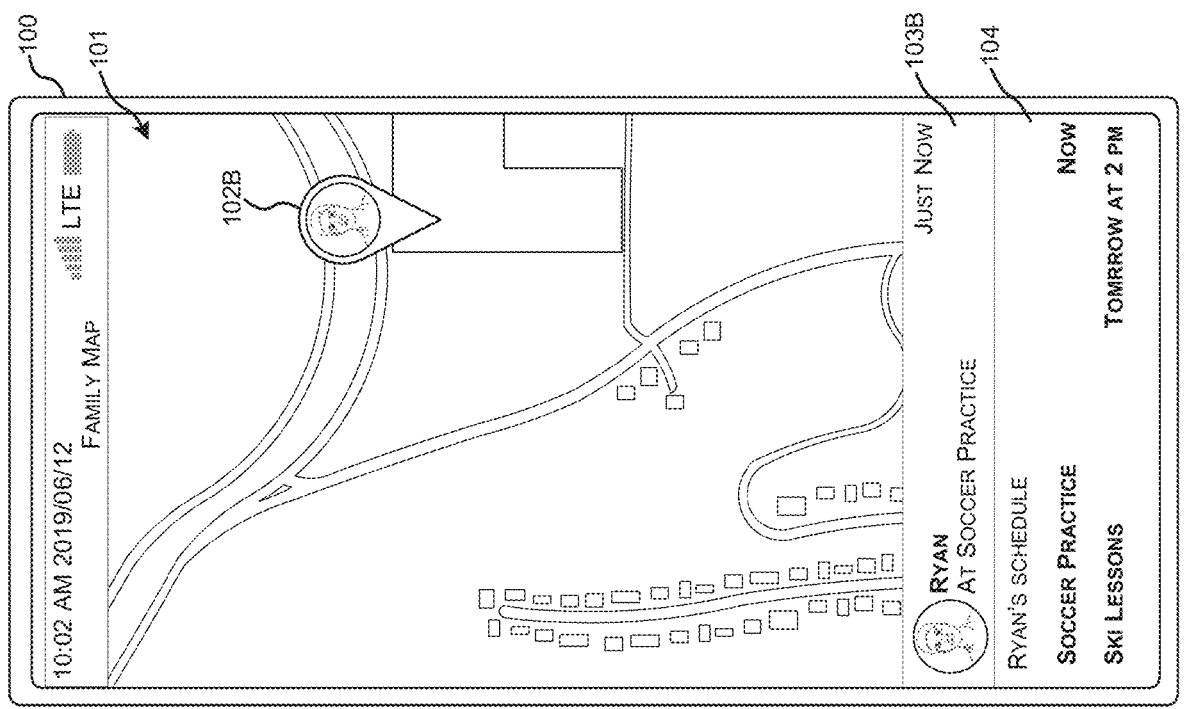
FIG. 1B illustrates a user interface configured to display location information and calendar information for a selected group member.

FIG. 1B illustrates a user interface 101 that may result from the selection of a person from the multi-person map display shown in FIG. 1A. In this example, the device 100 displays more specific details regarding a selected person's location and calendar data. A graphical element 102A indicating the location of the selected person, e.g., second user, Ryan, is displayed on a map along with a status indicator 103 describing the second person's location relative to a calendar event, e.g., "Ryan" is "at soccer practice." In addition, the user interface 101 includes a calendar summary 104. In some configurations, the calendar summary 104 can include details of the calendar events that are scheduled within a predetermined time frame. The details of the calendar events can include a subject of an event, notes associated with an event, an address of an event, a time of an event, listed attendees of an event, or any other data that is stored in association with a calendar event.

Figure 1C:
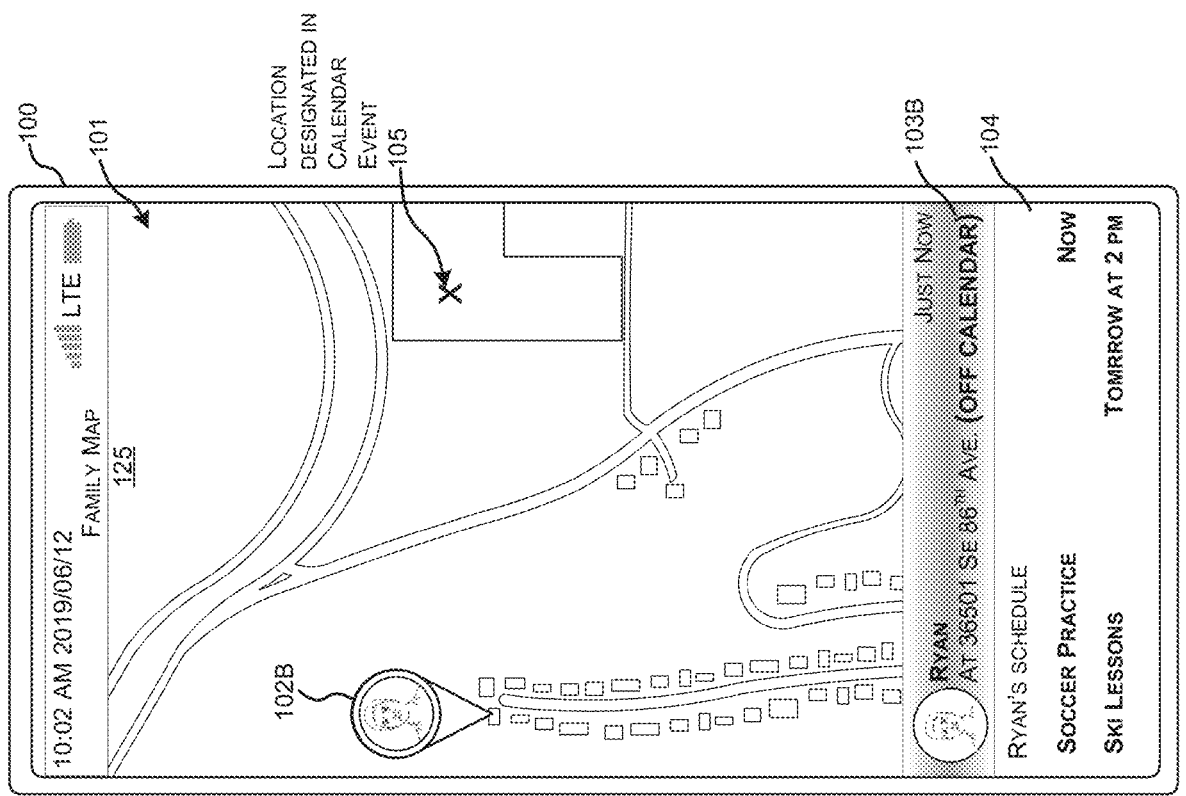
FIG. 1C illustrates a user interface configured to display location information, calendar information, and a status indicator for a person.

The predetermined time frame used for selecting calendar events to be analyzed and displayed can be defined by a user input as described herein. For instance, a user may indicate they wish to view the activity of users having events scheduled within thirty minutes of a current time. The predetermined time frame can also be determined by one or more factors, such as an event type, a location of an event, a traffic level near the location of an event, a priority level of an event, a priority level of people invited to an event, etc. For instance, the predetermined time frame can include a 24 hour period from a current time for events associated with family members or a 3 hour period from a current time for events associated with co-workers. As shown in FIG. 1B, the device shows all of Ryan's events within FIG. 1C illustrates an example user interface showing a person's location information, calendar information, and a status indicator 103B that includes a highlighted graphical element to bring focus to a changed user scenario. To illustrate aspects of this feature, the user interface is based on location information indicating that Ryan is at a physical location that does not meet one or more criteria with respect to the location indicated in Ryan's current calendar event. The device can display the highlighted graphical element indicating that the Ryan is "off calendar" when Ryan's physical location does not meet one or more criteria with respect to the location indicated in Ryan's current calendar event. The device can generate other types of notifications when such conditions are detected. For instance, the device 100 can generate sounds, send messages, or highlight other aspects of the map. In some configurations, the device 100 can automatically zoom into focused areas of the map to illustrate a person's location when they are "off calendar."

Figure 1D:
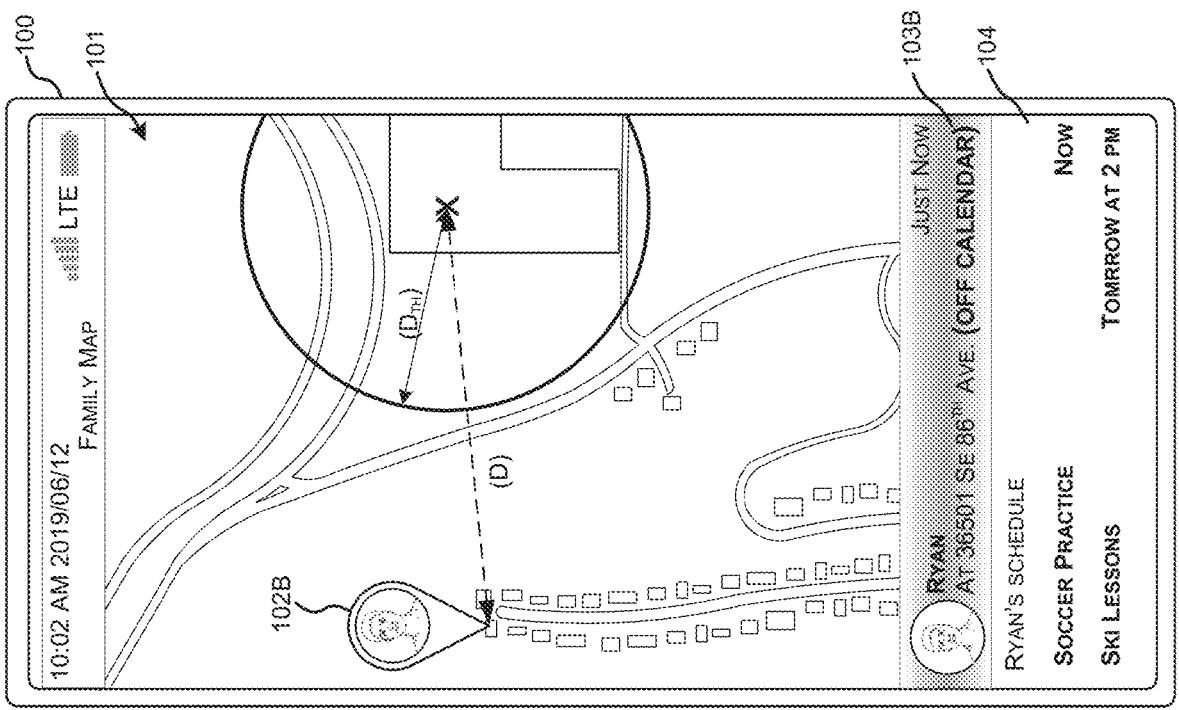
FIG. 1D illustrates aspects of a process for determining a status indicator.

FIG. 1D illustrates aspects of a process for determining a status indicator based on a person's location. In some configurations, a person can be determined to be off calendar when their physical location is beyond a threshold distance (Dth) from the location indicated in a calendar event. In this example, the device 100 detects that Ryan is at a physical location, 36501 SE 86th Ave, which is at a distance (D) that is greater than the threshold distance (Dth) from the location (x) specified in the calendar event. In response to the detection of this scenario, the status indicator 103B is configured with text indicating that the person is off calendar. Properties of the status indicator, e.g., text size, color, line thickness, are also configured to bring focus to a status indicator describing that a person is off calendar. These examples are provided for illustrative purposes and are not to be construed as limiting. It can be appreciated that any other type of graphical element or other graphical highlights can be utilized to bring focus to any particular user activity.

Figure 2A:
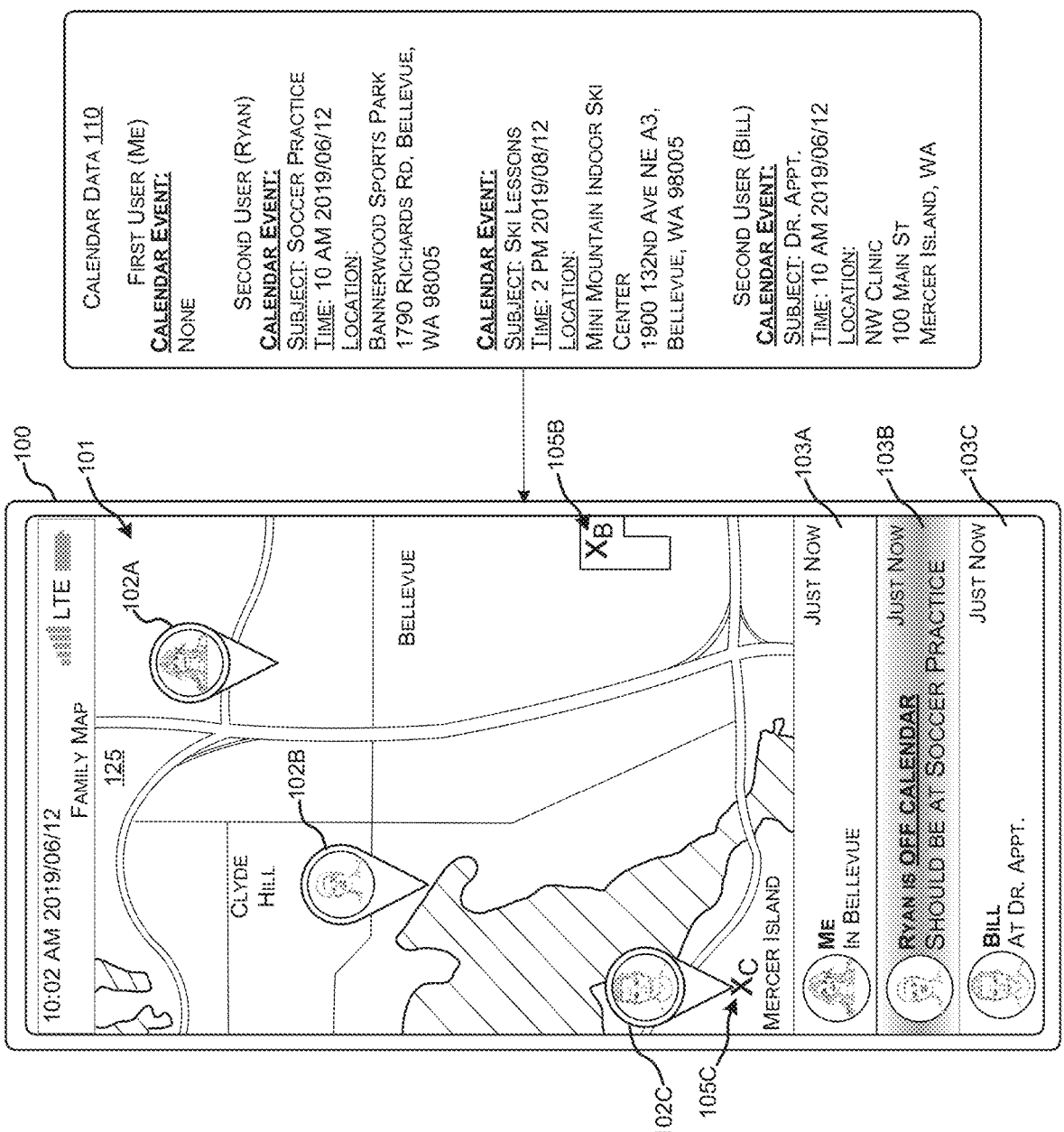
FIG. 2A illustrates a user interface configured to display location information, calendar information, and a status indicator for a number of group members.
Figure 2B:
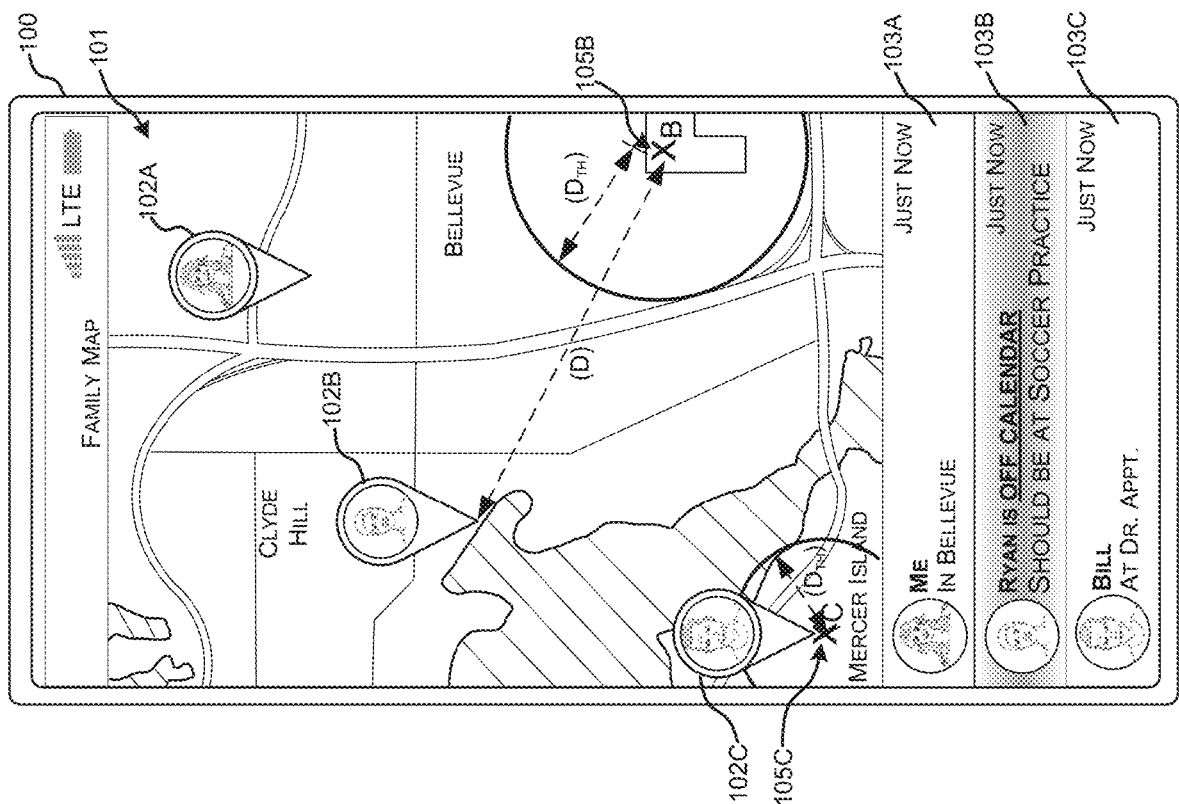
FIG. 2B illustrates aspects of a process for determining a status indicator for at least one group member.

FIGS. 2A-2B illustrate an example of a user interface showing the location of group members and status indicators for each of the group members. To illustrate features of this embodiment, sample calendar data 110 defining a number of calendar events for each person is provided. Based on the calendar events defining a time and a location, the device can arrange location markers 105 within a displayed map 125 to indicate the location of each event specified in each person's calendar. In some configurations, the device can filter the calendar events to display the location of calendar events having a time that meet one or more criteria, e.g., event times within a predetermined time frame. In this example, the selected calendar events have an event time that are within a threshold period, e.g., 12 hours, from a current time. The user interface may filter the display of location markers for events that do not meet the selection criteria. As shown in FIG. 2A, the display includes a first location marker 105B (XB) showing the location for the second user's appointment, and a second location marker 105C (XC) showing the location for the third user's appointment. The location markers 105 showing the location of each event can be displayed concurrently with graphical elements 102 showing the location for each group member.

FIG. 2A illustrates that the user interface also includes a status indicator 103 for each group member. In this example, the status indicator 103A for the first user indicates the physical location for the first user since the first user does not have a calendar event. The status indicator 103B for the second user indicates that Ryan is "off calendar," e.g., that Ryan is not at an appropriate location relative to his schedule. The status indicator 103C for the third user indicates that Bill is on calendar, e.g., that Bill is at an appropriate location relative to his schedule. The status indicators can be generated based on an analysis of each user's location relative to the location of an associated calendar event. In some configurations, a status indicator can be generated when a person's physical location meets one or more criteria with respect to a location in an associated calendar event. As shown in FIG. 2B, in some configurations, the criteria can be based on a distance between a person's physical location and an event location.

FIG. 2B illustrates aspects of a process for determining a location status indicator for at least one group member. In this illustrative example, a person can be determined to have a particular status, e.g., off calendar, when their physical location is beyond a threshold distance (Dth) from the location indicated in a calendar event. As shown, the physical location of the second user (indicated by graphical element 102B) is at a distance (D) that is greater than a threshold distance (Dth) with respect to a location (XB) defined in the second person's calendar event. When such a scenario is detected, the device can generate a notification indicating that the second person is off calendar. The system can also generate a recommendation indicating where they should be, e.g., Ryan should be at soccer practice. The recommendation can be based on information from the calendar data. Also, in this example, the physical location of the third user (indicated by graphical element 102C) has a distance that is less than a threshold distance (Dth) with respect to a location defined in the third person's corresponding calendar event. When such a scenario is detected, the device can generate a notification indicating that the third person is on calendar. The threshold distances (Dth) can be the same for each user or different for each user depending on one or more factors. For instance, a threshold distance (Dth) may be a first distance for a particular type of person, e.g., based on a position, role, permissions, priority, etc. At the same time, a threshold distance (Dth) may be a second distance for another person based on one or more characteristics of that person. In other embodiments, a threshold distance (Dth) may be a first distance for a particular type of event, such as a doctor's appointment, and a second distance for another type of event, e.g., a sporting event.

Although the examples herein refer to calendar data, it can be appreciated that the techniques disclosed herein can utilize any contextual data indicating a person's schedule. In some configurations, the calendar data can be received from a calendar database or other resources, including a ticketing database, flight schedule database, purchase order database, or other resources indicating a location at a time for an event. In addition, other documents, such as emails, instant messages, text messages, transcripts, or other data can be analyzed to interpret a schedule for particular person or a group of people.

As summarized herein, the techniques disclosed herein can utilize a filtering function for targeting a specific window in time across all members of a group or a specific member across time. In such configurations, a device can select specific calendar events based on a given time frame and/or a specific person to allow for a more focused view that provides contextually relevant views of user activity. FIGS. 3A-3C illustrate an example of such features.

For illustrative purposes, FIG. 3A shows a sample set of calendar data 110 defining a number of events for three group members. As shown, this example involves a group of service drivers 109 for a company: Service Truck A (Avery), Service Truck B (Blake), and Service Truck C (Charlie). Each driver has three calendar events 111 and each calendar event 111 specifies an event time 113 and an event location 114.

The device can filter the calendar data 110 to identify a selected set of calendar events 112 from the plurality of events 111. The selected set of calendar events 112 can include the calendar events specifying event times that are within a predetermined time frame 120. The predetermined time frame 120 can be determined by the use of a number of factors. In this illustrative example, the time frame 120 is based on a user input. Specific to FIG. 3A, a time frame 120 can be selected in response to a user input that indicates a time frame 120, which may be selected from a number of preset time frames. This example is provided for illustrative purposes and is not to be construed as limiting. It can be appreciated any form of input, including voice input or a gesture input can be utilized to select a time frame.

To illustrate aspects of the filtering feature, the example of FIG. 3A shows that the user of the device 100 has selected the first time frame, "Prior Events," such as a morning work shift. As a result of this selection, the device 100 identifies the selected set of calendar events 112, which can include the calendar events specifying event times that are within the selected time frame 120. For illustrative purposes, consider a scenario where a selection of the Prior Events option causes the device to select calendar events that have a start time between 8 AM and 11:30 AM, e.g., Avery's 10 AM appointment, Blake's 9 AM appointment, and Charlie's 11 AM appointment.

The device can then display a user interface 101 that includes a geographic map and a number of graphical elements 102A-102C indicating the physical location of the group members are associated with the selected calendar events. The physical location of each driver 109 can be based on historical location data 115 received from remote devices 108. The display may show the physical location of each driver at or near the start time of the selected appointments. The graphical elements 102 may also be concurrently displayed with location markers 105A-105C, (XA), (XB), and (XC), indicating the event locations 114 of each of the selected calendar events.

The device can also display status indicators 103A-103C indicating a relationship between the physical location of the individual drivers and the event locations 114 specified in the selected set of calendar events 112. For instance, a first status indicator 103A describes that the first driver was off calendar with respect to their associated 10 AM appointment. A second status indicator 103B describes that the second driver was on calendar with respect to their associated 9 AM appointment. A third status indicator 103C describes that the third driver was on calendar with respect to their associated 11 AM appointment.

FIG. 3B shows an example user interface 101 that can be displayed in response to the selection of a second time frame, "Current Events." As a result of this selection, the device 100 identifies another selected set of calendar events 112, which include the calendar events specifying event times that are within a second time frame 120. For illustrative purposes, consider a scenario where a selection of the "Current Events" option causes the device to select of any calendar event that has a start time within a window of time around a current time, e.g., between 11:30 AM and 1:30 PM. Using this example time frame and the example calendar data 110, the device selects Avery's 12 PM appointment and Blake's 12 PM appointment.

The device then displays a user interface 101 that includes a geographic map and a number of graphical elements 102A-102C indicating the physical location of the group members at a particular time, in this case, a current time of 12:30 PM. The physical location of each driver 109 can be based on real-time location data 115 received from remote devices 108. The graphical elements 102 representing the drivers may also be concurrently displayed with location markers 105A-105B indicating the event locations 114, (XA) and (XB), of each of the selected calendar events.

The device also displays status indicators 103A-103B indicating a relationship between the physical location of the individual drivers and their associated event locations 114 specified in the selected set of calendar events 112. For instance, a first status indicator 103A describes that the first driver is currently on calendar with respect to their associated 12 PM appointment. A second status indicator 103B describes that the second driver is currently off calendar with respect to their associated 12 PM appointment.

FIG. 3C shows an example user interface 101 that can be displayed in response to the selection of another time frame, "Next Events," such as an afternoon work shift. As a result of this selection, the device 100 identifies a selected set of calendar events 112, which include the calendar events specifying event times that are within the selected time frame 120. For illustrative purposes, consider a scenario where a selection of the "Next Events" option causes the device to select calendar events that have a start time within a future time frame with respect to a current time, e.g., between 1:30 AM and 3:30 PM given a current time of 12:30 PM. Using this example time frame and the example calendar data 110, the device selects Avery's 2 PM appointment, Blake's 12 PM appointment, and Charlie's 2 PM appointment.

The device then displays a user interface 101 that includes a geographic map and a number of graphical elements 102A-102C indicating the physical location of the group members having events at a given time, in this case, a current time of 12:30 PM. The graphical elements 102 representing the drivers may also be concurrently displayed with location markers 105A-105C indicating the event locations (XA, XB, and XC) of each of the selected calendar events.

The device also displays status indicators 103A-103C indicating a relationship between the physical location of the individual drivers and their associated event locations 114 specified in the selected set of calendar events 112. In this example, the status indicators 103A-103C provide a description of each person's ability to commute to a future appointment. For instance, a first status indicator 103A describes that the first driver is at the location of their future 2 PM appointment. A second status indicator 103B describes that the second driver is off calendar with respect to their associated 2 PM appointment. Status indicators for future events can be generated based on a probability of a commute between the person's physical location and the location of their future appointment. In this example, the second status indicator 103B indicates that the commute between the driver's present location and the location of their future appointment is improbable. A third status indicator 103C indicates that the third driver is likely to make it to their 2 PM appointment on time, an indicator that can be based on a projection of a commute based on traffic data, map data, and other contextual data.

FIG. 4 illustrates a transition between a first user interface showing locations and calendar events of a group to a second user interface showing the location and calendar events of an individual. This example, the user interface on the left side of the figure illustrates a view having multiple status indicators. The system can allow a user of the device 100 to obtain additional contextual information by selecting a particular driver. In this example, in response to a user input selecting the first driver (Avery), the device 100 transitions to the user interface 101 on the right side of the figure. As shown, the user interface 101 showing the selected person can zoom into a location of that person and display an associated status indicator 103A and an associated calendar summary 104A.

Figure 5A:
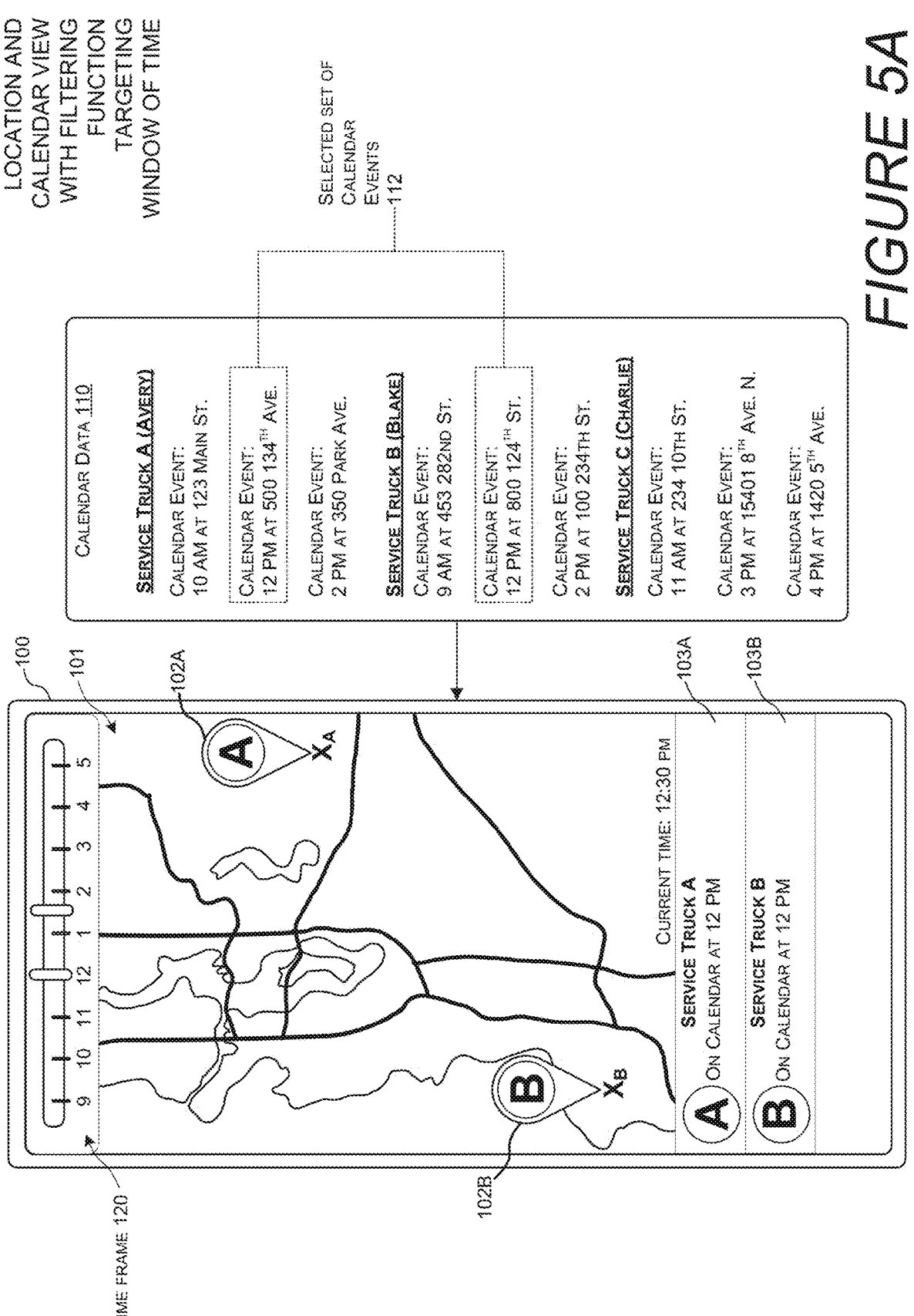
FIG. 5A illustrates another example user interface that can be utilized to select a time frame for a filtering function to identify selected calendar events.

Now turning to FIGS. 5A-5B, another example user interface for selecting a time frame for the filtering function is shown and described below. As shown in FIG. 5A, this example involves a slide bar having multiple input controls to select a start and end of a time frame 120. Although this example involves multiple input controls, it can be appreciated that any type of input device, including a microphone or other types of interface layouts receiving a start and end of a time frame 120 can be utilized.

As shown in the example of FIG. 5A, the user of the device 100 has selected a first time frame that causes the device to select calendar events that have a start time between 12 PM and 1:30 PM. Using this time frame and the sample calendar data 110, the device has selected Avery's 12 PM appointment and Blake's 12 PM appointment.

The device can then display a user interface 101 that includes a geographic map and a number of graphical elements 102A-102B indicating the physical location of the group members having events within the selected time-frame. The physical location of each driver 109 can be based on historical or real-time location data 115 received from remote devices 108. The display may show the physical location of each driver at or near the start time of the selected appointments. The graphical elements 102 may also be concurrently displayed with location markers 105A-105B, (XA and XB), indicating the event locations 114 of each of the corresponding calendar events.

The device can also display status indicators 103A-103B indicating a relationship between the physical location of the individual drivers and the event locations 114 specified in the selected set of calendar events 112 associated with each of the individual drivers 109. For instance, a first status indicator 103A describes that the first driver was on calendar with respect to their associated 12 PM appointment. A second status indicator 103B describes that the second driver was on calendar with respect to their associated 12 PM appointment.

Figure 5B:
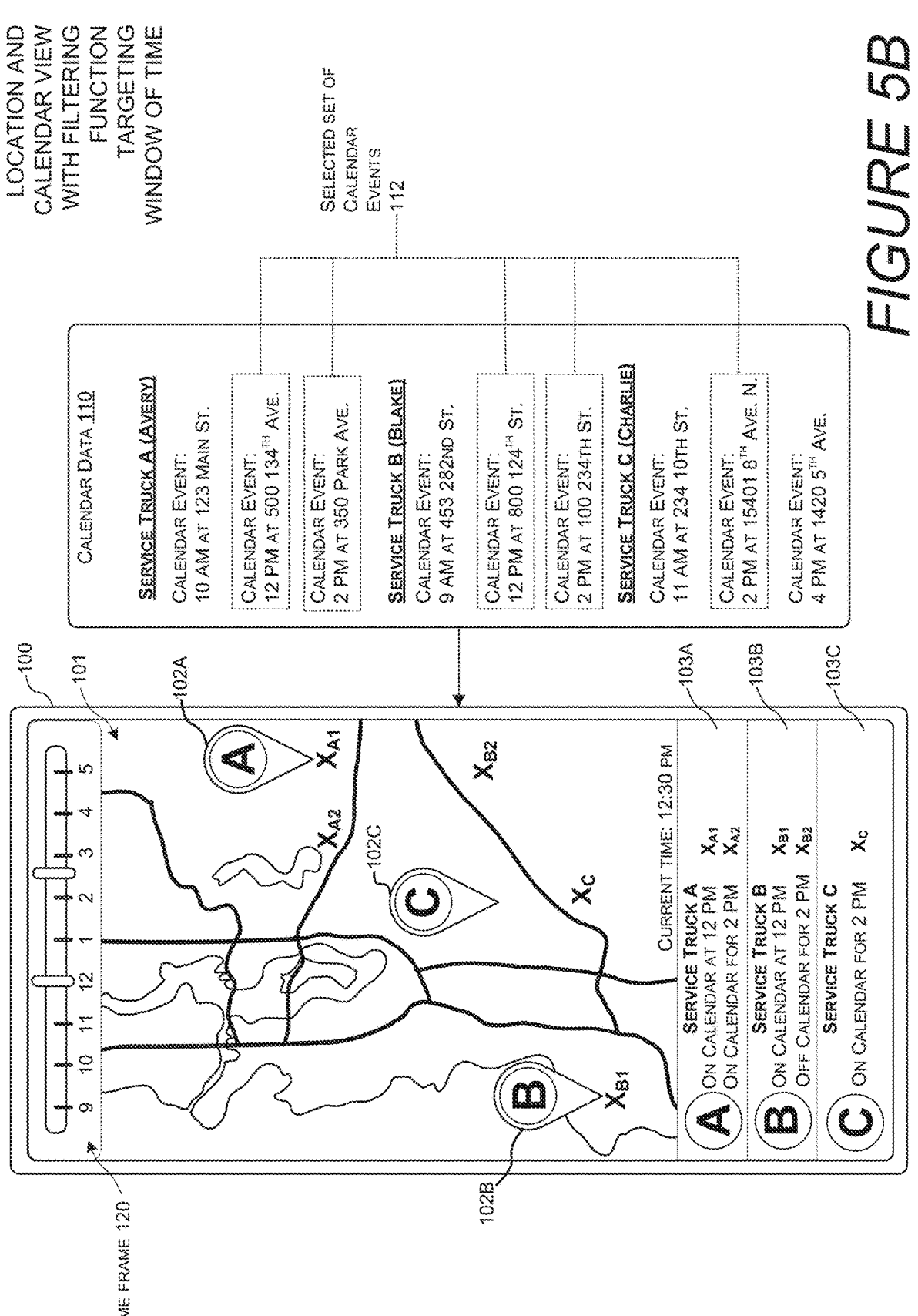
FIG. 5B illustrates the user interface of FIG. 5A, where a user has selected a second time frame for the filtering function to identify selected calendar events.

As shown in the example of FIG. 5B, the user of the device 100 has selected a second time frame that causes the device to select calendar events that have a start time between 12 PM and 2:30 PM. Using this range and the sample calendar data 110, the device has selected Avery's 12 PM and 2 PM appointments, Blake's 12 PM and 2 PM appointments, and Charlie's 2 PM appointment.

The device can then display a user interface 101 that includes a geographic map and a number of graphical elements 102A-102C indicating the physical location of the group members at a particular time, e.g., a current time. The graphical elements 102 may also be concurrently displayed with location markers (XA1, XA2, XB1, XB2, and XC) indicating the event locations 114 of each of the selected calendar events.

The device can also display status indicators 103A-103C indicating a relationship between the physical location of the individual drivers and the event locations 114 specified in the selected set of calendar events 112. The arrangement of the status indicators 103A-103C can be arranged to associate individual drivers with their respective calendar events 112. For instance, a first status indicator 103A describes that the first driver was on calendar with respect to their associated 12 PM appointment and on calendar for their 2 PM appointment. A second status indicator 103B describes that the second driver was on calendar with respect to their associated 12 PM appointment, and off calendar for there 2 PM appointment. For future appointments, projections of a commute can be made based on traffic data and map data, and such projections can be used to determine if a person is on calendar or off calendar with respect to a future event. Also shown in FIG. 5B, based on Charlie's current position and a location of the future appointment, a third status indicator 103B describes that the third driver is on calendar for their 2 PM appointment.

Figure 6A:
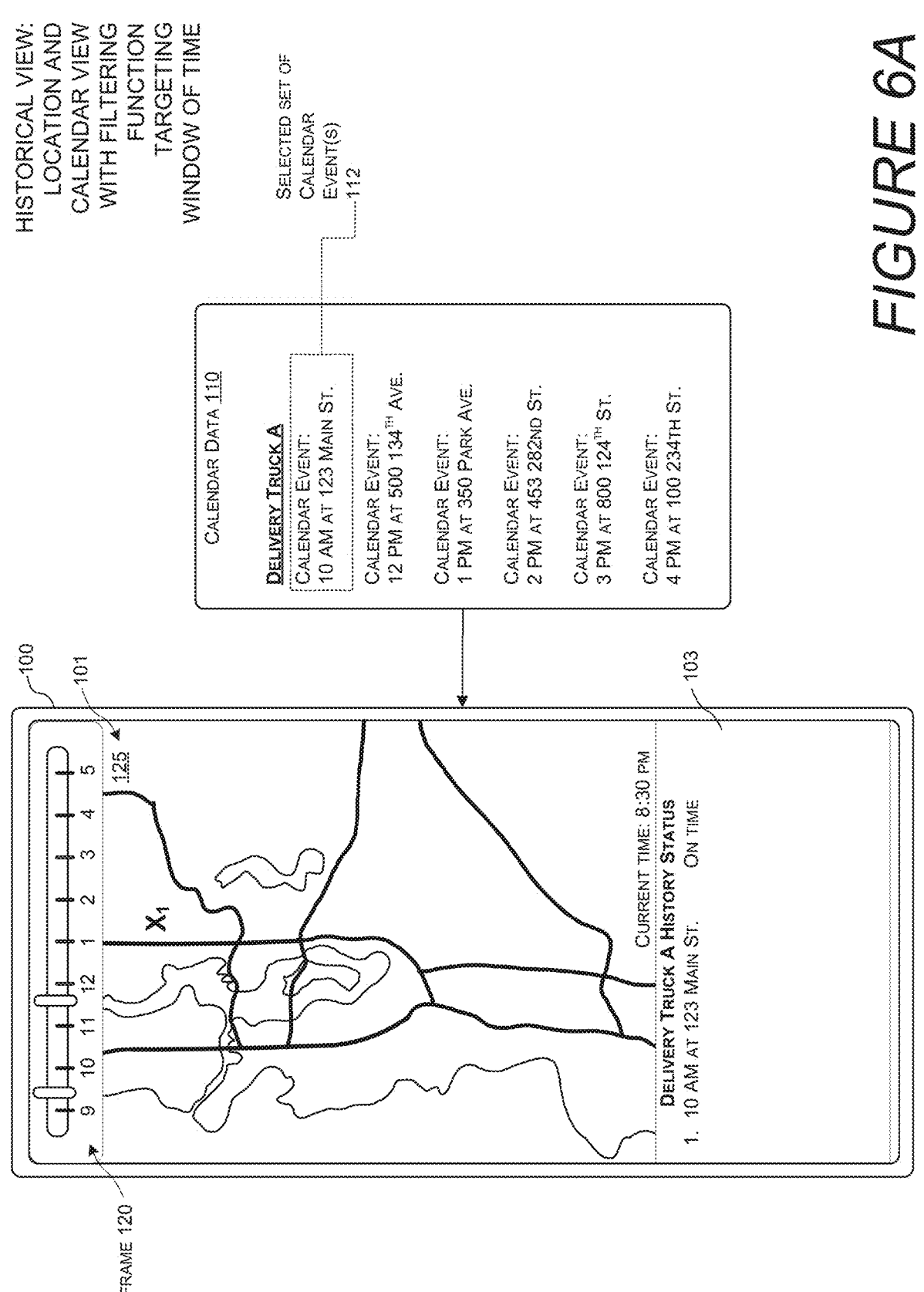
FIG. 6A illustrates another example user interface that can be utilized to select a time frame for a filtering function to identify historical calendar events.

Referring now to FIGS. 6A-6F, an example of the filtering function for analyzing and displaying historical location data and historical calendar data is shown and described below. In this example, as shown in FIG. 6A, a user input defining a time frame can be used to select a set of calendar events 112. For illustrative purposes, the input defines a time frame that causes the device to select calendar events that occur between 9:30 AM to 11:30 AM. Using this example time frame and the sample calendar data 110, the device selects selected Avery's 10 AM appointment and displays the location (X1) of the event with a status indicator 103 summarizing the selected calendar event. The status indicator 103 also indicates whether the driver, Avrey, made it to the appointment on time.

As shown in FIG. 6B through FIG. 6E, as the user modifies the selected time frame 120, the device 100 adjusts the selection of the calendar events based on the time frame 120. The device 100 also displays a location marker for the calendar events that meet one or more criteria with respect to the selected time frame 120. For instance, in FIG. 6B, a time frame from 9:30 AM to 12:10 causes the device to select the first and second calendar events and display location markers (X1 and X2) in conjunction with status indicators for each appointment. In FIG. 6C, a time frame from 9:30 AM to 1:30 causes the device to select the first, second, and third calendar events and display location markers (X1, X2, and X3) in conjunction with status indicators for each appointment. In FIG. 6D, a time frame from 9:30 AM to 2:30 causes the device to select the first, second, third, and fourth calendar events and display location markers (X1, X2, X3, and X4) in conjunction with status indicators for each appointment. In FIG. 6E, a time frame from 9:30 AM to 3:30 causes the device to select the first, second, third, fourth, and fifth calendar events and display location markers (X1, X2, X3, X4, and X5) in conjunction with status indicators 103 for each appointment. In this example, the driver was on time for the first and third appointments, late for the second appointment, early for the fourth appointment, and a no-show for the fifth appointment. The status indicators can be used to indicate such results.

In some configurations, the device can display graphical elements showing a person's position at a specific point in time concurrently with historical calendar events. For instance, the device can display a graphical element showing a person's position at a particular time when one or more criteria are met. For example, as shown in FIG. 6E, in response to determining that the driver missed an event, the device can display the driver's location at the time of the missed appointment. Displaying a graphical representation of a person's location at the time of a missed event can help focus the display of information. Thus, in some embodiments, if the driver made it to an event on time for another appointment, the device may not show the driver's location at the time of that particular appointment.

FIG. 6F illustrates another example of a user interface that provides location information, calendar information, and historical status indicators displayed within the map. As shown, the status indicators describing a person's location relative to a calendar event are positioned near an event location marker. Given that the time frame is from 9:30 AM to 3:30, the device selects the first, second, third, fourth, and fifth calendar events and displays location markers for the locations of each event: (X1, X2, X3, X4, and X5). A status indicator describing a person's location relative to each event location can be positioned near each location marker, e.g., that the driver was on time for the first and third appointments, late for the second appointment, early for the fourth appointment, and a no-show for the fifth appointment. Such an arrangement can help a viewer of such information, such as a team manager, readily identify performance issues without having to sort through large amounts of data summarizing calendar information.

In some configurations, the device can display a graphical element 102 showing a person's location at a point in time in response to determining that a person's activity met one or more criteria. For instance, as shown in FIG. 6E, the graphical element 102 showing Avery's historical location can be displayed when it is determined that Avery missed a particular appointment, or when Avery was late beyond a threshold time period. For instance, in this example, Avery missed the fifth appointment and thus Avery's location that was detected at the time of the appointment is displayed within the map.

These examples are provided for illustrative purposes and are not to be construed as limiting. It can be appreciated that criteria for selecting particular calendar events can be based on a number of different factors. For instance, although the examples disclosed herein select a calendar event based on a start time of an appointment, it can be appreciated that a system can utilize the duration of a calendar event, such as an event's start time and end time, to select a calendar event. For instance, when a given time frame 120 includes a thirty minute window, any appointment overlapping the time frame 120 can be selected.

Figure 7B:
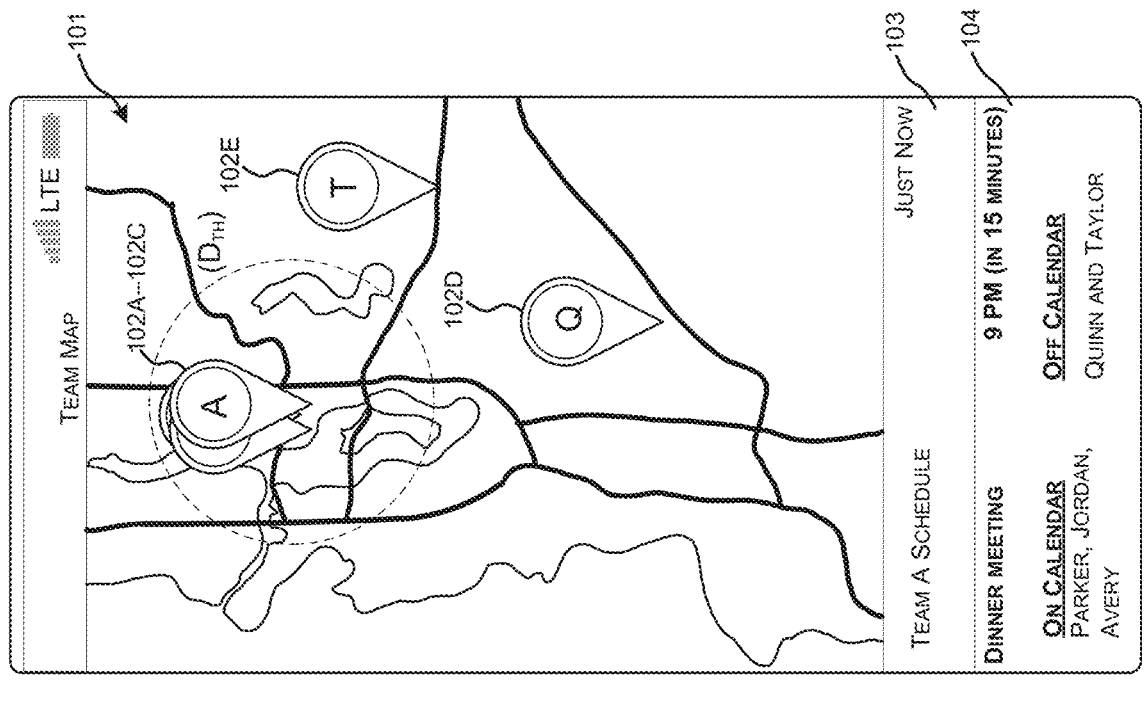
FIG. 7B illustrates aspects of a process for distributing notifications to members of a group.

Referring now to FIGS. 7A-7E, techniques for distributing notifications to group members is shown and described below. Generally described, when a calendar event includes a number of group members, different group members may receive different types of notifications based on their location and other attributes defined in their calendar data. With reference to FIG. 7A, consider a scenario where calendar data 110 defines a meeting for a group of individuals. The meeting defines a meeting description, a list of attendees, a location, and a time and date. The calendar data also defines a notification threshold period, which is also referred to herein as a notification threshold. The notification threshold is used to trigger the delivery of one or more notifications. For illustrative purposes, in this example, the notification threshold period is 15 minutes.

Figure 15:
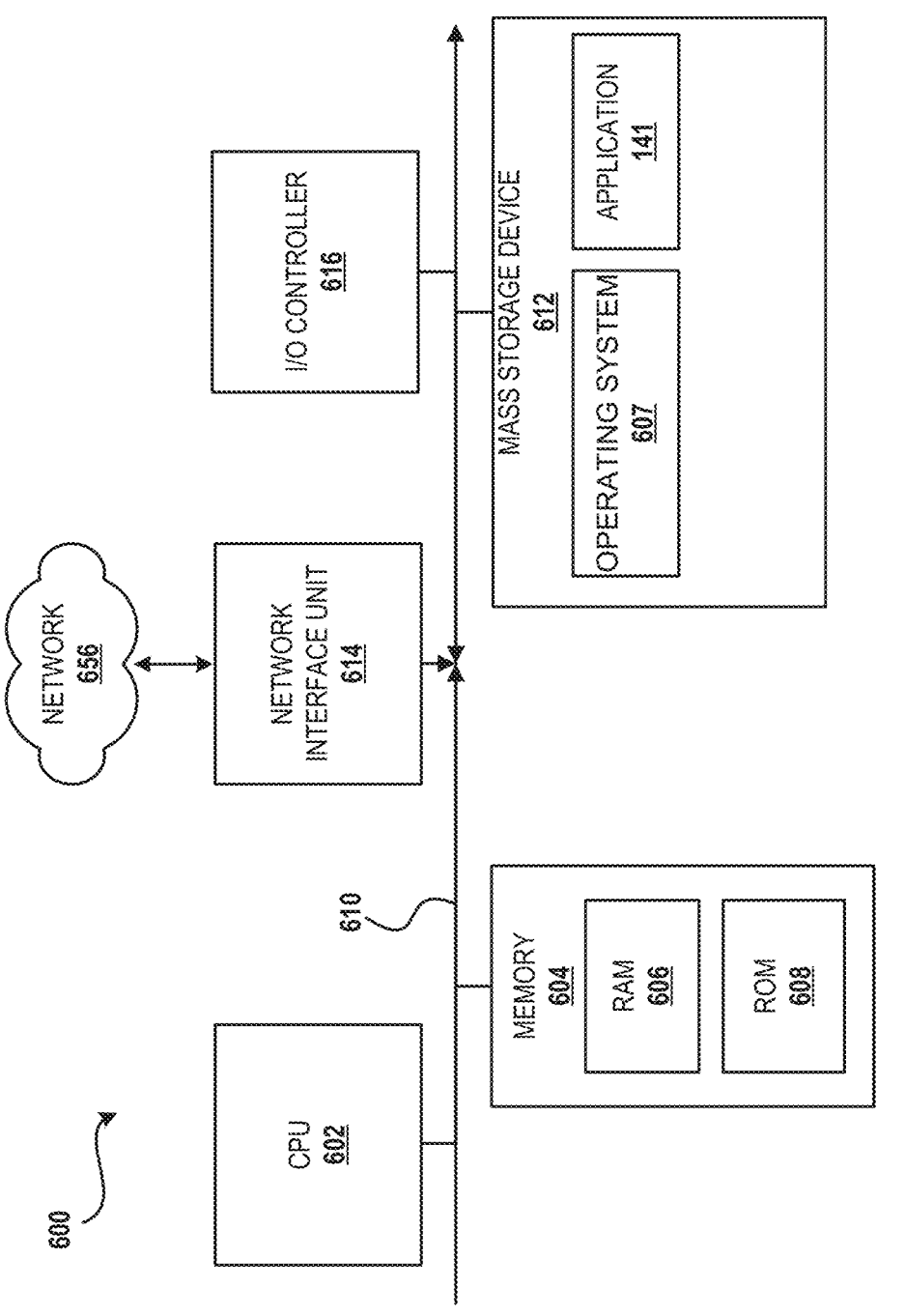
FIG. 15 is a computer architecture diagram illustrating an illustrative computer hardware and software architecture for a computing system capable of implementing aspects of the techniques and technologies presented herein.

As shown in FIG. 7A, 15 minutes prior to a start of a meeting, a system may deliver status indicators to all attendees disclosing the locations of each invitee. Based on location data for each group member and based on the calendar data 110, a device 100 can display a graphical element 102 indicating the location of each group member relative to a location marker, X, for the event. In addition, the device can display a status indicator 103 for each group member. In this case, at a given time, Parker Jordan and Avery are located at the location of the event, and Quinn and Taylor are located beyond a predetermined distance from the location of the event. Such information may be displayed, or a notification drawing focus to this information may be generated at the start of or during a notification threshold period, within a predetermined time period from the start of the meeting.

As shown in FIG. 7B, in some embodiments, the device 100 and/or a server 170, can cause the communication of notifications 171 to each group member when it is determined that one or more group members are outside of a threshold distance (Dth) within a notification threshold period. In this example, since Quinn and Taylor are beyond the threshold distance from the location of the meeting, the notification 171 can indicate the status of those two group members. In some configurations, the notification can be sent within a predetermined time period from the start of a meeting. The predetermined time period can be identified in a system setting or the predetermined time period can be a setting within a meeting.

As shown in FIG. 7C, in some embodiments, the device 100 and/or a server 170, can communicate the number of notifications 171 to group members that are within the threshold distance (Dth). Thus, as shown, the notification 171 is communicated to the first three group members, Parker, Jordan, and Avery. In such configurations, the notification 171 can provide information such as a name and a projected arrival time for each group member located outside of the threshold distance.

Figure 7D:
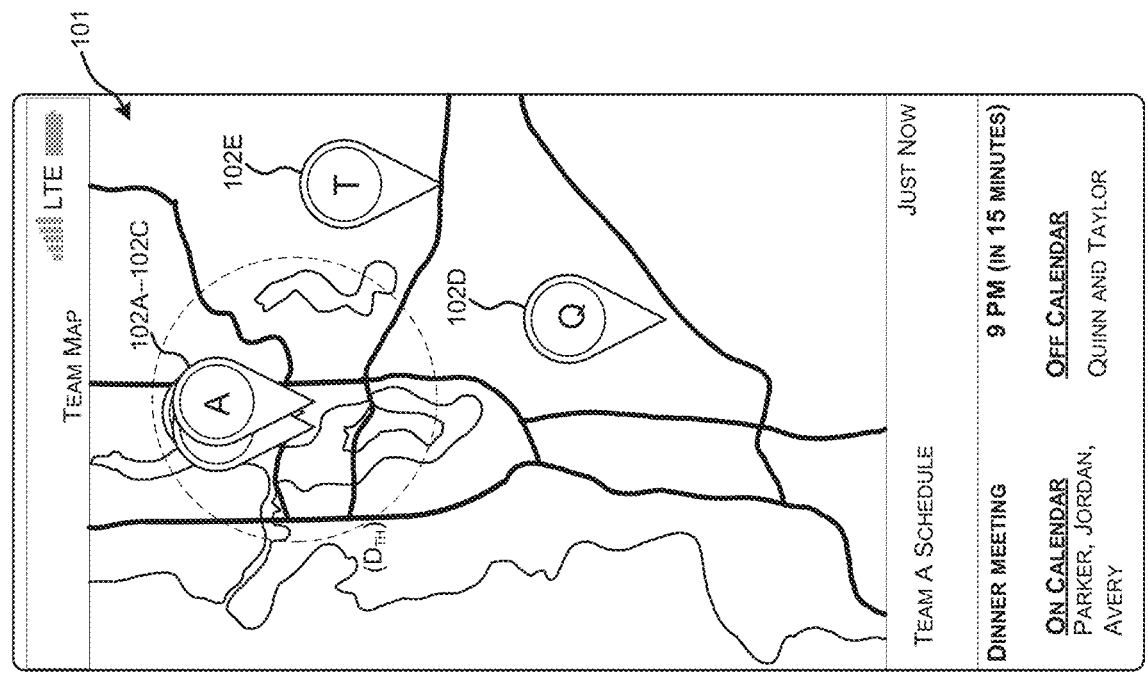
FIG. 7D illustrates aspects of a process for distributing notifications to located beyond a predetermined distance from a location identified in a calendar event.

As shown in FIG. 7D, in some embodiments, the device 100 and/or a server 170, can communicate the number of notifications 171 to group members that are located beyond the threshold distance (Dth) from an event location. Thus, as shown, the notification 171 is communicated to the last two group members, Quinn and Taylor. In such configurations, the notification 171 can provide information such as a name and a projected arrival time for each group member located outside of the threshold distance. This configuration allows the traveling group members to coordinate with one another or take other actions to notify specific group members.

Figure 7E:
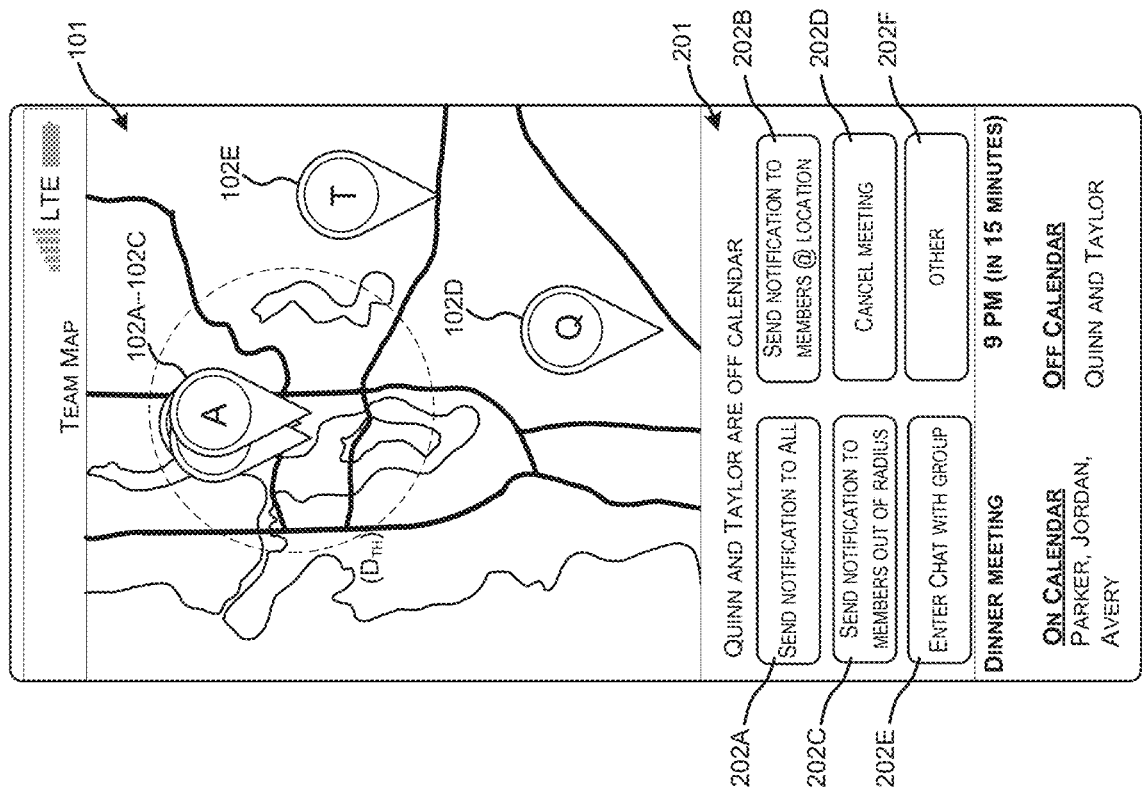
FIG. 7E illustrates an example of an interactive notification user interface that includes a display of a broad context of group member locations and controls for allowing a person to select actions in response to a display of the location information, status indicators, and calendar information.

In some configurations, as shown in FIG. 7E, the notification 171 can be in the form of an interactive notification 201. Generally described, an interactive notification 201 provides a broader context with respect to the location of the group members and any relevant calendar data before any action is taken with respect to calendar modifications or group notifications. The interactive notification 201 includes a number of selectable functions that allows a person to take action based on the displayed calendar information and location information. For instance, a first selectable function 202A can cause the delivery of a message to select group members. A second selectable function 202B can cause the delivery of a message to members that are located within a threshold distance to the location of the meeting. A third selectable function 202C can cause the delivery of a message to members that are outside of the threshold distance. The message can indicate the status of individuals outside of the threshold distance. Other selectable functions 202E-202F can cause the cancelation of a meeting, cause a modification to the meeting, start a chat with the group members, or cause other actions that allow an interaction with the group members or parameters of the calendar event.

Referring now to FIGS. 8A-8D, techniques for communicating notifications in response to a canceled calendar event is shown and described below. This example provides an illustration of an example where a calendar event is cancelled, and in response, one more notifications are delivered to select members of a group based on their locations. In some configurations, an interactive notification is provided to select group members for allowing users to view group member location information and relevant calendar information before sending notifications to the group or causing further modifications to the calendar event.

Figure 8A:
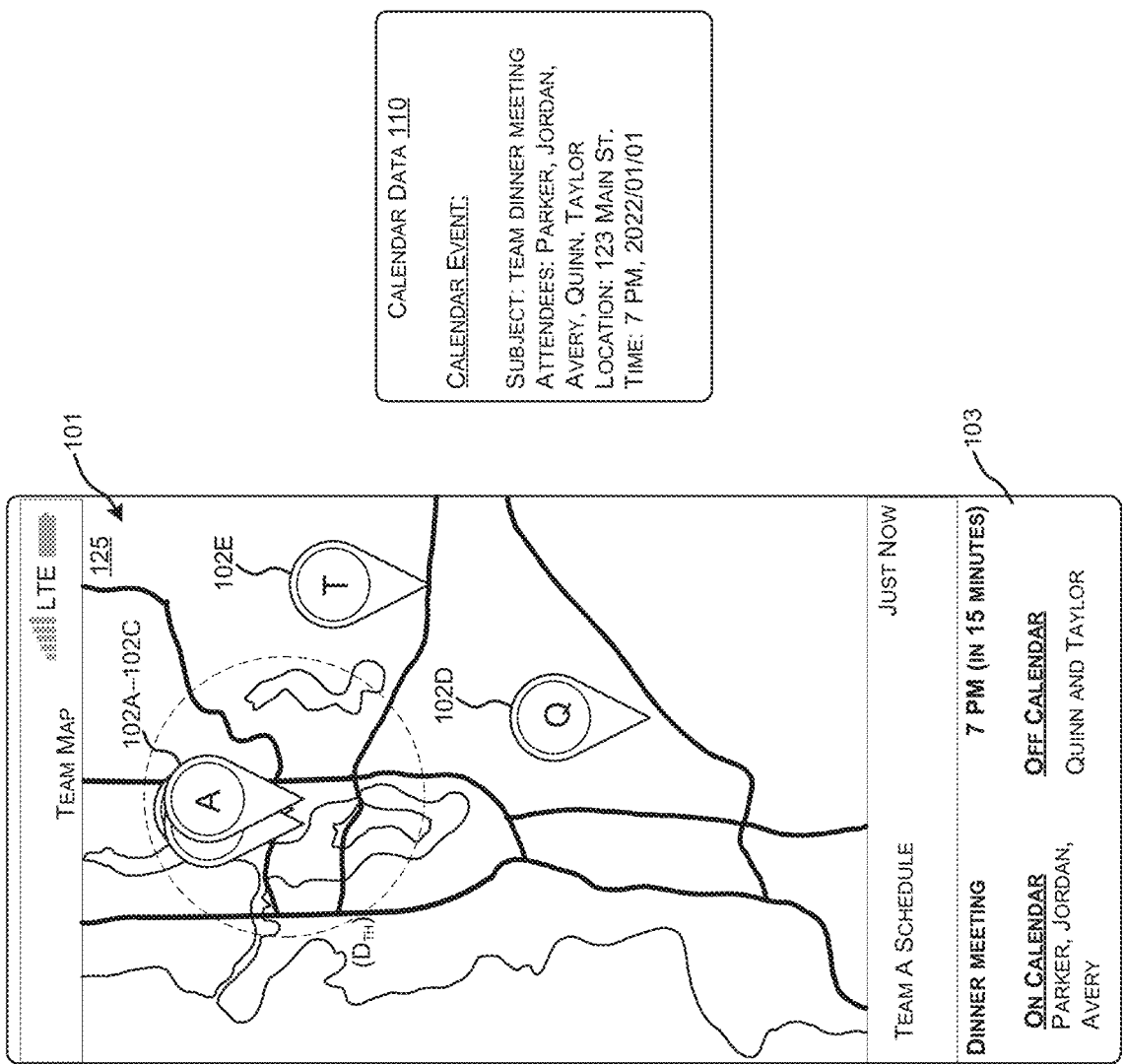
FIG. 8A illustrates a first user interface that can be used in a process for providing notifications of canceled calendar events, the user interface showing the location of group members and their associated calendar information.
Figure 8B:
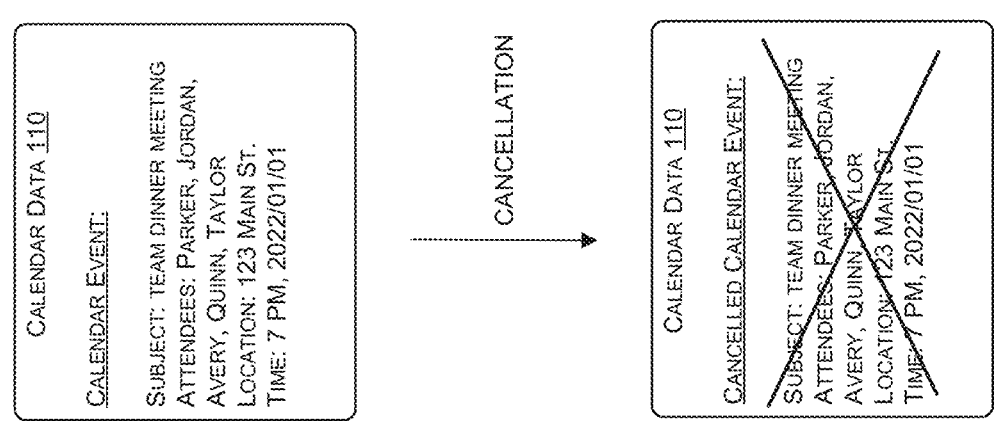
FIG. 8B illustrates aspects of a process for canceling a calendar event.
Figure 8C:
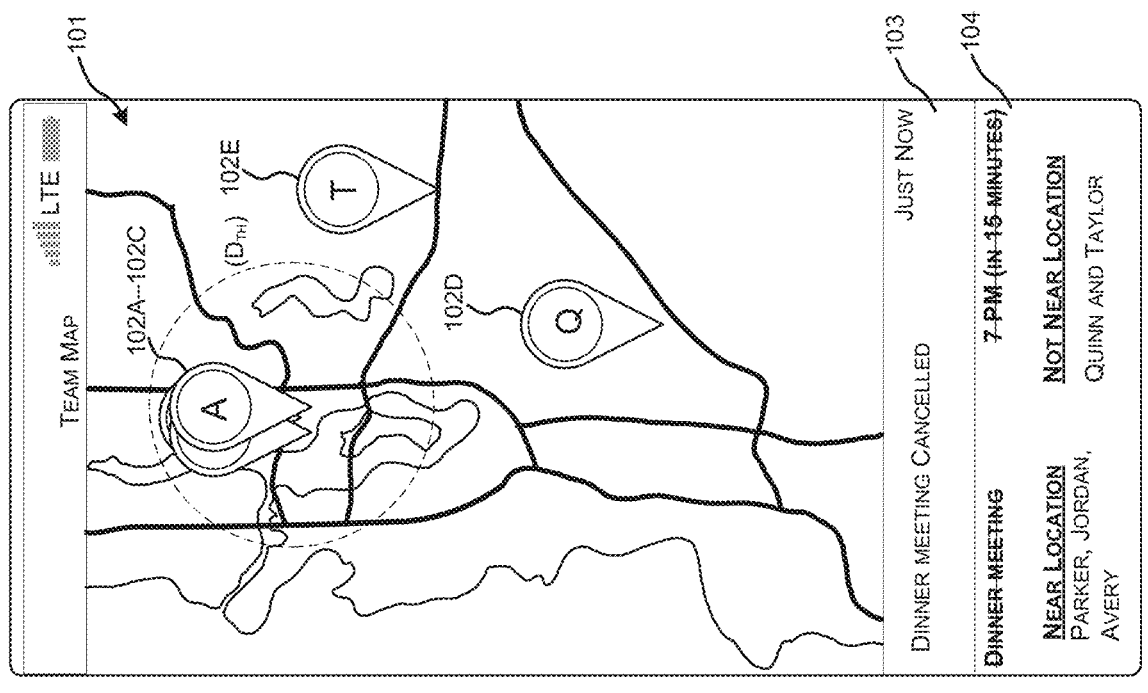
FIG. 8C illustrates aspects of a process for delivering cancellation notifications to members of a group.

To illustrate aspects of this embodiment, consider a scenario where calendar data received by device defines a group meeting. In this case, the event is a dinner meeting starting at 7 PM. In such a scenario, as shown in FIG. 8A, a user interface 101 may display map indicating the location of each invitee and a status indicator 103 describing each group member's position relative to the location defined in the calendar event. As shown in FIG. 8B, a cancellation notice 172 can be received from any source, which in this example is a particular user. In response to the cancellation notice 172, as shown in FIG. 8C, the server 170 or one of the devices 108 can deliver a notification 171 to the other group members. In some configurations, the notification 171 can cause each device to perform one or more actions, e.g., delete a local copy of the calendar event, turnoff reminders for the calendar event, etc. In addition to displaying each invitee's location relative to the location of the event, one or more devices 108 can also display a status indicator 103 describing the changed status of the cancelled calendar event. In this example, the status indicator 103 includes the details of the original calendar event along with other indicators, e.g., strikeout text, to indicate the changed status. In addition, the status indicator 103 can describe each person's location with respect to the original meeting location.

Figure 8D:
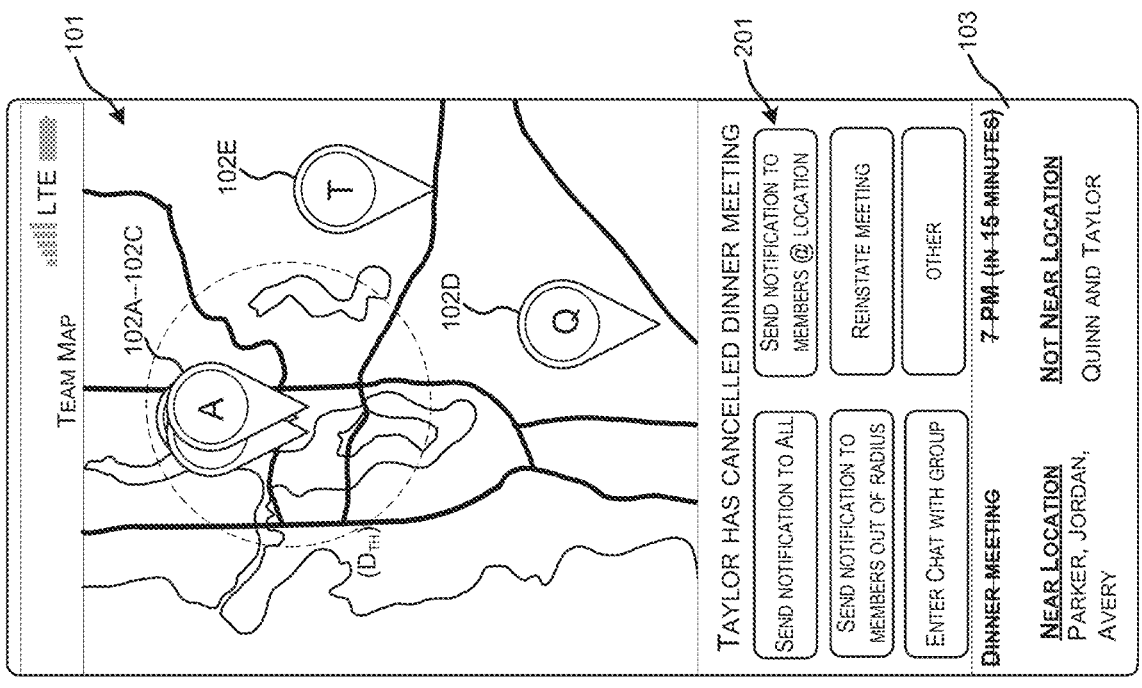
FIG. 8D illustrates an example of an interactive notification user interface that includes a display of a broad context of group member locations and controls for allowing a person to select actions in response to a display of location information, status indicators, and cancelled calendar information.

In some configurations, as shown in FIG. 8D, the notification 171 can be in the form of an interactive notification 201. Similar to the example described above, the interactive notification 201 provides the location of the group members and any relevant calendar data along with a number of selectable functions. This configuration allows a person to understand a broader context with the group members before allowing a system to take action with respect to the group. Similar to the example shown in FIG. 7E, the interactive notification 201 includes a number of selectable functions that allows a person to modify calendar information for the group, send group notifications, initiate communications, or take other actions. In this particular example, the interactive notification 201 includes a selectable function that allows a user to reinstate the canceled meeting.

Referring now to FIGS. 9A-9D, techniques for communicating notifications in response to a modified calendar event is shown and described below. This example provides an illustration of an example where a user modifies a calendar event, such as a change to a meeting location, time, or date. In response to the modification, one more notifications can be delivered to select members. In some configurations, an interactive notification is provided to select group members for allowing users to view member location information and relevant calendar information before sending notifications to the group or causing further modifications to the calendar information.

To illustrate aspects of this embodiment, as shown in FIG. 9A, consider a scenario where calendar data 110 defines a group meeting. In this example, a meeting starts at 7 PM for a group of five members: Parker, Jordan, Avery, Quinn, and Taylor. In such a scenario, calendar modification data 173 can be received from any suitable source, which in this example is a particular group member 109A. In this example, the modification data 173 defines a change to the location of an event thereby creating updated calendar data 110' from the original calendar data 110. Although this example illustrates a change to the location, can be appreciated that any of the modification, such as a modification of the time or date can apply to the techniques disclosed herein.

Figure 9B:
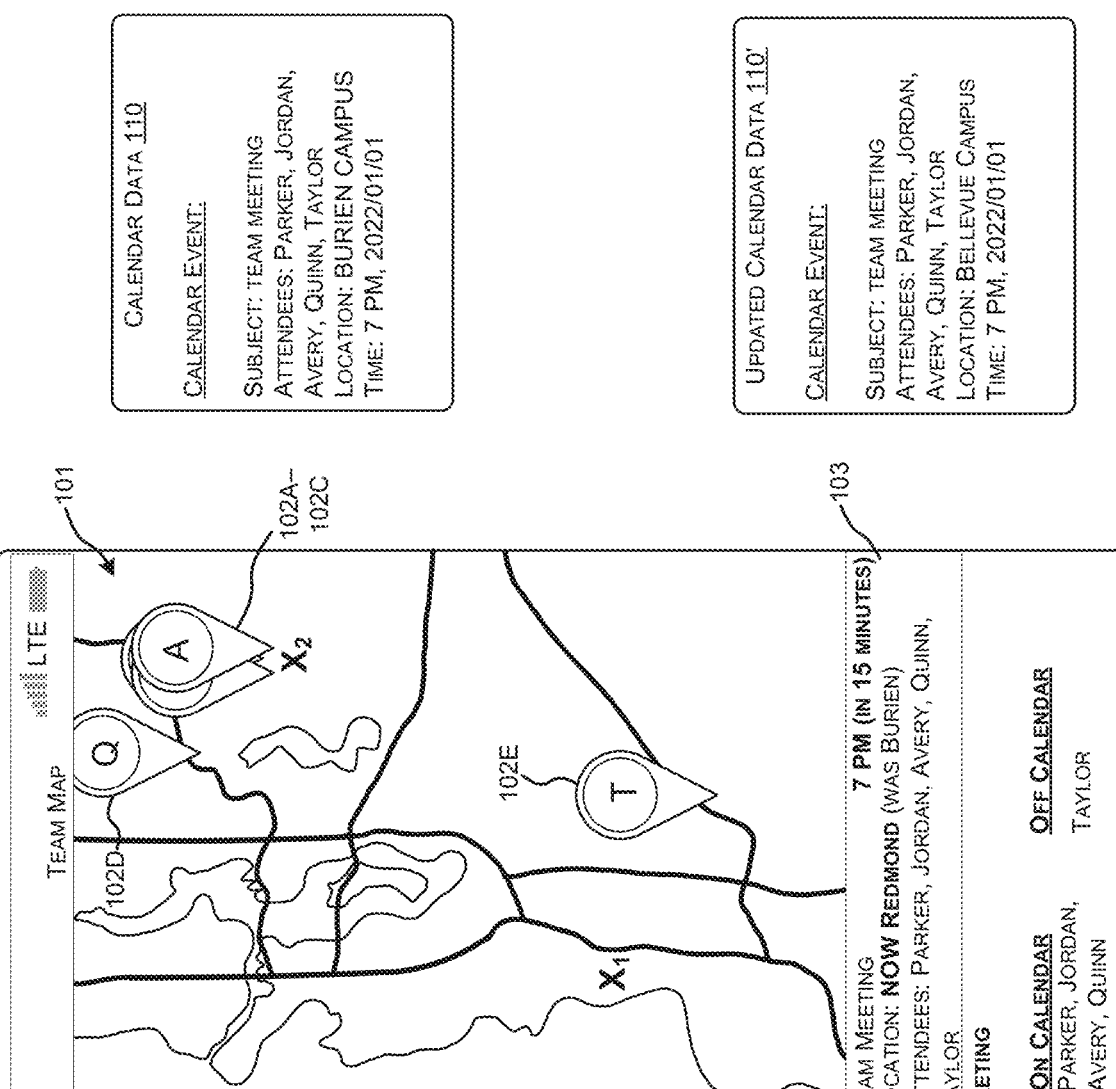
FIG. 9B illustrates an example of a user interface used in a first user scenario, the user interface displaying a customized notification showing the original calendar data and the updated calendar data, the user interface showing locations of group members and their associated calendar data.

As shown in FIG. 9B, a notification to a meeting can cause one more devices to display a status indicator 103 describing the modification, e.g., that the meeting is now in Redmond but was previously scheduled in Burien. In addition, the location of each group member 102 can be shown concurrently with location markers of the original meeting location (X1) and the new meeting location (X2). FIG. 9B also illustrates a first user scenario where the first four invitees 102A-102D (Parker, Jordan, Avery, Quinn) are located near the new meeting location, and the fifth invitee 102E (Taylor) is located near the original meeting location. In such a scenario, the status indicator can indicate that Parker, Jordan, Avery, and Quinn are on calendar, and that Taylor is off calendar. Information presented in this manner allows a user, such as a meeting organizer, to make a decision about the meeting, which may be in this case to move forward with the meeting at the new location.

Figure 9C:
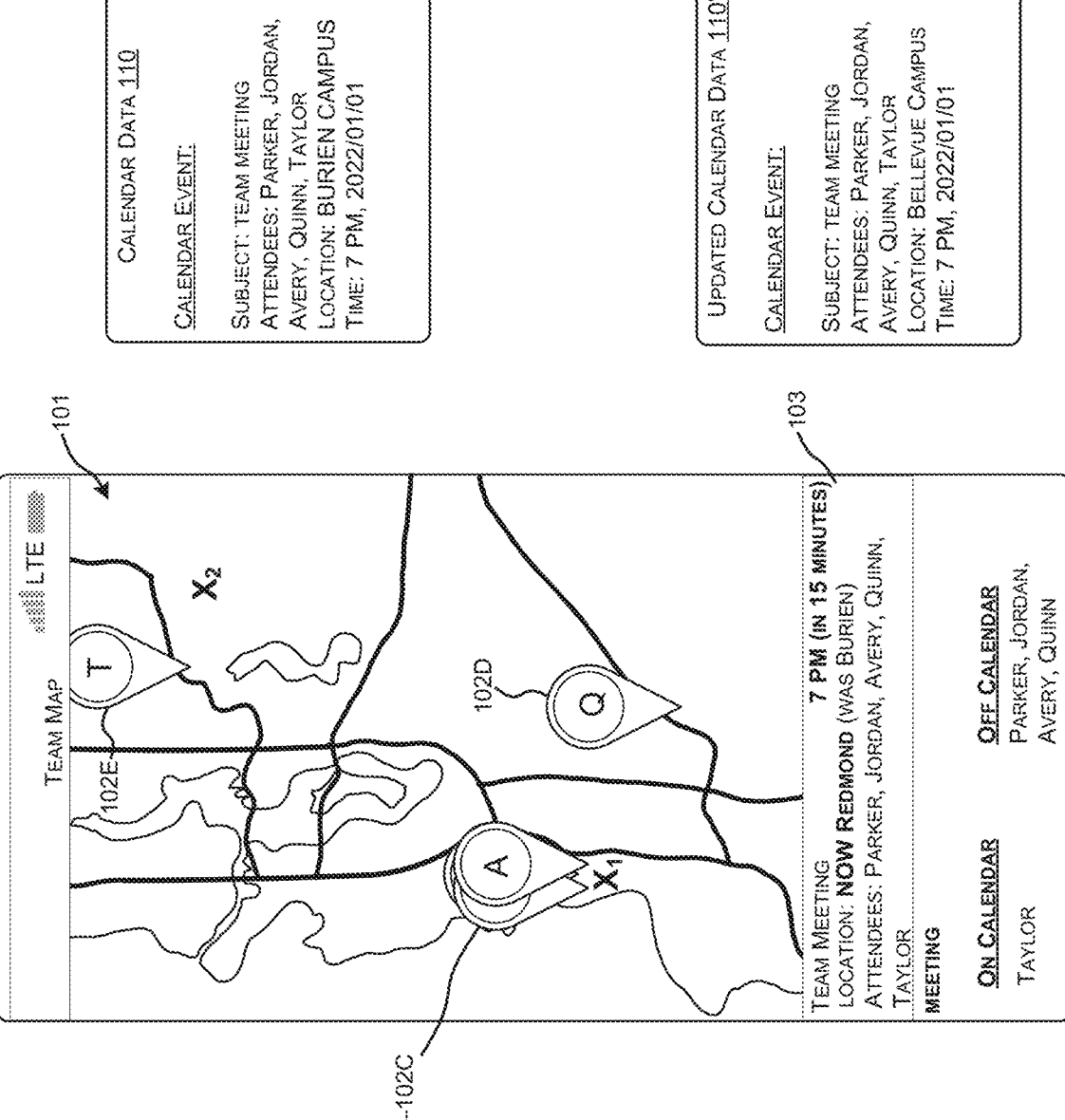
FIG. 9C illustrates an example of a user interface used in a second user scenario, the user interface displaying a customized notification showing the original calendar data and the updated calendar data, the user interface showing locations of group members and their associated calendar data.

FIG. 9C illustrates a second user scenario where the first four invitees 102A-102D (Parker, Jordan, Avery, Quinn) are located near the original meeting location, and the fifth invitee 102E (Taylor) is located near the new meeting location. In such a scenario, the status indicator can indicate that Parker, Jordan, Avery, and Quinn are off calendar, and that Taylor is on calendar. Information presented in this manner allows a user, such as a meeting organizer, to make a decision about the meeting, which may be to revert the meeting back to the original location.

Figure 9D:
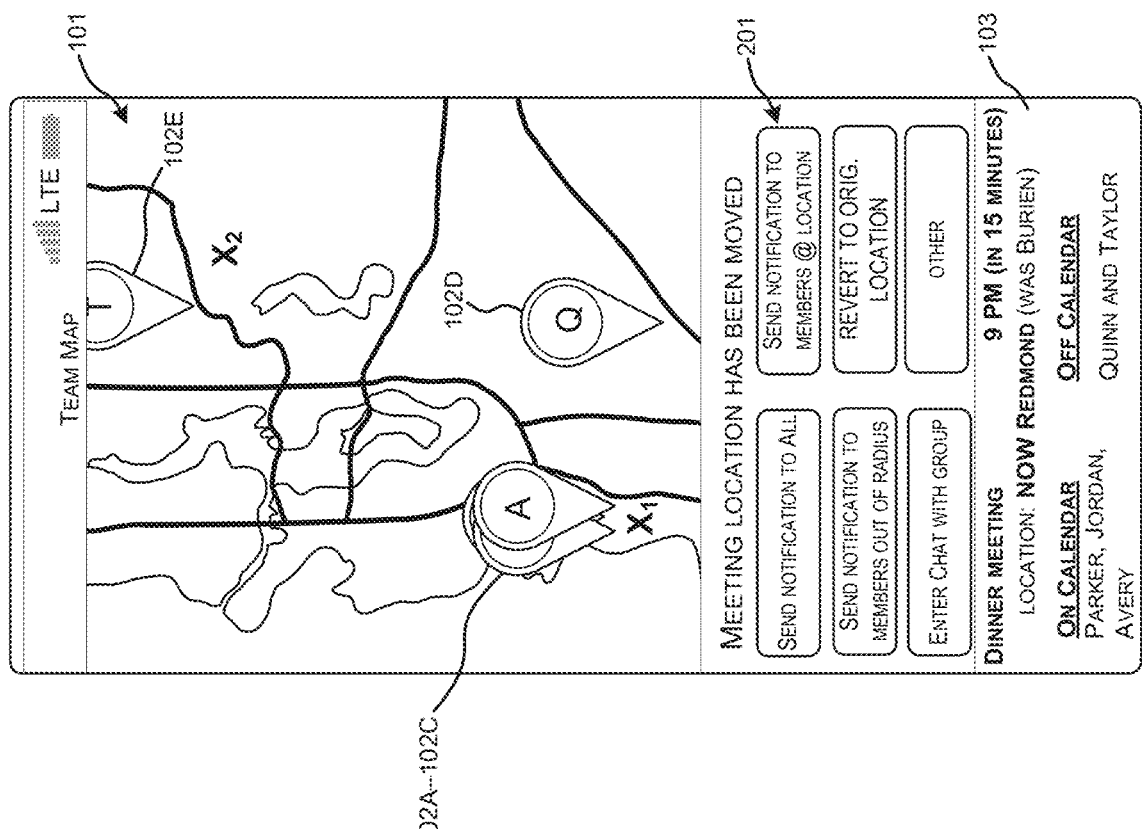
FIG. 9D illustrates an example of an interactive notification user interface that includes a display of a broad context of group member locations and controls for allowing a person to select actions in response to a display of location information, status indicators, and modified calendar information.

FIG. 9D Illustrates another example of an interactive notification 201. This example user interface may be delivered to one or more group members in response to a modification of a calendar event. Similar to the examples described above, the interactive notification 201 provides the location of the group members and any relevant calendar data along with a number of selectable calendaring functions or communication functions. This configuration allows a person to understand a broader context with the group members before allowing a system to take action with respect to the group. This example involves a number of selectable functions that are similar to the example described above. In addition, this example includes a function that allows a user to revert back to the original meeting location.

Figure 10A:
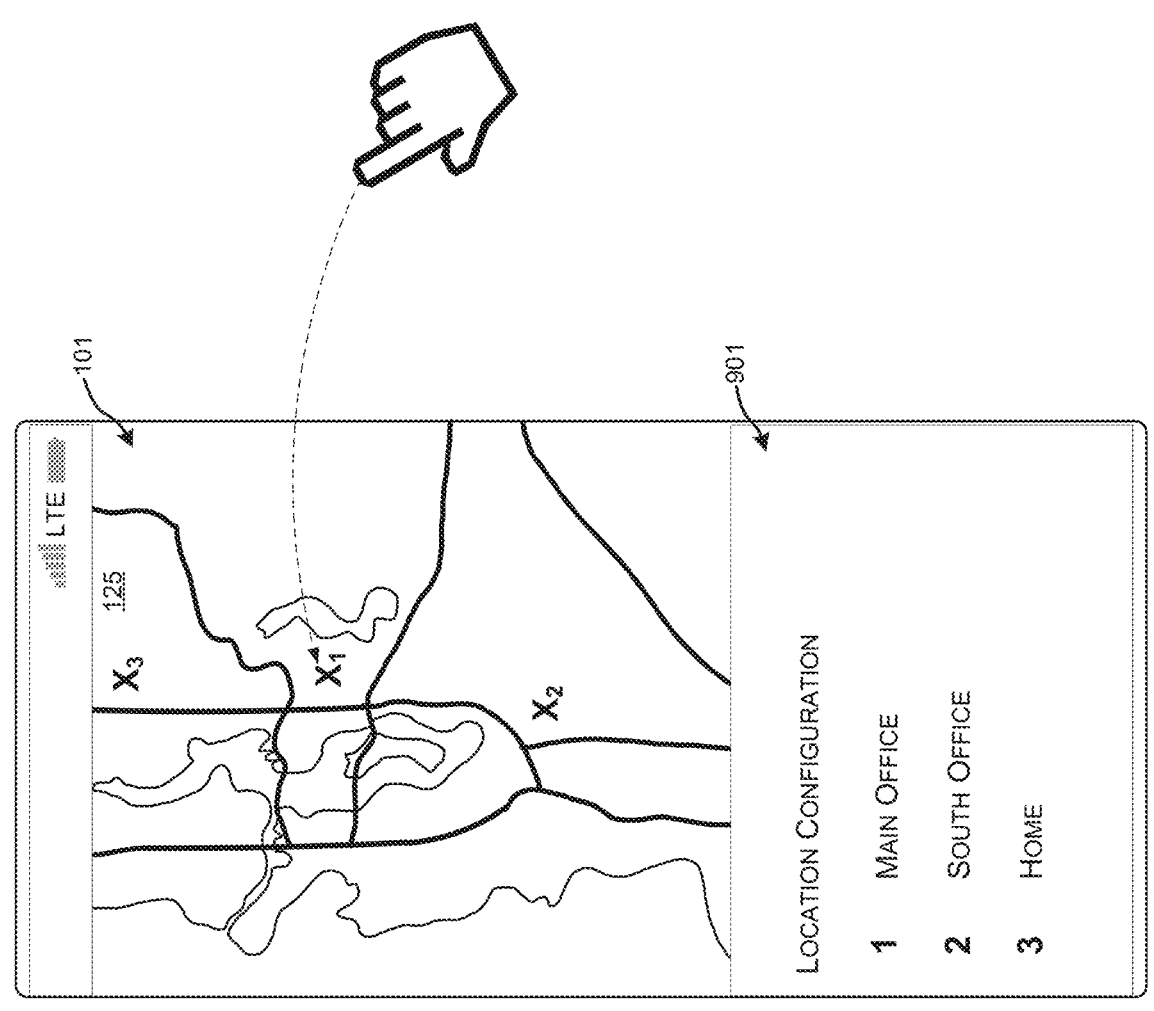
FIG. 10A illustrates aspects of a process for selecting a location for modifying distance attributes associated with the location.
Figure 10B:
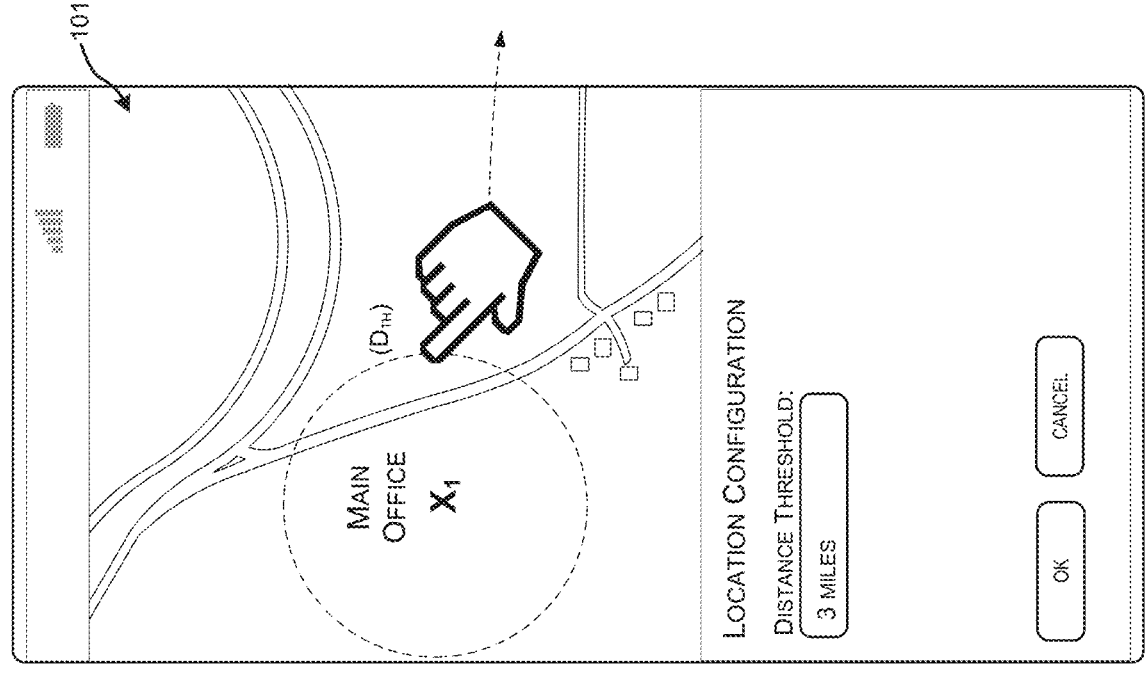
FIG. 10B illustrates a first stage of a process for adjusting a distance threshold with respect to a location.
Figure 10C:
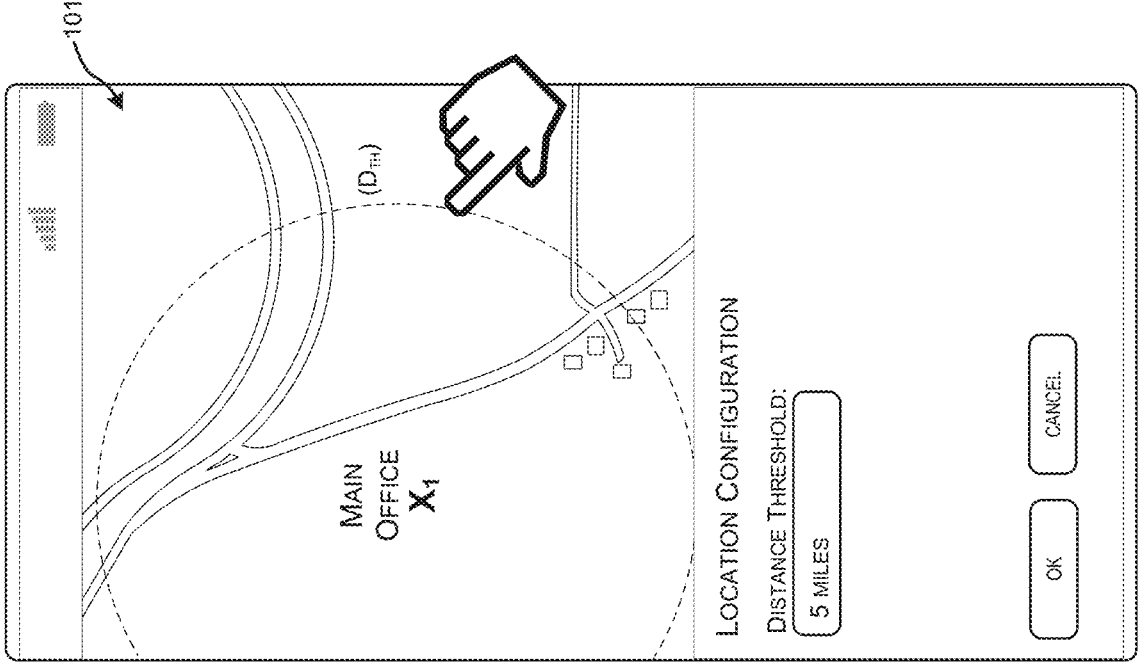
FIG. 10C illustrates a second stage a process for adjusting a distance threshold with respect to a location.

Some configurations allow users to define a predetermined region for the purposes of providing notifications when a group member leaves the region without an appointment located outside the region. FIGS. 10A-10C and FIGS. 11A-11B illustrate an example of such features. Specifically, FIGS. 10A-10C illustrate an example process for defining a region and FIGS. 11A-11B illustrate a device that can generate notifications when group members leave the region without an appointment located outside the region.

FIG. 10A shows a user interface displaying several locations on a map. For example, the user interface includes three locations: a main office, a south office, and a person's home. A user can associate a region with each location by selecting a location and setting a region by the use of one or more gestures. In the example shown in FIG. 10A, a user can select the first location, the main office, to cause the device to transition to a user interface that focuses on the selected location and enables a user to define a region. As shown in FIGS. 10B and 10C, a user can configure the size of a region by the use of a gesture. In this example, the region is a circle having a radius (Dth). The user interface also includes a text field indicating the size of the radius. Although this example utilizes a touch gesture for configuring the region, can be appreciated that other forms of input can be used to define a size and/or shape of a region.

Once a region is established for a particular location, a device can monitor the activity of individual group members to determine whether individual group members leave the region. In addition, the device can monitor the location of individual group members in comparison to each member's calendar. An example of this feature is shown in FIGS. 11A and 11B.

As shown in FIG. 11A, in a first user scenario, a member has calendar data indicating that he or she has an appointment within the region and one appointment outside of the region. In this example, the location data received by the device also indicates that the member is physically located outside of the region. Given that the member has an appointment that specifies a location outside of the region, the device can display the user interface shown in FIG. 11A. In this example, the user interface includes a status indicator that describes the member as being on calendar.

As shown in FIG. 11B, in a second user scenario, the member has calendar data indicating that he or she only has appointments within the region. In this example, location data received by the device also indicates that the member is physically located outside of the region, e.g., beyond a distance (Dth) from the main office. Given that the member does not have an appointment outside of the region and also given that member is located outside of the region, the device displays the user interface shown in FIG. 11B. In this example, the user interface includes a status indicator describing that that member is off calendar. These examples are provided for illustrative purposes and are not to be construed as limiting. It can be appreciated that other types of notifications and alarms can be communicated to one or more users when such conditions are detected.

Figure 12A:
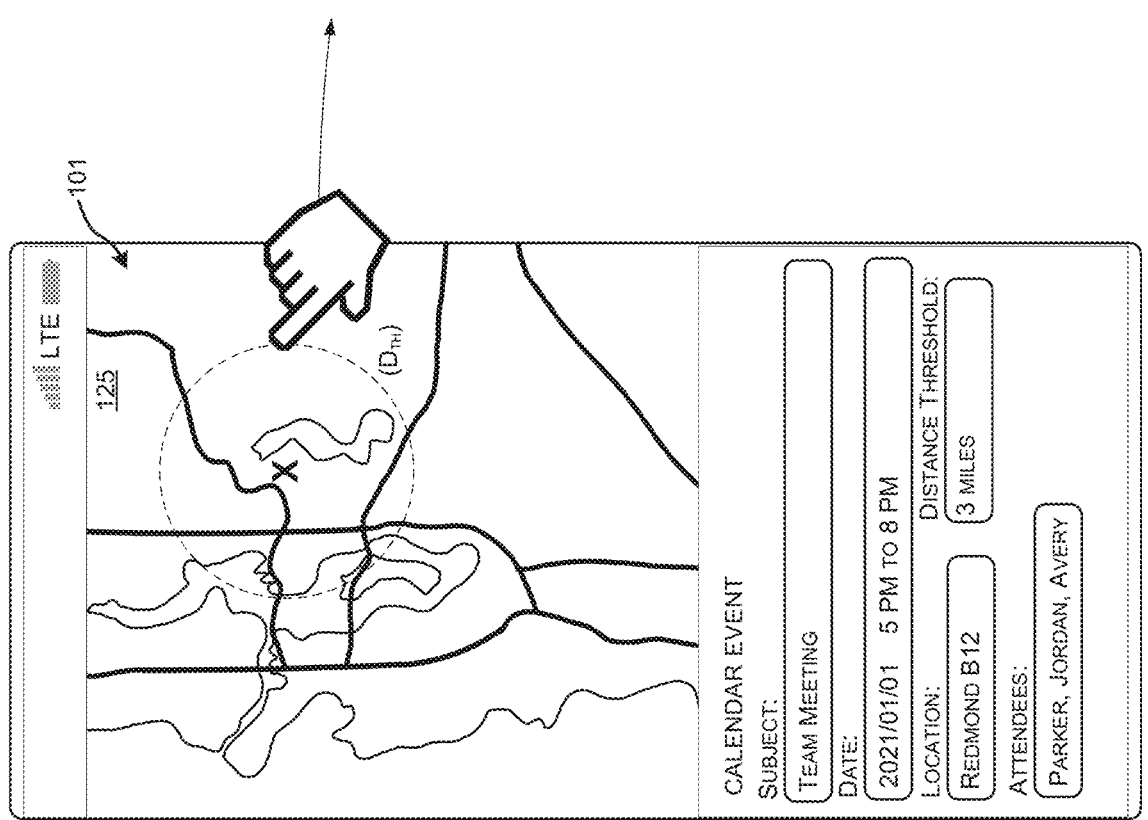
FIG. 12A illustrates a first stage of a process for modifying distance attributes associated with the location of a calendar event.
Figure 12B:
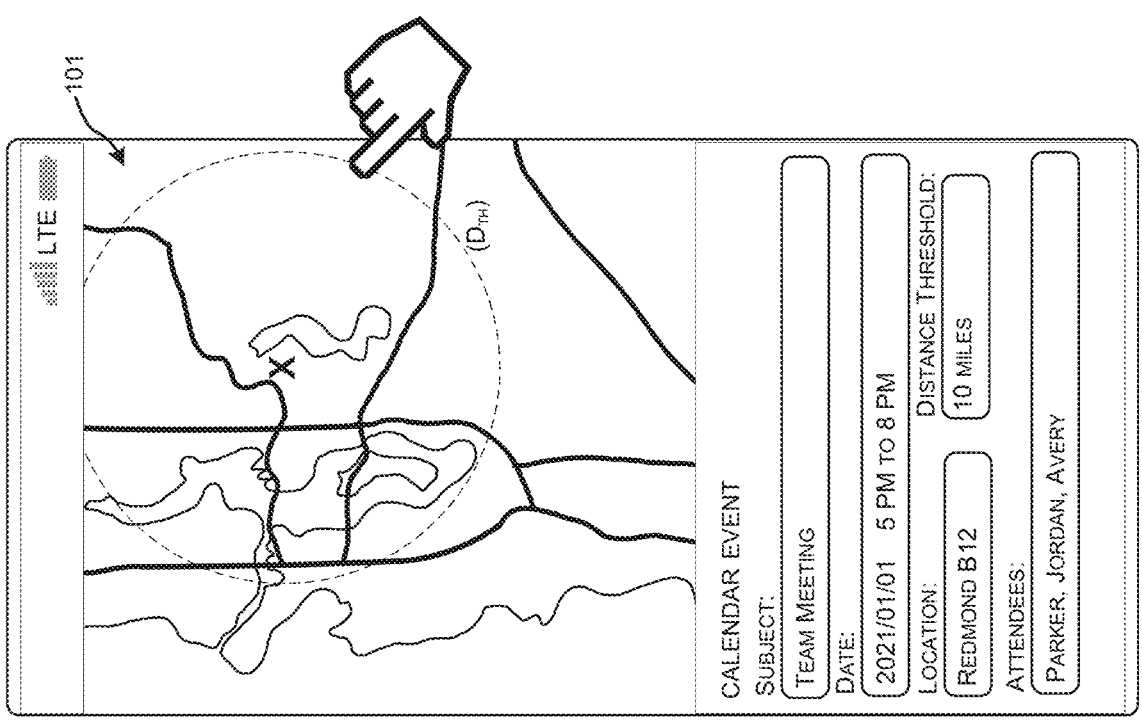
FIG. 12B illustrates a second stage of a process for modifying distance attributes associated with the location of a calendar event.

FIGS. 12A and 12B illustrate another embodiment of a user interface for configuring a region. In this example, a region can be configured in association with the parameters of a calendar event. In addition to receiving data such as a meeting time, date, location, and attendee identities, a user interface can display a map showing the location of an event. The map is configured to allow the user to define a region, defined by a circle having a radius, e.g., a distance threshold (Dth). The map is configured to allow the user to interact with the region. For instance, as shown, the user can select the border of the region and modify the size of the region by the use of a gesture. As the size of the region is modified, a text field describing the distance threshold can be updated. A calendar event specifying a region associated with an event location can be utilized to facilitate a number of different types of notifications based on one or more criteria.

In one illustrative example, as shown in FIG. 13, by the use of a calendar event specifying a location and an associated region, a notification can be provided to a meeting organizer or other people when invitees enter the region within a predetermined time period of the event start time. In the example of FIG. 13, system data 190 defines a policy to notify a specific person, e.g., a meeting organizer, when invitees are within the designated region, e.g., within the threshold distance (Dth) of the event location, within 20 minutes of the event start time. Thus, when an invitee, such as Quinn, enters the region, within the designated period, the device can automatically convey notifications to the meeting organizer indicating this activity. The notifications can be conveyed using a user interface 101 illustrating a map of the user activity relative to the location and the region. In addition, a status indicator 103 can be provided specifically describing the user activity, e.g., "Quinn has come within 5 miles of the main office @ 11:45 am on 12/19/21. Quinn has appointment at 12 pm at the main office."

Turning now to FIG. 5, aspects of a routine 500 for enabling the techniques disclosed herein. It should be understood that the operations of the methods disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 are described herein as being implemented, at least in part, by modules running the features disclosed herein and can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to devices and components, it can be appreciated that the operations of the routine 500 may be implemented in many ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein. Thus, a device can be a service or a mobile device or a combination of multiple devices acting in concert to facilitate the techniques described herein.

Figure 14:
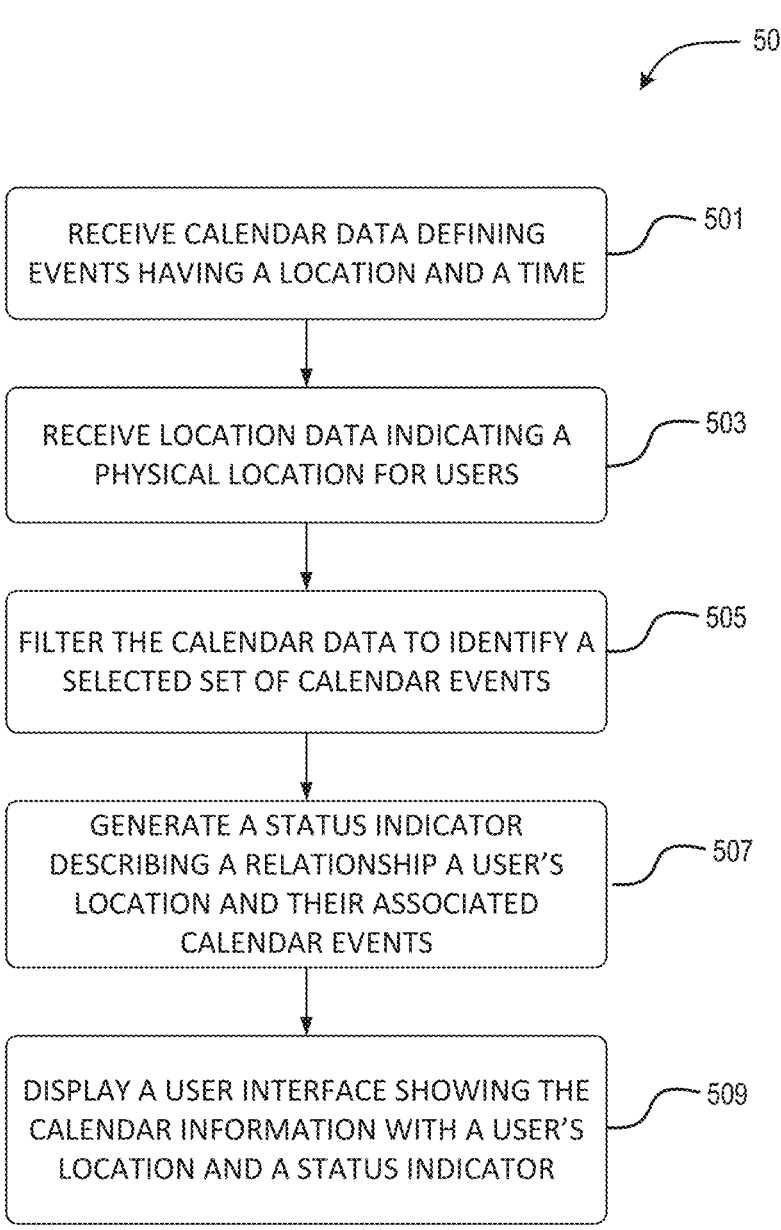
FIG. 14 illustrates a flow diagram of a routine that can be used to implement the techniques disclosed herein.

With reference to FIG. 14, the routine 500 begins at operation 501 where a device receives calendar data defining events having a location and a time. The calendar data can be received from any suitable resource indicating a person's schedule. In some configurations, the calendar data can be received from a calendar database from a service such as Gmail, Office 365, or iCloud. The calendar data can also be received from other resources, including a ticketing database, flight schedule database, purchase order database, or other resources indicating a location at a time for an event. In addition, other documents, such as emails, instant messages, text messages, transcripts, can be analyzed to generate or modify calendar data for particular person or group of people.

Next, at operation 503, the device receives location data indicating a physical location for users. The location data can include historical data or real-time data. The location data can be received from any suitable resource, such as a proximity sensor, an accelerometer, a gyroscope, and a Global Positioning System sensor ("GPS sensor"), a Wi-Fi network, a mobile network, and/or a service monitoring the location of one or more computing devices.

Next, at operation 505, the device filters the calendar data to identify a selected set of calendar events. In some configurations, a computing device can filter the calendar data to identify a selected set of calendar events 112 from a plurality of calendar events 111, wherein the plurality of calendar events 111 are filtered to the selected set of calendar events 112 specifying event times that are within a predetermined time frame 120.

Next, at operation 507, the device generates a status indicator indicating a relationship between the physical location of individual users 109 and the event locations specified in the selected set of calendar events 112 associated with each of the individual users. For illustrative purposes, a user can be associated with the calendar event by the use of any suitable user action or any suitable data association. For instance, a user can be associated with a calendar event by being listed as an invitee to an event, a user can be associated with a calendar event by creating a calendar event, a user can be associated with a calendar event if they have a predetermined set of permissions, such as read or write access, for the calendar event, etc. Thus, data describing a relationship between a person's location and a calendar event can include a statement that identifies a particular person and also identifies at least one detail of an associated calendar event, e.g., a time, a place, a description of the event, names of other invitees, details of whether invitees have accepted an invitation, etc.

A status indicator can include a message indicating that a person is "off calendar" or "on calendar." A person can be off calendar when that a person is not at an appropriate location relative to a meeting location. In some configurations, a person can also be considered to be "off calendar" when a probability of that person's commute within a predetermined time period, e.g., a threshold amount of time, is below a probability threshold. For instance, if a user has a future meeting in 15 minutes and traffic data, weather data, and other data impacting a person's commute between a current location and an event location indicates that the user is going to arrive in 20 minutes, or that the person has less than a 50% chance of completing the commute within 15 minutes, one or more notifications can be generated to indicate this result, e.g., that a person is off calendar. However, if the location data, traffic data, weather data, or other data impacting a person's commute between the current location and an event location indicates the user's going to arrive before the meeting, or has a 51% chance of completing the commute within 15 minutes, one or more notifications can be generated to indicate that the user is on calendar. For illustrative purposes, a person is noted as being "off calendar" when they are not at appropriate locations relative to their schedule, and a person is noted as being "on calendar" when they are at appropriate locations relative to their schedule.

Next, at operation 509, the device can cause the display of a user interface 101 comprising the status indicator 103 of the selected set of calendar events 112, the status indicator 103 display concurrently with graphical elements 102 showing the physical location of the individual users 109 on a map 125 relative to one or more location markers 105 of the event locations 114, wherein the status indicator 103 indicates the relationship between the physical location of the individual users and the event locations 114 specified in the select set of calendar events 112.

In some configurations, the status indicator can be displayed within the user interface. In other configurations, the status indicator can be a voice output generated by device, an email, a text message, an instant message, or any other suitable form of media to communicate a person's location information, calendar information, and/or a description of the relationship between the location information and calendar information. The data describing a relationship between a person's location and a calendar event can be presented with other actionable user interface elements that allow a user to send notifications to one or more select people, modify calendar data, or initiate various forms of communication with other people.

In some configurations, the routine 500 can proceed from operation 509 back to operation 501. In such a configuration, machine learning data can be generated from user activity. For instance, a person's interaction with an interactive notification 201 can be recorded and analyzed for machine learning purposes. Data generated from a machine learning process can be utilized to present different types of actions that are displayed within an interactive notification 201. For instance, if a user routinely cancels meetings in response to learning about certain types of activity, e.g., invitees are late or a meeting organizer moves the location of a meeting outside of a particular area, the system may arrange the user interface to put the cancellation user interface element in a more prominent location within the user interface.

As the user interacts with the computer, user activity data is stored and analyzed by one or more machine learning techniques. The term "machine learning" may refer to one or more programs that learns from the data it receives. For example, a machine learning mechanism may build, modify or otherwise utilize a model that is created from example inputs and makes predictions or decisions using the model. In the current example, the machine learning mechanism may be used to improve the identification of an application that is relevant to a user's intent and/or situation. Different factors can be used to influence the arrangement of a user interface or determine the movement patterns of users.

Different machine learning mechanisms may be utilized. For example, a classification mechanism may be utilized to select an action for an interactive notification 201. The classification mechanism may classify a person's selection of actions into different categories that provide an indication of whether a particular action is suitable for a user scenario. In some configurations, more classification categories may be utilized. In other examples, a statistical mechanism may be utilized to determine an action for an interactive notification 201. For example, a linear regression mechanism may be utilized to generate data that indicates a likelihood that an action is associated with a particular user scenario. Linear regression may refer to a process for modeling the relationship between one variable with one or more other variables. Different linear regression models might be used to select an action for an interactive notification 201. For example, a least squares approach might be utilized, a maximum-likelihood estimation might be utilized, or another approach might be utilized.

FIG. 15 shows additional details of an example computer architecture 600 for a computer, such as the computing device 100 (FIG. 1A), capable of executing the program components described herein. Thus, the computer architecture 600 illustrated in FIG. 15 illustrates an example architecture for a server computer, a mobile phone, a PDA, a smart phone, a desktop computer, a netbook computer, a tablet computer, and/or a laptop computer (not shown in FIG. 15). The computer architecture 600 may be utilized to execute any aspects of the software components presented herein.

The computer architecture 600 illustrated in FIG. 15 includes a central processing unit 602 ("CPU"), a system memory 604, including a random access memory 606

("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 607, other data, and one or more application programs, such as an application 141.

The mass storage device 612 is connected to the CPU 602 through a mass storage controller (not shown in FIG. 15) connected to the bus 610. The mass storage device 612 and its associated computer-readable media provide non-volatile storage for the computer architecture 600. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through the network 656 and/or another network (not shown). The computer architecture 600 may connect to the network 656 through a network interface unit 614 connected to the bus 610. It should be appreciated that the network interface unit 614 also may be utilized to connect to other types of networks and remote computer systems. The computer architecture 600 also may include an input/output controller 616 for receiving and processing input from a number of other devices, including a keyboard, mouse, or electronic stylus. Similarly, the input/output controller 616 may provide output to a display screen, a printer, or other type of output device (also not shown in FIG. 15).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 15, may include other components that are not explicitly shown in FIG. 15, or may utilize an architecture completely different than that shown in FIG. 15.

Figure 16:
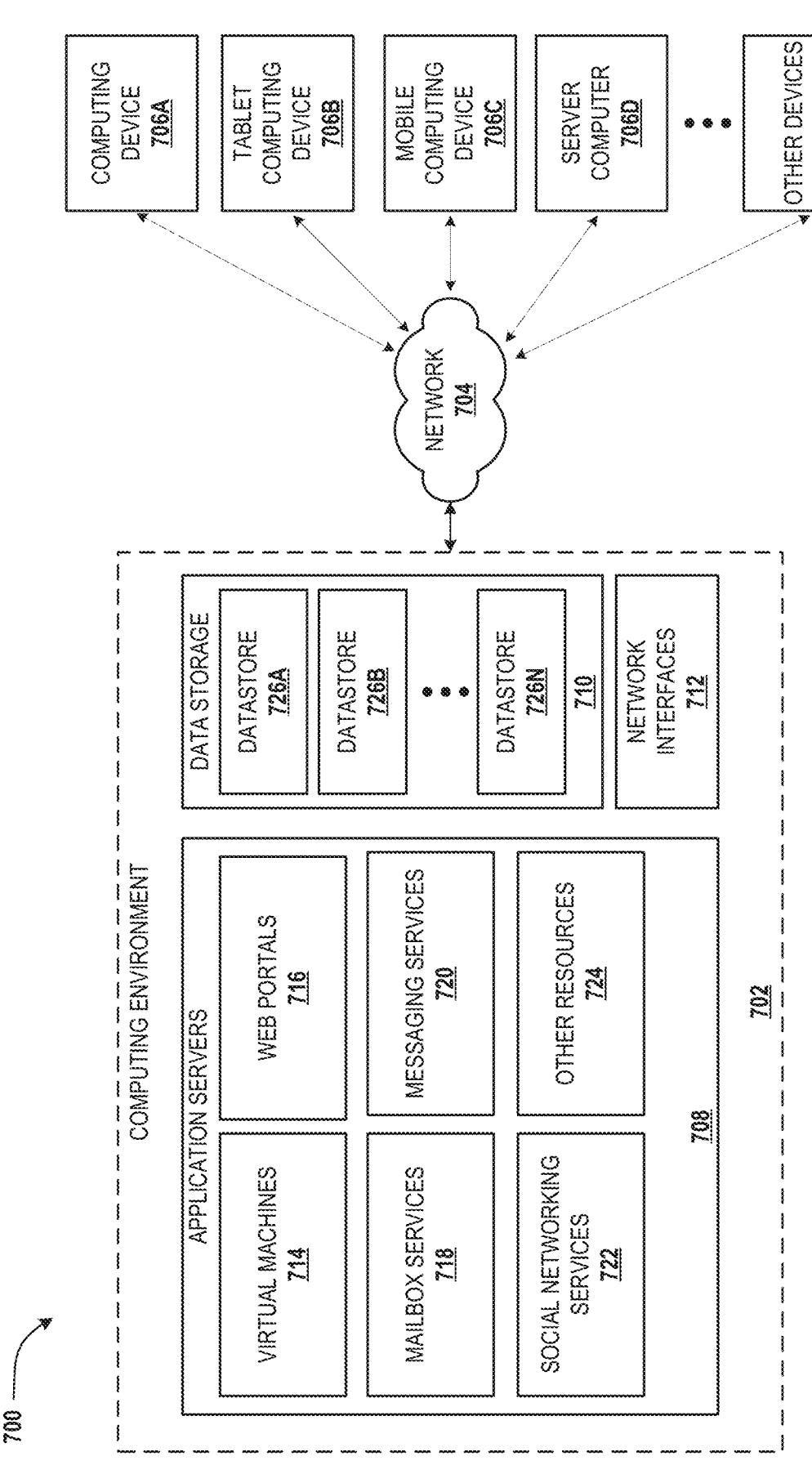
FIG. 16 is a diagram illustrating a distributed computing environment capable of implementing aspects of the techniques and technologies presented herein.

FIG. 16 depicts an illustrative distributed computing environment 700 capable of executing the software components described herein. Thus, the distributed computing environment 700 illustrated in FIG. 16 can be utilized to execute any aspects of the software components presented herein. For example, the distributed computing environment

700 can be utilized to execute aspects of the software components described herein.

According to various implementations, the distributed computing environment 700 includes a computing environment 702 operating on, in communication with, or as part of the network 704. The network 704 may be or may include the network 656, described above with reference to FIG. 15. The network 704 also can include various access networks. One or more client devices 706A-706N (hereinafter referred to collectively and/or generically as "clients 706" and also referred to herein as computing devices, which generate the user interfaces depicted herein) can communicate with the computing environment 702 via the network 704 and/or other connections (not illustrated in FIG. 16). In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702. It should be understood that the illustrated clients 706 and computing architectures illustrated and described herein are illustrative, and should not be construed as being limited in any way. Each client 706 can be used to collect input signals and share them between different clients.

In the illustrated configuration, the computing environment 702 includes application servers 708, data storage 710, and one or more network interfaces 712. According to various implementations, the functionality of the application servers 708 can be provided by one or more server computers that are executing as part of, or in communication with, the network 704. The application servers 708 can host various services, virtual machines, portals, and/or other resources. In the illustrated configuration, the application servers 708 host one or more virtual machines 714 for hosting applications or other functionality. According to various implementations, the virtual machines 714 host one or more applications and/or software modules for enabling the generation of content from productivity applications. It should be understood that this configuration is illustrative, and should not be construed as being limiting in any way. The application servers 708 also host or provide access to one or more portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") and presence services including, but not limited to, calendar services, contact management services, collaboration services, and/or other services. The messaging services 720 can include, but are not limited to, instant messaging services, chat services, forum services, and/or other communication services.

The application servers 708 also may include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some configurations, the social networking services 722 are provided by or include the FACEBOOK social networking service, the LINKEDIN professional networking service, the MYSPACE social networking service, the FOURSQUARE geographic networking service, the YAMMER office colleague networking service, and the like. In other configurations, the social networking services 722 are provided by other services, sites, and/or providers that may or may not be explicitly known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services 722 also can include commenting, blogging, and/or micro blogging services. Examples of such services include, but are not limited to, the YELP commenting service, the KUDZU review service, the OFFICETALK enterprise micro blogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above configurations are illustrative, and should not be construed as being limited in any way. According to various implementations, the social networking services 722 may host one or more applications and/or software modules for providing the functionality described herein. For instance, any one of the application servers 708 may communicate or facilitate the functionality and features described herein. For instance, a social networking application, mail client, messaging client or a browser running on a phone or any other client 706 may communicate with a networking service 722 and facilitate the functionality, even in part, described above with respect to FIG. 7. Any device or service depicted herein can be used as a resource for supplemental data, including email servers, storage servers, etc.

As shown in FIG. 16, the application servers 708 also can host other services, applications, portals, and/or other resources ("other resources") 724. The other resources 724 can include, but are not limited to, document sharing, rendering or any other functionality. The other resources 724 can also include a machine learning engine for processing and generating historical user activity data. It thus can be appreciated that the computing environment 702 can provide integration of the concepts and technologies disclosed herein with various mailbox, messaging, social networking, and/or other services or resources.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more server computers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the application servers 708 and/or other data. Although not illustrated in FIG. 16, the datastores 726 also can host or store web page documents, Word documents, presentation documents, data structures, algorithms for execution by a recommendation engine, and/or other data utilized by any application program or another module. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects. In one specific example, as summarized above, techniques described herein may be implemented, at least in part, by a web browser application, which works in conjunction with the application servers 708 of FIG. 16.

Figure 17:
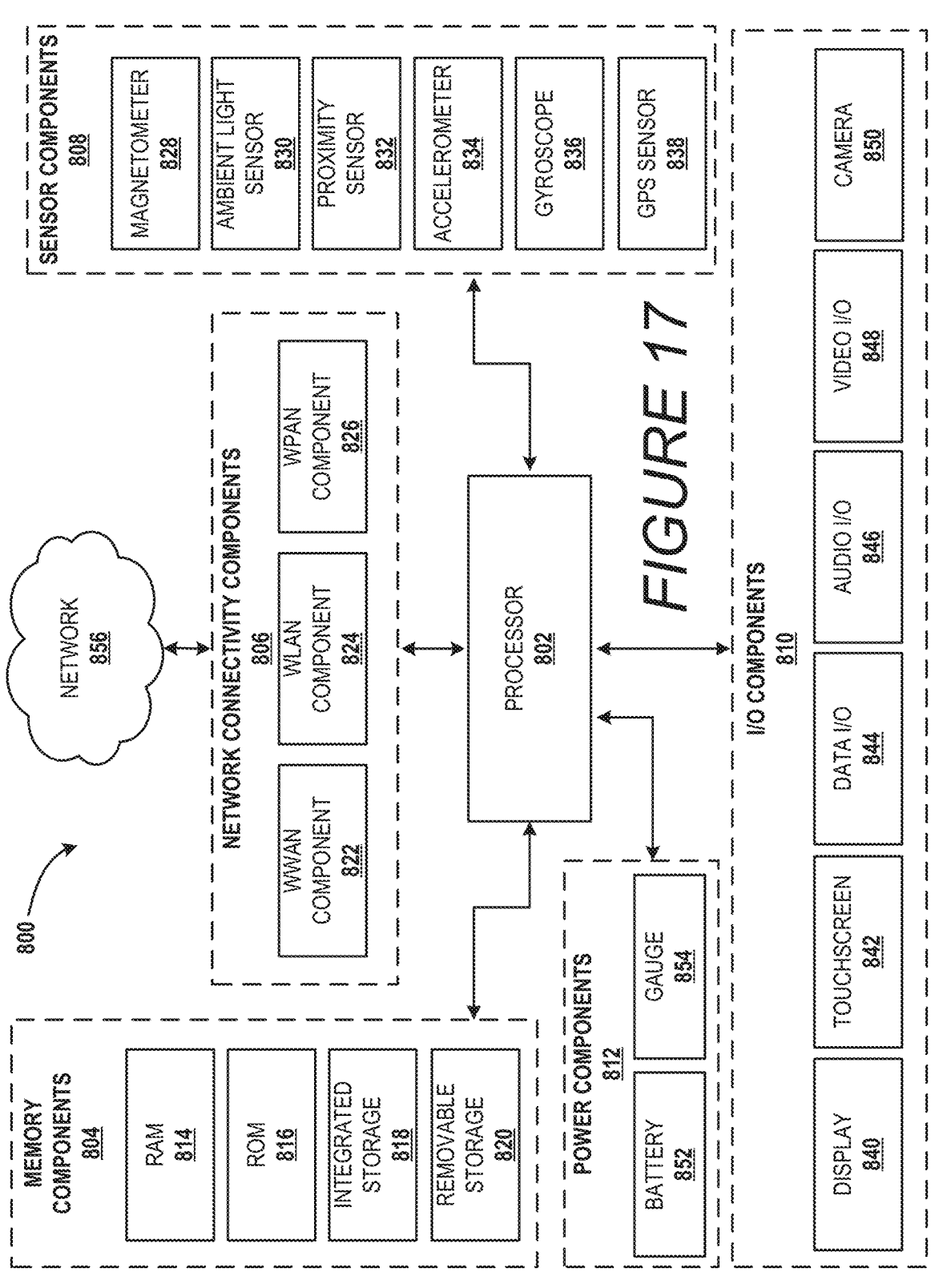
FIG. 17 is a computer architecture diagram illustrating a computing device architecture for a computing device capable of implementing aspects of the techniques and technologies presented herein.

Turning now to FIG. 17, an illustrative computing device architecture 800 for a computing device that is capable of executing various software components is described herein for enabling the generation of the notifications and views described herein. The computing device architecture 800 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 800 is applicable to any of the computing devices shown herein. Moreover, aspects of the computing device architecture 800 may be applicable to traditional desktop computers, portable computers (e.g., phones, laptops, notebooks, ultra-portables, and netbooks), server computers, and other computer systems, such as those described herein with reference to other figures. For example, the single touch and multi-touch aspects disclosed herein below may be applied to desktop computers that utilize a touchscreen or some other touch-enabled device, such as a touch-enabled track pad or touch-enabled mouse.

The computing device architecture 800 illustrated in FIG. 17 includes a processor 802, memory components 804, network connectivity components 806, sensor components 808, input/output components 810, and power components 812. In the illustrated configuration, the processor 802 is in communication with the memory components 804, the network connectivity components 806, the sensor components 808, the input/output ("I/O") components 810, and the power components 812. Although no connections are shown between the individual components illustrated in FIG. 17, the components can interact to carry out device functions. In some configurations, the components are arranged so as to communicate via one or more busses (not shown).

The processor 802 includes a central processing unit ("CPU") configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, a touch-enabled input.

In some configurations, the processor 802 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 802 is configured to communicate with a discrete GPU. In any case, the CPU and GPU may be configured in accordance with a co-processing CPU/GPU computing model, wherein the sequential part of an application executes on the CPU and the computationally-intensive part is accelerated by the GPU.

In some configurations, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some configurations, the processor 802 is fabricated, in part, utilizing a package-on-package ("PoP") integrated circuit packaging technique. The processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, California and others. In some configurations, the processor 802 is a SNAPDRAGON SoC, available from QUALCOMM of San Diego, California, a TEGRA SoC, available from NVIDIA of Santa Clara, California, a HUMMINGBIRD SoC, available from SAMSUNG of Seoul, South Korea, an Open Multimedia Application Platform ("OMAP") SoC, available from TEXAS INSTRUMENTS of Dallas, Texas, a customized version of any of the above SoCs, or a proprietary SoC.

The memory components 804 include a random access memory ("RAM") 814, a read-only memory ("ROM") 816, an integrated storage memory ("integrated storage") 818, and a removable storage memory ("removable storage") 820. In some configurations, the RAM 814 or a portion thereof, the ROM 816 or a portion thereof, and/or some combination of the RAM 814 and the ROM 816 is integrated in the processor 802. In some configurations, the ROM 816 is configured to store a firmware, an operating system or a portion thereof (e.g., operating system kernel), and/or a bootloader to load an operating system kernel from the integrated storage 818 and/or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some configurations, the removable storage 820 is provided in lieu of the integrated storage 818. In other configurations, the removable storage 820 is provided as additional optional storage. In some configurations, the removable storage 820 is logically combined with the integrated storage 818 such that the total available storage is made available as a total combined storage capacity. In some configurations, the total combined capacity of the integrated storage 818 and the removable storage 820 is shown to a user instead of separate storage capacities for the integrated storage 818 and the removable storage 820.

The removable storage 820 is configured to be inserted into a removable storage memory slot or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, Compact-Flash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various configurations, the operating system includes, but is not limited to WINDOWS MOBILE OS from Microsoft Corporation of Redmond, Wash., WINDOWS PHONE OS from Microsoft Corporation, WINDOWS from Microsoft Corporation, PALM WEB OS from Hewlett-Packard Company of Palo Alto, California, BLACKBERRY OS from Research In Motion Limited of Waterloo, Ontario, Canada, IOS from Apple Inc. of Cupertino, California, and ANDROID OS from Google Inc. of Mountain View, California Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from the network 856 or another network, which may be a WWAN, a WLAN, or a WPAN. Although only the network 856 is illustrated, the network connectivity components 806 may facilitate simultaneous communication with multiple networks, including the network 656. For example, the network connectivity components 806 may facilitate simultaneous communications with multiple networks via one or more of a WWAN, a WLAN, or a WPAN.

The network 856 may be or may include a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 856 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 856 may be configured to provide voice and/or data communications with any combination of the above technologies. The network 856 may be configured to or adapted to provide voice and/or data communications in accordance with future generation technologies.

In some configurations, the WWAN component 822 is configured to provide dual-multi-mode connectivity to the network 856. For example, the WWAN component 822 may be configured to provide connectivity to the network 856, wherein the network 856 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 856 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standards (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 824 is configured to connect to the network 856 via the WI-FI access points. Such connections may be secured via various encryption technologies including, but not limited, WI-FI Protected Access ("WPA"), WPA2, Wired Equivalent Privacy ("WEP"), and the like.

The network 856 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some configurations the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some configurations, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some configurations, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some configurations, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some configurations, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some configurations, output from the gyroscope 836 is used by an application program as an input mechanism to control some functionality of the application program. For example, the gyroscope 836 can be used for accurate recognition of movement within a 3D environment of a video game application or some other application. In some configurations, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems. The GPS sensor 838 can also operate in conjunction with other components, such as the processor 802, to generate positioning data for the computing device 800.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some configurations, the display 840 and the touchscreen 842 are combined. In some configurations two or more of the data I/O component 844, the audio I/O component 846, and the video I/O component 848 are combined. The I/O components 810 may include discrete processors configured to support the various interfaces described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 840 is a liquid crystal display ("LCD") utilizing any active or passive matrix technology and any backlighting technology (if used). In some configurations, the display 840 is an organic light emitting diode ("OLED") display. Other display types are contemplated.

The touchscreen 842, also referred to herein as a "touch-enabled screen," is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 842 is incorporated on top of the display 840 as a transparent layer to enable a user to use one or more touches to interact with objects or other information presented on the display 840. In other configurations, the touchscreen 842 is a touch pad incorporated on a surface of the computing device that does not include the display 840. For example, the computing device may have a touchscreen incorporated on top of the display 840 and a touch pad on a surface opposite the display 840.

In some configurations, the touchscreen 842 is a single-touch touchscreen. In other configurations, the touchscreen 842 is a multi-touch touchscreen. In some configurations, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some configurations, the touchscreen 842 supports a tap gesture in which a user taps the touchscreen 842 once on an item presented on the display 840. The tap gesture may be used for various reasons including, but not limited to, opening or launching whatever the user taps. In some configurations, the touchscreen 842 supports a double tap gesture in which a user taps the touchscreen 842 twice on an item presented on the display 840. The double tap gesture may be used for various reasons including, but not limited to, zooming in or zooming out in stages. In some configurations, the touchscreen 842 supports a tap and hold gesture in which a user taps the touchscreen 842 and maintains contact for at least a pre-defined time. The tap and hold gesture may be used for various reasons including, but not limited to, opening a context-specific menu.

In some configurations, the touchscreen 842 supports a pan gesture in which a user places a finger on the touchscreen 842 and maintains contact with the touchscreen 842 while moving the finger on the touchscreen 842. The pan gesture may be used for various reasons including, but not limited to, moving through screens, images, or menus at a controlled rate. Multiple finger pan gestures are also contemplated. In some configurations, the touchscreen 842 supports a flick gesture in which a user swipes a finger in the direction the user wants the screen to move. The flick gesture may be used for various reasons including, but not limited to, scrolling horizontally or vertically through menus or pages. In some configurations, the touchscreen 842 supports a pinch and stretch gesture in which a user makes a pinching motion with two fingers (e.g., thumb and forefinger) on the touchscreen 842 or moves the two fingers apart. The pinch and stretch gesture may be used for various reasons including, but not limited to, zooming gradually in or out of a web site, map, or picture.

Although the above gestures have been described with reference to the use of one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some configurations, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 846 is configured to provide audio input and/or output capabilities to the computing device. In some configurations, the audio I/O interface component 846 includes a microphone configured to collect audio signals. In some configurations, the audio I/O interface component 846 includes a headphone jack configured to provide connectivity for headphones or other external speakers. In some configurations, the audio I/O interface component 846 includes a speaker for the output of audio signals. In some configurations, the audio I/O interface component 846 includes an optical audio cable out.

The video I/O interface component 848 is configured to provide video input and/or output capabilities to the computing device. In some configurations, the video I/O interface component 848 includes a video connector configured to receive video as input from another device (e.g., a video media player such as a DVD or BLURAY player) or send video as output to another device (e.g., a monitor, a television, or some other external display). In some configurations, the video I/O interface component 848 includes a High-Definition Multimedia Interface ("HDMI"), mini-HDMI, micro-HDMI, DisplayPort, or proprietary connector to input/output video content. In some configurations, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some configurations, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some configurations, the battery gauge 854 is configured to measure the effect of a battery's discharge rate, temperature, age and other factors to predict remaining life within a certain percentage of error. In some configurations, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via an I/O component.

The disclosure presented herein also encompasses the subject matter set forth in the following clauses:

Clause 1. A method performed by a computing device, the method comprising: receiving calendar data (110) defining a plurality of calendar events (111) for a plurality of users (109), wherein each of the plurality of calendar events (111) specifies an event time (113) and an event location (114); receiving location data (115) indicating a physical location for remote devices (108) associated with each of the plurality of users (109); filtering the calendar data (109) to identify a selected set of calendar events (112) from the plurality of calendar events (111), wherein the plurality of calendar events (111) are filtered to the selected set of calendar events (112) that specify event times that are within a predetermined time frame (120); generating a status indicator (103) indicating a relationship between the physical location of individual users of the plurality of users (109)

and associated event locations (114) specified in the selected set of calendar events (112) associated with each of the individual users; and causing a display of a user interface (101) comprising the status indicator (103) of the selected set of calendar events (112), the status indicator (103) is displayed concurrently with graphical elements (102) showing the physical location of the individual users (109) on a map (125) relative to one or more location markers (105) of the event locations (114), wherein the status indicator (103) indicates the relationship between the physical location of the individual users and the event locations (114) specified in the select set of calendar events (112).

Clause 2. The method of clause 1, further comprising: receiving a user input indicating a selection of a single user from the plurality of users; and modifying the user interface to display a map bringing focus to a single graphical element showing a physical location of the single user, the map displayed concurrently with a status indicator bringing focus to a relationship between the physical location of the single user and an event location specified in a calendar event selected from the selected set of calendar events based on an association with the single user.

Clause 3. The method of clauses 1 and 2, wherein the user interface further comprises a calendar summary describing details of the select set of calendar events, the calendar summary displayed concurrently with the graphical elements showing the physical location of the individual users.

Clause 4. The method of clauses 1-3, further comprising: determining a distance between a physical location of a single user of the plurality of users and an event location of an associated calendar event of the selected set of calendar events, the distance determined within a predetermined time period of a start time of the associated calendar event; and in response to determining that the distance between the physical location of the single user and the event location is greater than a threshold distance, configuring the status indicator with an indication that the user is off schedule with respect to the associated calendar event.

Clause 5. The method of clauses 1-4, further comprising: determining a distance between a physical location of a single user of the plurality of users and an event location of an associated calendar event of the selected set of calendar events, the distance determined within a predetermined time period of a start time of the associated calendar event; and in response to determining that the distance between the physical location of the single user and the event location is less than a threshold distance, configuring the status indicator with an indication that the user is on schedule with respect to the associated calendar event.

Clause 6. The method of clauses 1-5, further comprising: determining a probability of a commute between a physical location of a single user of the plurality of users and an event location specified in an associated calendar event of the selected set of calendar events; and configure the status indicator with a description of the probability of the commute between the physical location of the single user and the event location.

Clause 7. The method of clauses 1-6, further comprising: analyzing the selected set of calendar events to determine a distance between a physical location of a single user of the plurality of users and an event location for each of the selected set of calendar events; and generating individual status indicators for the selected set of calendar events, wherein a first set of status indicators specify that the single user is on schedule for the first set of calendar events when the distance between the event location specified in the first set of calendar events and the physical location of the single user at an event time specified in the first set of calendar events is less than a threshold distance, and wherein a second set of status indicators specify that the single user is off schedule for the second set of calendar events when the distance between the event location specified in the second set of calendar events and the physical location of the single user at an event time specified in the second set of calendar events is greater than the threshold distance.

Clause 8. The method of clauses 1-7, wherein the user interface is displayed on individual computing devices located within a threshold distance to an event location of an associated calendar event of the selected set of calendar events.

Clause 9. The method of clauses 1-8, wherein the user interface is displayed on individual computing devices located outside a threshold distance to an event location of an associated calendar event of the selected set of calendar events.

Clause 10. The method of clauses 1-9, wherein the user interface further comprises selectable actions for causing at least one of (1) communicating the status indicator to individual computing devices within a threshold distance to an event location of an associated calendar event, (2) communicating the status indicator to individual computing devices that are outside the threshold distance to the event location of the associated calendar event, or (3) modifying the associated calendar event.

Clause 11. The method of clauses 1-10, wherein the status indicator indicates that a single user of the plurality of users is out of compliance with respect to a policy in response to determining that a physical location for the single user is outside of a predefined region and that the single user is not associated with a calendar event specifying a location outside of the predefined region.

Clause 12. A system (800) comprising: one or more processing units (802); and a computer-readable medium (804) having encoded thereon computer-executable instructions to cause the one or more processing units (802) to: receive calendar data (110) defining an event (112), an event time (113), and an event location (114), wherein the event (112) is selected from a plurality of events (111) based on the event time (113) meeting one or more criteria; receive location data (115) defining a physical location of a user associated with the event (112); determine that a distance (D) between the physical location of the user and the event location (114) is greater than a threshold distance (Dth); cause the display of a user interface (101) comprising the status indicator (103) of the selected event (112), the status indicator (103) is displayed concurrently with a graphical element (102B) showing the physical location of the user on a map (125) relative to one or more location markers (105) of the event location (114), wherein the status indicator (103) indicates a relationship between the physical location of the user and the event location (114) specified in the selected event (112).

Clause 13. The system of clause 12, wherein the status indicator indicates that the user is out of compliance with respect to with respect to a policy in response to determining that the physical location of the user is outside of a predefined region and that the user is not associated with any calendar event specifying a location outside of the predefined region.

Clause 14. The system of clauses 12 and 13, wherein data defining the threshold distance from the event location is associated with the calendar data defining the event, wherein the status indicator is generated in response to determining that the user has entered a predefined region defined by the threshold distance within a predetermined time period of the event time.

Clause 15. The system of clause 12-14, wherein the user interface further comprises a calendar summary describing details of the calendar event, the calendar event having an event time within a time frame.

Clause 16. A system comprising: means for receiving calendar data (110) defining a plurality of calendar events (111) for a plurality of users (109), wherein each of the plurality of calendar events (111) specifies an event time (113) and an event location (114); means for receiving location data (115) indicating a physical location for remote devices (108) associated with each of the plurality of users (109); means for filtering the calendar data (109) to identify a selected set of calendar events (112) from the plurality of calendar events (111), wherein the plurality of calendar events (111) are filtered to the selected set of calendar events (112) that specify event times that are within a predetermined time frame (120); means for generating a status indicator (103) indicating a relationship between the physical location of individual users of the plurality of users (109) and associated event locations (114) specified in the selected set of calendar events (112) associated with each of the individual users; and means for causing a display of a user interface (101) comprising the status indicator (103) of the selected set of calendar events (112), the status indicator (103) is displayed concurrently with graphical elements (102) showing the physical location of the individual users (109) on a map (125) relative to one or more location markers (105) of the event locations (114), wherein the status indicator (103) indicates the relationship between the physical location of the individual users and the event locations (114) specified in the select set of calendar events (112).

Clause 17. The system of clause 16, further comprising: means for receiving a user input indicating a selection of a single user from the plurality of users; and means for modifying the user interface to display a map bringing focus to a single graphical element showing a physical location of the single user, the map displayed concurrently with the status indicator, the status indicator configured to bring focus to a relationship between the physical location of the single user and an event location specified in a calendar event selected from the selected set of calendar events based on an association with the single user.

Clause 18. The system of clauses 16 and 17, wherein the user interface further comprises a calendar summary describing details of the select set of calendar events, the calendar summary displayed concurrently with the graphical elements showing the physical location of the individual users.

Clause 19. The system of clauses 16-18, further comprising: means for determining a distance between a physical location of a single user of the plurality of users and an event location of an associated calendar event of the selected set of calendar events, the distance determined within a predetermined time period of a start time of the associated calendar event; and means for configuring the status indicator with an indication that the user is off schedule with respect to the associated calendar event, in response to determining that the distance between the physical location of the single user and the event location is greater than a threshold distance.

Clause 20. The system of clauses 16-19, further comprising: means for determining a distance between a physical location of a single user of the plurality of users and an event location of an associated calendar event of the selected set of calendar events, the distance determined within a predetermined time period of a start time of the associated calendar event; and means for configuring the status indicator with an indication that the user is on schedule with respect to the associated calendar event, in response to determining that the distance between the physical location of the single user and the event location is less than a threshold distance.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method performed by a computing device, the method comprising:

receiving calendar data defining a plurality of calendar events for a plurality of users, wherein each of the plurality of calendar events specifies an event time and an event location;

receiving historical location data indicating physical locations of remote devices associated with each of the plurality of users, wherein individual the historical location data comprises timestamped location points showing where each user was located at the time of at least one of the event times;

receiving a user input that defines a time frame used for filtering the calendar data;

filtering the calendar data to identify a selected set of calendar events from the plurality of calendar events, wherein the selected set of calendar events specifies event times and event locations that are within the defined time frame;

for each event in the selected set of calendar events, determining a relationship between:

the historical location of a user at the time of a corresponding event scheduled for that user, and the event location specified in the calendar data for the corresponding event;

generating status indicators that indicate, for each user of the plurality of users, whether the user was at or away from the corresponding event location at the time the corresponding event occurred; and causing a display of a user interface comprising:

graphical elements showing the historical location of each user at the time of the corresponding event, and location markers showing the scheduled event location for each user, and the status indicators concurrently with the graphical elements and location markers, wherein the status indicators indicate a relationship between the actual historical location of the user at the time of the event and the scheduled location of the event.

2. The method of claim 1, further comprising:

receiving a user input indicating a selection of a single user from the plurality of users; and modifying the user interface to display a map bringing focus to a single graphical element showing a physical location of the single user, the map displayed concurrently with a status indicator bringing focus to a relationship between the physical location of the single user and an event location specified in a calendar event selected from the selected set of calendar events based on an association with the single user.

3. The method of claim 1, wherein the user interface further comprises a calendar summary describing details of the select set of calendar events, the calendar summary displayed concurrently with the graphical elements showing the historical location of the individual users.

4. The method of claim 1, further comprising:

determining a distance between a physical location of a single user of the plurality of users and an event location of an associated calendar event of the selected set of calendar events, the distance determined within a predetermined time period of a start time of the associated calendar event; and in response to determining that the distance between the physical location of the single user and the event location is greater than a threshold distance, configuring the status indicator with an indication that the user is off schedule with respect to the associated calendar event.

5. The method of claim 1, further comprising:

determining a distance between a physical location of a single user of the plurality of users and an event location of an associated calendar event of the selected set of calendar events, the distance determined within a predetermined time period of a start time of the associated calendar event; and in response to determining that the distance between the physical location of the single user and the event location is less than a threshold distance, configuring the status indicator with an indication that the user is on schedule with respect to the associated calendar event.

6. The method of claim 1, further comprising:

determining a probability of a commute between a physical location of a single user of the plurality of users and an event location specified in an associated calendar event of the selected set of calendar events; and configure the status indicator with a description of the probability of the commute between the physical location of the single user and the event location.

7. The method of claim 1, further comprising:

analyzing the selected set of calendar events to determine a distance between a physical location of a single user of the plurality of users and an event location for each of the selected set of calendar events; and generating individual status indicators for the selected set of calendar events, wherein a first set of status indicators specify that the single user is on schedule for the first set of calendar events when the distance between the event location specified in the first set of calendar events and the physical location of the single user at an event time specified in the first set of calendar events is less than a threshold distance, and wherein a second set of status indicators specify that the single user is off schedule for the second set of calendar events when the distance between the event location specified in the second set of calendar events and the physical location of the single user at an event time specified in the second set of calendar events is greater than the threshold distance.

8. The method of claim 1, wherein the set of calendar events further indicate that the user is assigned for the corresponding event, wherein the user interface is displayed on individual computing devices located within a threshold distance to an event location of an associated calendar event of the selected set of calendar events to which the user is assigned.

9. The method of claim 1, wherein the user interface is displayed on individual computing devices located outside a threshold distance to an event location of an associated calendar event of the selected set of calendar events.

10. The method of claim 1, wherein the user interface further comprises selectable actions for causing at least one of (1) communicating the status indicator to individual computing devices within a threshold distance to an event location of an associated calendar event, (2) communicating the status indicator to individual computing devices that are outside the threshold distance to the event location of the associated calendar event, or (3) modifying the associated calendar event.

11. The method of claim 1, further comprising:

receiving an input to modify the time frame to an updated time frame; and in response to the input to modify the time frame to an updated time frame, causing to switch from using historical location data to using current location data, wherein causing the display of the user interface comprises using the current location data to display updated status indicators concurrently with other graphical elements showing a current location of the individual users on the map relative to one or more location markers of other event locations based on the other set of calendar events, wherein the updated status indicators indicate a relationship between the physical location of the individual users and the other event locations specified in the other set of calendar events.

12. The method of claim 1, wherein the set of calendar events further indicate that the user is assigned for the corresponding event, wherein at least one the status indicators includes a description of where the user should be located at the time of the corresponding event, wherein the status indicators are displayed in response to determining that a physical location of the user is outside of a predefined region and that the user is not associated with any calendar event specifying a location outside of the predefined region.

13. The method of claim 1, further comprising:

determining that a physical location of the user is outside of a predefined region;

determining that the user does not have a calendar event having a location outside of the predefined region; and generating a display of the status indicators describing incompliance with a schedule, in response to determining that the physical location of the user is outside of the predefined region and determining that the user does not have the calendar event located outside of the predefined region.

14. The method of claim 1, further comprising:

determining that a physical location of the user is outside of a predefined region;

determining that the user is associated with a calendar event having a location outside of the predefined region; and generating a display of the status indicators describing schedule compliance, in response to determining that the physical location of the user is outside of the predefined region and determining that the user is associated with the calendar event located outside of the predefined region.

15. A system comprising:

one or more processing units; and a computer-readable storage medium having encoded thereon computer-executable instructions to cause the one or more processing units to:

receive calendar data defining a plurality of calendar events for a plurality of users, wherein each of the plurality of calendar events specifies an event time and an event location;

receive historical location data defining physical locations of associated with the plurality of users, wherein individual the historical location data comprises time-stamped location points showing where each user was located at the time of at least one of the event times;

receive a user input that defines a time frame used for filtering the calendar data;

filter the calendar data to identify a selected set of calendar events from the plurality of calendar events, wherein the selected set of calendar events specifies event times and event locations that are within the defined time frame;

for each event in the selected set of calendar events, determining a relationship between:

the historical location of a user at the time of a corresponding event scheduled for that user, and the event location specified in the calendar data for the corresponding event;

generating status indicators that indicate, for each user of the plurality of users, whether the user was at or away from the event location at the time the corresponding event occurred; and cause the display of a user interface comprising:

graphical elements showing the historical location of each user at the time of the corresponding event, and location markers showing the scheduled event location for each user, and the status indicators concurrently with the graphical elements and location markers, wherein the status indicators indicate a relationship between the actual historical location of the user at a time of the event and the scheduled location of the event.

16. The system of claim 15, wherein at least one the status indicators includes a description of where the user should be located at the time of the corresponding event, wherein the status indicators are displayed in response to determining that a physical location of the user is outside of a predefined region and that the user is not associated with any calendar event specifying a location outside of the predefined region.

17. A computer-readable storage medium having encoded thereon computer-executable instructions to cause one or more processing units of a computing system to:

receive calendar data defining a plurality of calendar events for a plurality of users, wherein each of the plurality of calendar events specifies an event time and an event location;

receive historical location data indicating physical locations of remote devices associated with each of the plurality of users, wherein the historical location data comprises timestamped location points showing where each user was located at the time of at least one of the event times;

receive a user input that defines a time frame used for filtering the calendar data;

filtering the calendar data to identify a selected set of calendar events from the plurality of calendar events, wherein the selected set of calendar events specifies event times and event locations that are within the defined time frame;

for each event in the selected set of calendar events, determining a relationship between:

the historical location of a user at the time of the corresponding event, and the event location specified in the calendar data for that event;

generating status indicators that indicate, for each user, whether the user was at or away from the scheduled event location at the time the event occurred; and causing a display of a user interface comprising:

graphical elements showing the historical location of each user at the time of the corresponding event, and location markers showing the scheduled event location for each user, and the status indicators concurrently with the graphical elements and location markers, wherein the status indicators indicate a relationship between the actual historical location of the user at the time of the event and the scheduled location of the event.

18. The computer-readable storage medium of claim 17, wherein the set of calendar events further indicate that the user is assigned for the corresponding event, wherein at least one the status indicators includes a description of where the user should be located at the time of the corresponding event, wherein the status indicators are displayed in response to determining that a physical location of the user is outside of a predefined region and that the user is not associated with any calendar event specifying a location outside of the predefined region.

19. The computer-readable storage medium of claim 17, wherein the instructions further cause the one or more processing units of a computing system to:

determine that a physical location of the user is outside of a predefined region;

determine that the user does not have a calendar event having a location outside of the predefined region; and generate a display of the status indicators describing incompliance with a schedule, in response to determining that the physical location of the user is outside of the predefined region and determining that the user does not have the calendar event located outside of the predefined region.

20. The computer-readable storage medium of claim 17, wherein the instructions further cause the one or more processing units of a computing system to:

determine that a physical location of the user is outside of a predefined region;

determine that the user is associated with a calendar event having a location outside of the predefined region; and generate a display of the status indicators describing schedule compliance, in response to determining that the physical location of the user is outside of the predefined region and determining that the user is associated with the calendar event located outside of the predefined region.

* * * * *